(12) United States Patent
Silverbrook et al.

(10) Patent No.: US 8,009,196 B2
(45) Date of Patent: *Aug. 30, 2011

(54) CAMERA HAVING NETWORKED INTERACTIVE PRINTER

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 447 days.

This patent is subject to a terminal disclaimer.

(21) Appl. No.: 12/143,825

(22) Filed: Jun. 23, 2008

(65) Prior Publication Data

US 2008/0259166 A1   Oct. 23, 2008

Related U.S. Application Data

(63) Continuation of application No. 10/974,742, filed on Oct. 28, 2004, now Pat. No. 7,728,872, which is a continuation of application No. 09/608,920, filed on Jun. 30, 2000, now Pat. No. 6,831,682.

(30) Foreign Application Priority Data

Jun. 30, 1999   (AU) ..................... PQ1313

(51) Int. Cl.
H04N 5/225 (2006.01)
H04N 5/232 (2006.01)
G06F 3/12 (2006.01)

(52) U.S. Cl. .................... 348/207.2; 348/211.1; 358/1.1

(58) Field of Classification Search ............... 348/207.1, 348/207.2, 231.1, 373, 375, 211.1; 358/1.1; 345/179

See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |
| 5,506,617 A | 4/1996 | Parulski | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 5,894,326 A | 4/1999 | McIntyre et al. | |
| 5,933,829 A | 8/1999 | Durst et al. | |
| 6,076,734 A | 6/2000 | Dougherty et al. | |
| 6,191,815 B1 | 2/2001 | McIntyre et al. | |
| 6,360,174 B1 | 3/2002 | Shoki | |
| 6,618,078 B1 | 9/2003 | Budrys | |
| 6,628,333 B1 | 9/2003 | Gowda et al. | |
| 6,747,692 B2 * | 6/2004 | Patel et al. ................. | 348/211.2 |
| 6,831,682 B1 * | 12/2004 | Silverbrook et al. ...... | 348/207.2 |

(Continued)

FOREIGN PATENT DOCUMENTS

EP   0848540   6/1998

(Continued)

*Primary Examiner* — Nhan T Tran

(57) ABSTRACT

A camera is provided having a camera module, a network interface module and printing module. The camera module receives user input and captures the image with an image sensor in response to the user input. The interface module transfers the captured image to a computer system. The printing module prints an interface onto a surface including the image and coded data at least partially indicative of an identity of the image. This allows the identity of the image to be obtained from the interface. The interface module receives the image from the computer system and the printing module receives the image from the network interface module and print the image on a second surface.

7 Claims, 70 Drawing Sheets

U.S. PATENT DOCUMENTS

| | | | |
|---|---|---|---|
| 6,879,341 B1 * | 4/2005 | Silverbrook | 348/231.6 |
| 6,963,359 B1 | 11/2005 | Aosaki et al. | |
| 6,964,374 B1 | 11/2005 | Djuknic et al. | |
| 7,212,637 B2 | 5/2007 | Salisbury | |
| 7,538,793 B2 * | 5/2009 | Silverbrook et al. | 348/207.1 |
| 7,728,872 B2 * | 6/2010 | Silverbrook et al. | 348/207.2 |
| 7,834,906 B2 * | 11/2010 | Silverbrook et al. | 348/207.2 |
| 2002/0196345 A1 | 12/2002 | No | |
| 2004/0114023 A1 | 6/2004 | Jacobsen | |

FOREIGN PATENT DOCUMENTS

| | | |
|---|---|---|
| EP | 0913989 | 5/1999 |
| GB | 2306669 A | 5/1997 |
| JP | 10-013844 A | 1/1998 |
| JP | 11-007512 A | 1/1999 |
| JP | 11-095493 A | 4/1999 |
| WO | WO 95/10813 A | 4/1995 |
| WO | WO 99/18487 A2 | 4/1999 |
| WO | WO 99/50787 A1 | 10/1999 |

* cited by examiner

FIXED INFORMATION ~ 994

VARIABLE INFORMATION ~ 995

COMMAND BUTTON ~ 996

INPUT FIELD ~ 997

● DRAGGABLE COMMAND ~ 998

HYPERTEXT LINK ~ 999

FIG. 53

| USER NAME | PAGE 1 OF # | DATE/TIME |

*PHOTO FOLDERS*

SELECT

☐ FOLDER NAME

☐ FOLDER NAME

☐ FOLDER NAME

☐ FOLDER NAME

☐ FOLDER NAME ( PRINT SELECTED )    ( DELETE SELECTED )

```
┌─────────────────────────────────────────────────┐
│  ┌─────────────┐                  ┌───────────┐ │
│  │ USER NAME   │   PAGE 1 OF 1    │ DATE/TIME │ │
│  └─────────────┘                  └───────────┘ │
│   CUSTOM PHOTO PRINT                         ╲  │
│                                               ⟩ 427
│                        ┌───────────┐         ╱  │
│      ┌─────────┐       │ DATE/TIME │            │
│      │         │       └───────────┘            │
│      │         │       ┌───────────┐            │
│      │  PHOTO  │       │ LOCATION  │            │
│      │THUMBNAIL│       └───────────┘            │
│      │         │                                │
│      └─────────┘                                │
│      ┌──────────────────────────┐               │
│      │        CAPTION           │               │
│      └──────────────────────────┘               │
│                                                 │
│   NUMBER OF COPIES  ┌─────────────────┐         │
│                     └─────────────────┘         │
│                                                 │
│            SIZE   ☐   6×4"                      │
│                                                 │
│                   ☐   12×8"                     │
│                                                 │
│                   ☐   POSTER (4 PAGES)          │
│                                                 │
│                   ☐   POSTER (9 PAGES)          │
│                                                 │
│                   ☐   POSTER (16 PAGES)         │
│                                                 │
│                                  ⊂ PRINT ⊃      │
└─────────────────────────────────────────────────┘
```

FIG. 59

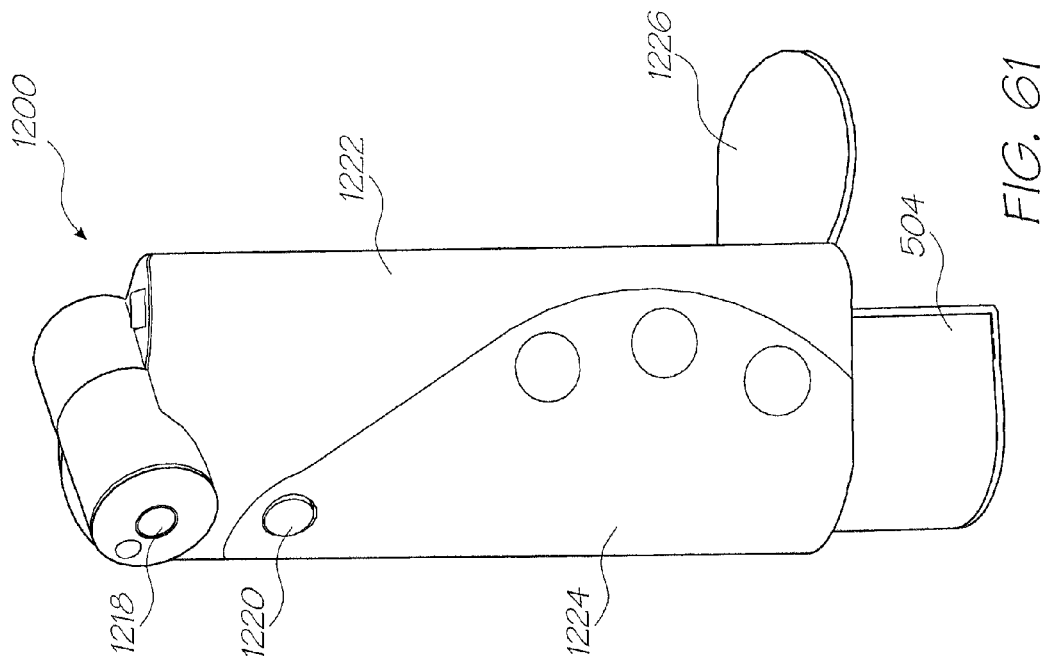
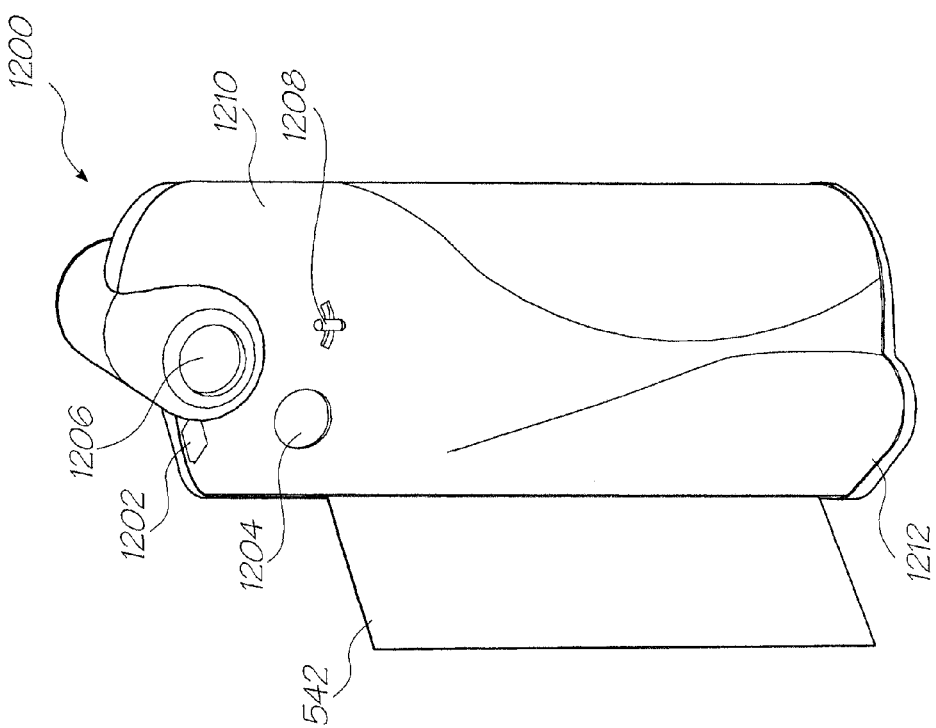

CAMERA HAVING NETWORKED INTERACTIVE PRINTER

CROSS REFERENCE TO RELATED APPLICATION

The present application is a continuation application of U.S application Ser. No. 10/974,742 filed on Oct. 28, 2004, now issued as U.S. Pat. No. 7,728,872, which is a continuation of U.S. application Ser. No. 09/608,920 filed on Jun. 30, 2000, now issued as U.S. Pat. No. 6,831,682, the entire contents of which are herein incorporated by reference.

FIELD OF INVENTION

The present invention relates to a digital camera with an integral printer for printing an interface onto an surface to produce an interface surface, and, in particular, for printing photos as interfaces.

The invention has been developed primarily to produce interface surfaces which allow users to interact with networked information and to obtain interactive printed matter on demand via high-speed networked color printers. Although the invention will largely be described herein with reference to this use, it will be appreciated that the invention is not limited to use in this field.

CO-PENDING APPLICATIONS

Various methods, systems and apparatus relating to the present invention are disclosed in the following co-pending applications/granted patents filed by the applicant or assignee of the present invention on Jun. 30, 2000:

| | | | | | |
|---|---|---|---|---|---|
| 6,238,044 | 6,425,661 | 6,471,331 | 6,676,250 | 6,347,864 | 6,439,704 |
| 6,425,700 | 6,588,952 | 6,824,044 | 6,678,499 | 6,976,220 | 6,976,035 |
| 6,766,942 | 7,286,113 | 6,922,779 | 6,978,019 | 09/607,843 | 6,959,298 |
| 6,973,450 | 7,150,404 | 6,965,882 | 7,233,924 | 7,007,851 | 6,957,921 |
| 6,457,883 | 6,977,751 | 6,398,332 | 6,394,573 | 6,622,923 | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | | |
|---|---|---|---|---|---|
| 6,281,912 | 6,290,349 | 6,315,399 | 6,318,920 | 6,328,417 | 6,328,425 |
| 6,328,431 | 6,338,548 | 6,383,833 | 6,390,591 | 6,409,323 | 6,428,133 |
| 6,428,155 | 6,439,706 | 6,464,332 | 6,488,422 | 6,502,614 | 6,526,658 |
| 6,540,319 | 6,549,935 | 6,591,884 | 6,604,810 | 6,622,999 | 6,644,642 |
| 6,669,385 | 6,681,045 | 6,727,996 | 6,728,000 | 6,737,591 | 6,760,119 |
| 6,785,016 | 6,789,191 | 6,789,194 | 6,795,215 | 6,804,026 | 6,812,972 |
| 6,813,039 | 6,816,274 | 6,822,639 | 6,825,945 | 6,830,196 | 6,832,717 |
| 6,859,289 | 6,870,966 | 6,957,768 | 6,975,429 | 6,980,318 | 6,987,506 |
| 6,987,573 | 6,991,320 | 7,018,016 | 7,038,797 | 7,055,739 | 7,062,651 |
| 7,068,382 | 7,079,712 | 7,088,459 | 7,102,772 | 7,106,888 | 7,123,239 |
| 7,154,638 | 7,170,499 | 7,173,722 | 7,233,320 | 7,259,889 | 7,295,332 |
| 7,330,974 | 7,350,236 | 09/575,172 | 09/575,181 | 09/575,197 | |

The disclosures of these co-pending applications are incorporated herein by cross-reference.

BACKGROUND

Cameras are used to capture photos. Traditional cameras capture photos on film. The film is developed and the photos are printed. The negative, i.e. the original developed film, provides a source from which new prints can be obtained. The advent of high-quality scanning also allows a print to act as a source of copies, although not with the same quality as from a negative. If either a negative or a print is damaged, the quality of a subsequent copy is compromised.

Digital cameras capture photos as digital images which can be both displayed and printed. A digital image thus acts as a digital "negative". However, many users find the task of printing and otherwise managing digital images onerous.

SUMMARY OF INVENTION

According to a first aspect, the present invention provides a camera for capturing an image and printing a first interface onto a first surface, in response to a user input, and for printing a second interface onto a second surface, in response to first indicating data received from a sensing device, the first indicating data being sensed by the sensing device from first coded data, the first interface including the first coded data, the camera including:

(a) a camera module, including an image sensor, configured to:
   (i) receive a user input; and
   (ii) capture, via the image sensor and in response to the user input, the image;

(b) an input module configured to:
   (i) receive, from the sensing device, the first indicating data, the first indicating data being at least partially indicative of response data;
   (ii) generate second indicating data based on the first indicating data, the second indicating data being at least partially indicative of the response data;
   (iii) send the second indicating data to a computer system; and (c) a printing module, including a printing mechanism, configured to:
   (i) receive, from the camera module, the image;
   (ii) generate the first interface based at least partially on the image;
   (iii) print the first interface onto the first surface using the printing mechanism;
   (iv) receive the response data from the computer system;
   (v) generate the second interface based at least partially on the response data; and
   (vi) print the second interface onto the second surface using the printing mechanism.

Preferably, the second interface includes second coded data, wherein the printing module includes a coded data generator configured to generate the second coded data based on at least part of the response data. More preferably, the response data includes second region identity data indicative of at least one identity, the identity being associated with a region of the second interface, the coded data generator being configured to generate the second coded data based on the second region identity data, the second coded data being indicative of the identity.

In a preferred embodiment, the second interface includes visible information in addition to the second coded data, the visible information being based at least partially on the response data.

Preferably, the second coded data is also indicative of at least one reference point of the region. More preferably, the at least one reference point is determined on the basis of a coded data layout.

Preferably, the printing module is configured to receive the coded data layout from the computer system.

In one embodiment, the camera further includes storage means for storing a plurality of the coded data layouts, the printing module being configured to:

receive, from the computer system, layout selection information indicative of one of the coded data layouts; and use the layout selection information to select one of the stored coded layouts for use in determining the at least one reference point.

Preferably, the first indicating data includes location data sensed by the sensing device from the first coded data.

In one preferred form, the first indicating data includes first region identity data sensed by the sensing device from the first coded data, the first region identity data being indicative of an identity associated with a region of the first interface, the region being at least partially indicative of the response data.

In another preferred form, the first indicating data includes location data sensed by the sensing device from the first coded data, the location data being indicative of a location within the region, the location within the region being at least partially indicative of the response data.

Preferably, the second coded data includes at least one tag, each tag being indicative of the identity of the region.

Further objects and advantages of the invention will be apparent from the detailed description that follows.

BRIEF DESCRIPTION OF DRAWINGS

Preferred and other embodiments of the invention will now be described, by way of non-limiting example only, with reference to the accompanying drawings, in which:

FIG. 53 is a schematic view of a photo history list form;

FIG. 55 is a schematic view of a photo folder list form;

FIG. 56 is a schematic view of a copy/move to photo folder form;

FIG. 59 is a schematic view of a custom photo print form;

FIG. 60 is a perspective view of the rear of a netpage camera;

FIG. 61 is a perspective view of the front of the netpage camera;

DETAILED DESCRIPTION OF PREFERRED AND OTHER EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
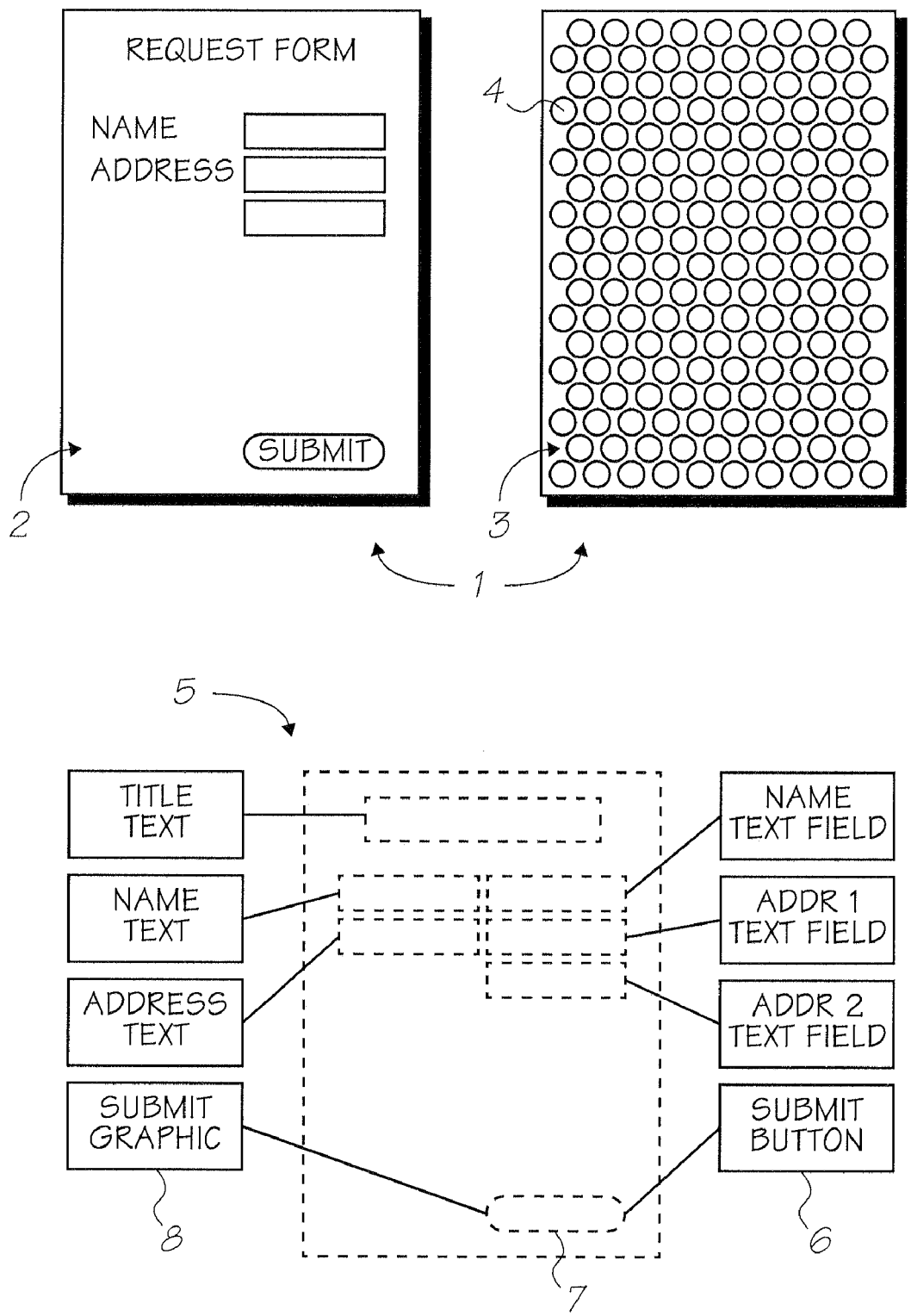
FIG. 1 is a schematic of a the relationship between a sample printed netpage and its online page description.

As illustrated in FIG. 1, a printed netpage 1 can represent an interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
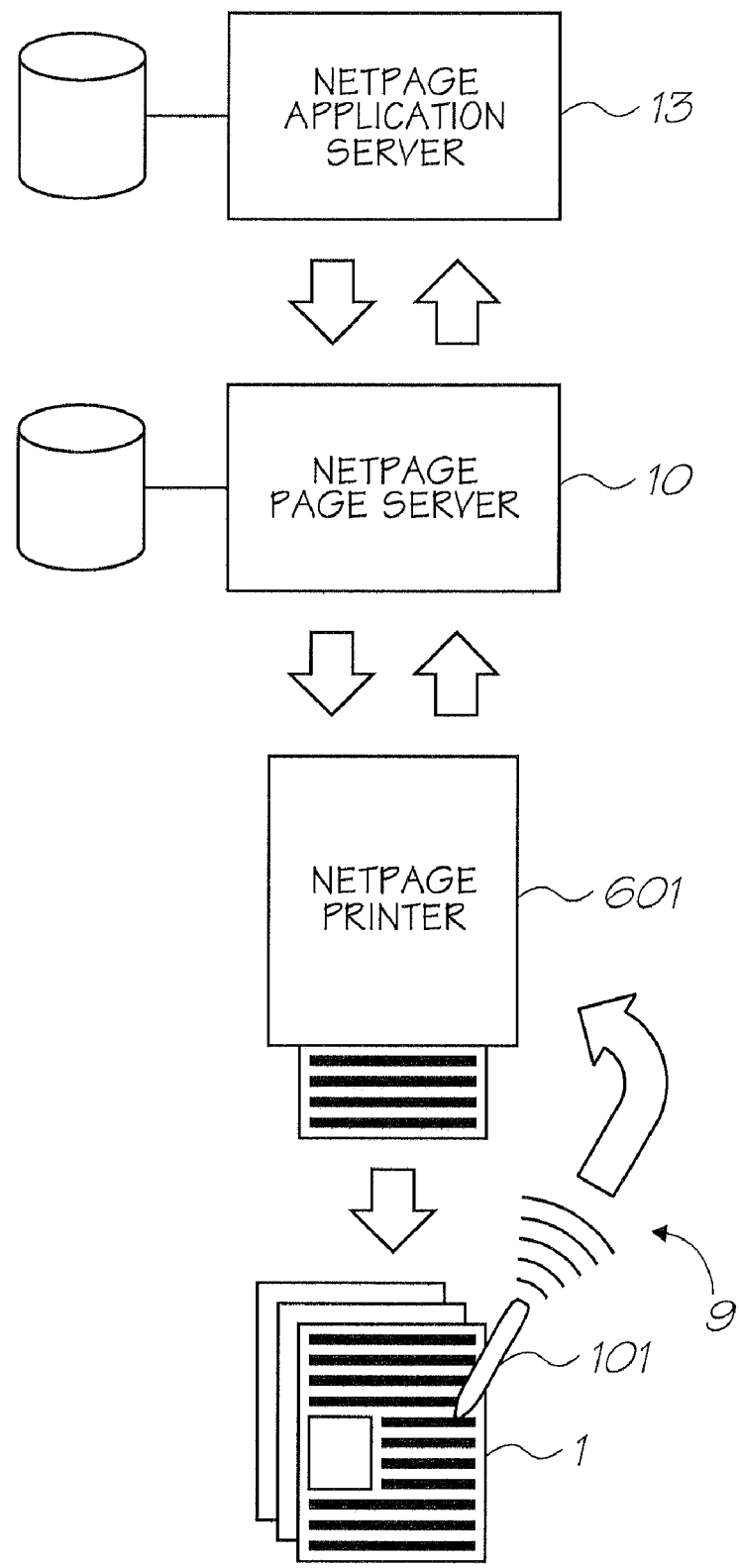
FIG. 2 is a schematic view of a interaction between a netpage pen, a netpage printer, a netpage page server, and a netpage application server.
Figure 8:
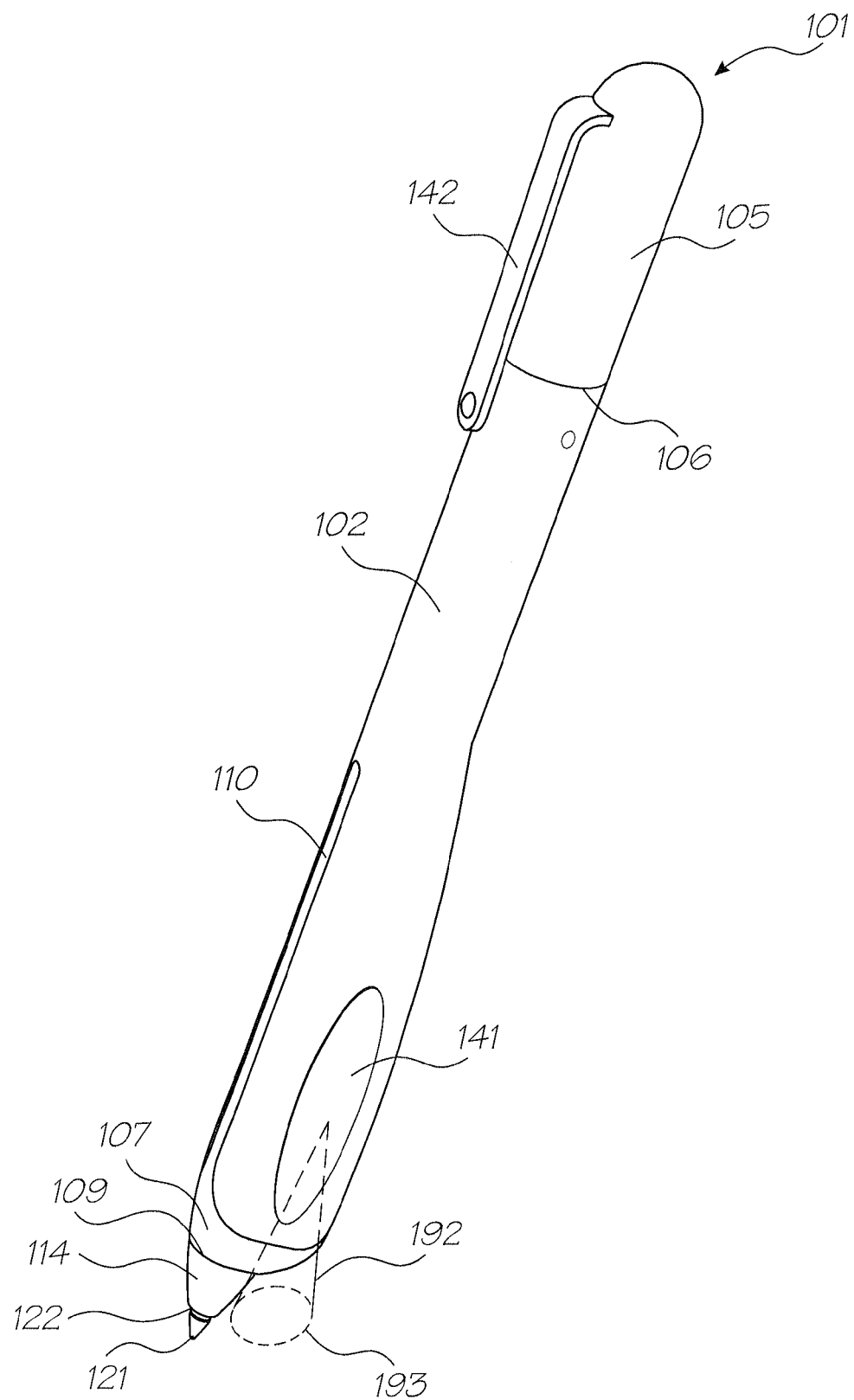
FIG. 8 is a perspective view of a netpage pen and its associated tag-sensing field-of-view cone.
Figure 9:
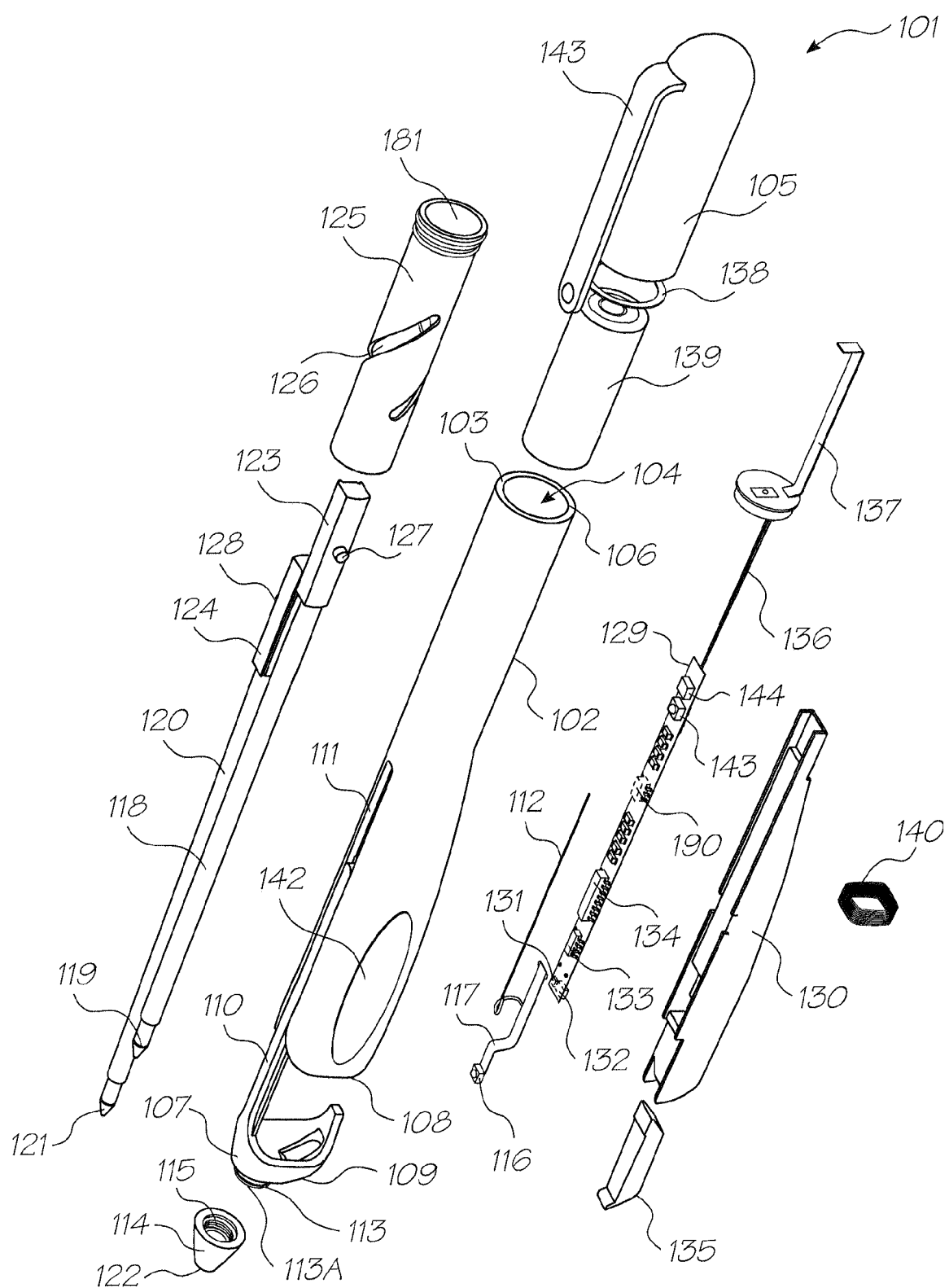
FIG. 9 is a perspective exploded view of the netpage pen shown in FIG. 8.

As illustrated in FIG. 2, the netpage pen 101, a preferred form of which is shown in FIGS. 8 and 9 and described in more detail below, works in conjunction with a netpage printer 601, an Internet-connected printing appliance for home, office or mobile use. The pen is wireless and communicates securely with the netpage printer via a short-range radio link 9.

Figure 11:
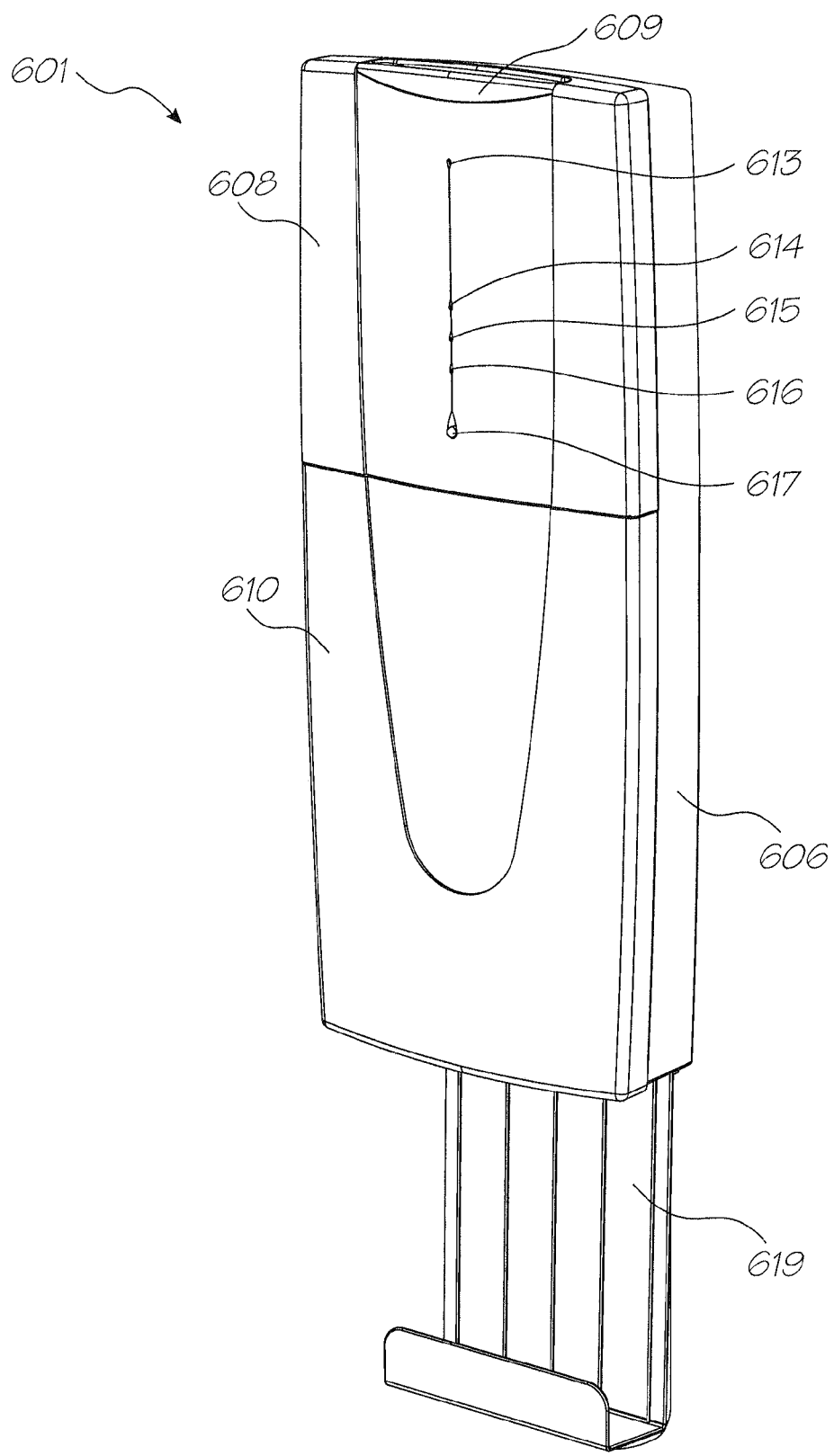
FIG. 11 is a perspective view of a wall-mounted netpage printer.
Figure 12:
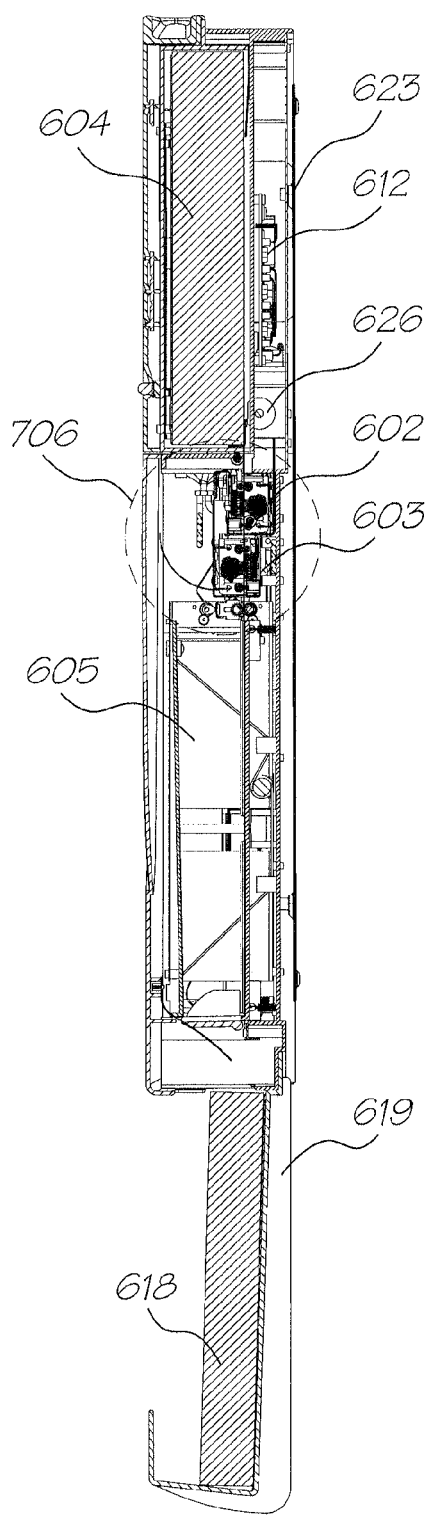
FIG. 12 is a section through the length of the netpage printer of FIG. 11.
Figure 13:
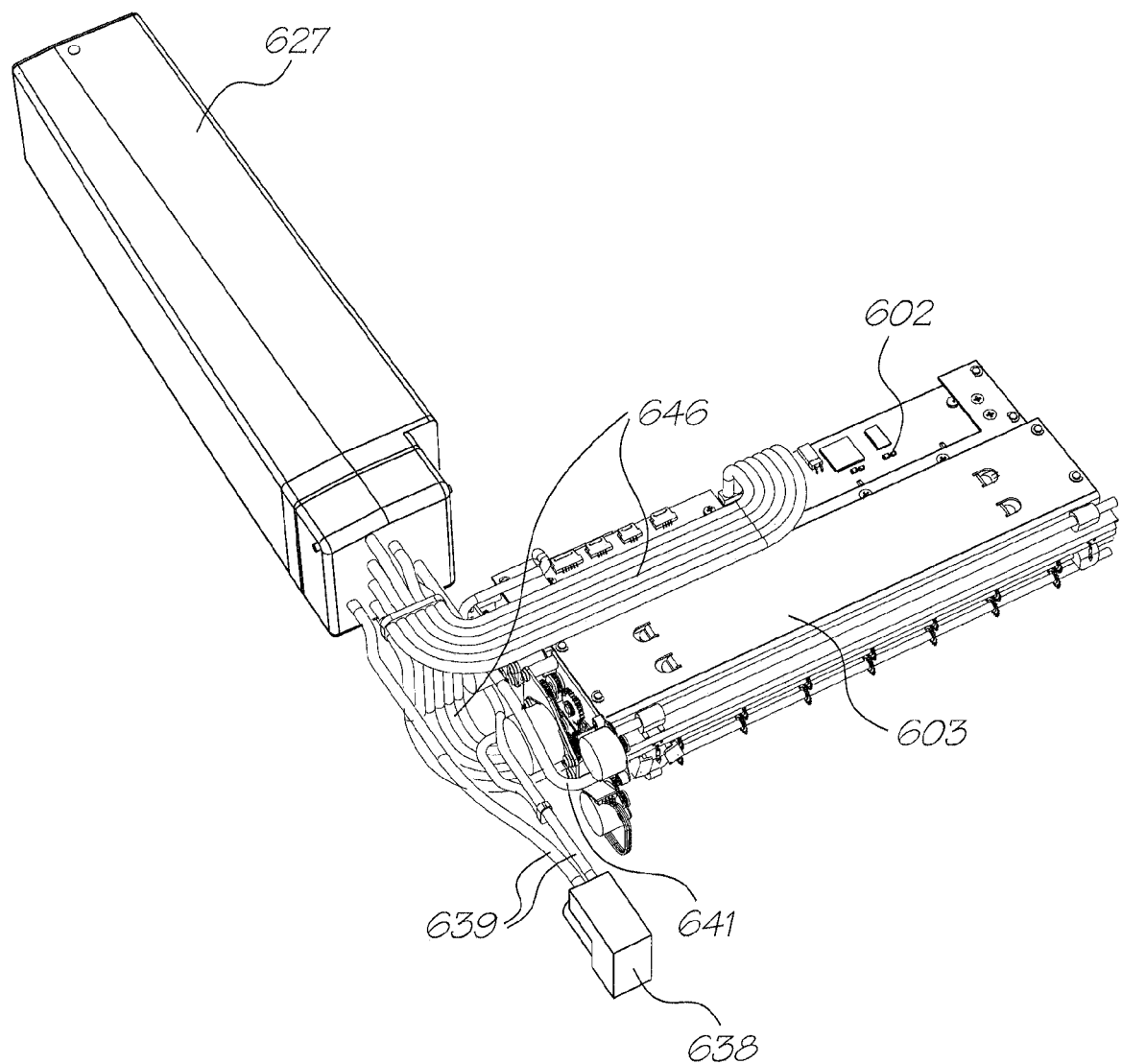
FIG. 13 is a detailed view of the ink cartridge, ink, air and glue paths, and print engines of the netpage printer of FIGS. 11 and 12.

The netpage printer 601, a preferred form of which is shown in FIGS. 11 to 13 and described in more detail below, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. Cable service is available to 95% of households in the United States, and cable modem service offering broadband Internet access is already available to 20% of these. The netpage printer can also operate with slower connections, but with longer delivery times and lower image quality. Indeed, the netpage system can be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server. A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or email address.

1 Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1.1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 4:
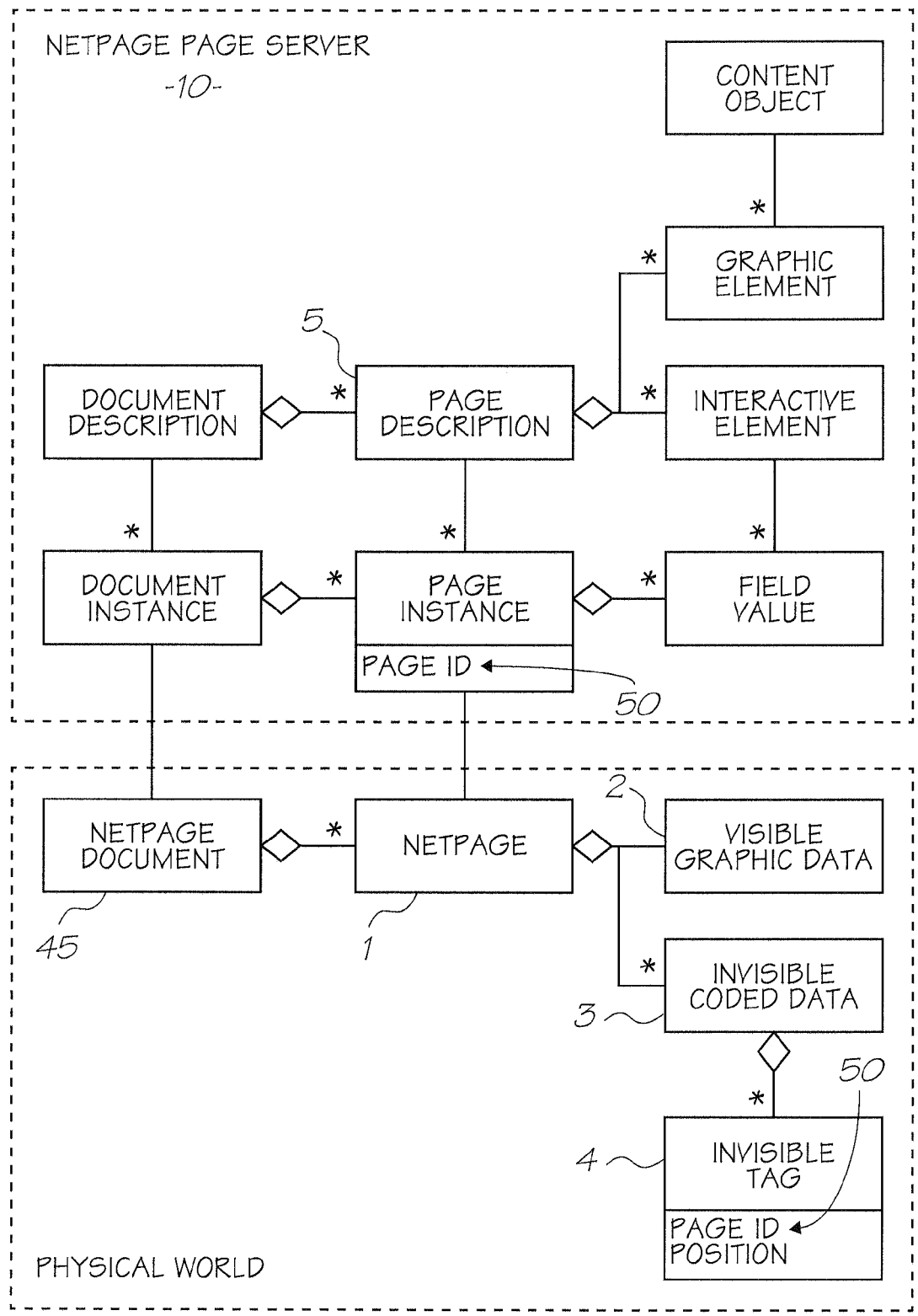
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance is associated with both the netpage printer which printed it and, if known, the netpage user who requested it.

1.2 Netpage Tags 1.2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

Tag data

| Field | Precision (bits) |
|---|---|
| Region ID | 100 |
| Tag ID | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows $2^{100}$ (~$10^{30}$ or a million trillion trillion) different regions to be uniquely identified.

1.2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

1.2.3 Physical Tag Structure

Figure 5:
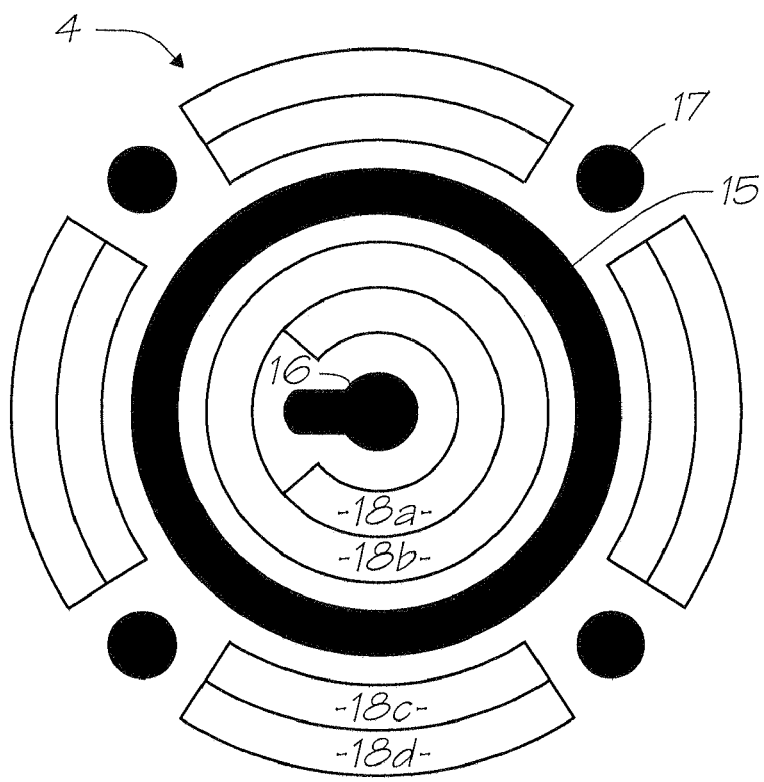
FIG. 5 is a plan view showing a structure of a netpage tag.

The physical representation of the tag, shown in FIG. 5, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag includes six target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

The overall tag shape is circular. This supports, amongst other things, optimal tag packing on an irregular triangular grid. In combination with the circular detection ring, this makes a circular arrangement of data bits within the tag optimal. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges.

The 15 4-bit data symbols of each of the six codewords are allocated to the four concentric symbol rings 18*a* to 18*d* in interleaved fashion. Symbols are allocated alternately in circular progression around the tag.

The interleaving is designed to maximise the average spatial distance between any two symbols of the same codeword.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 6:
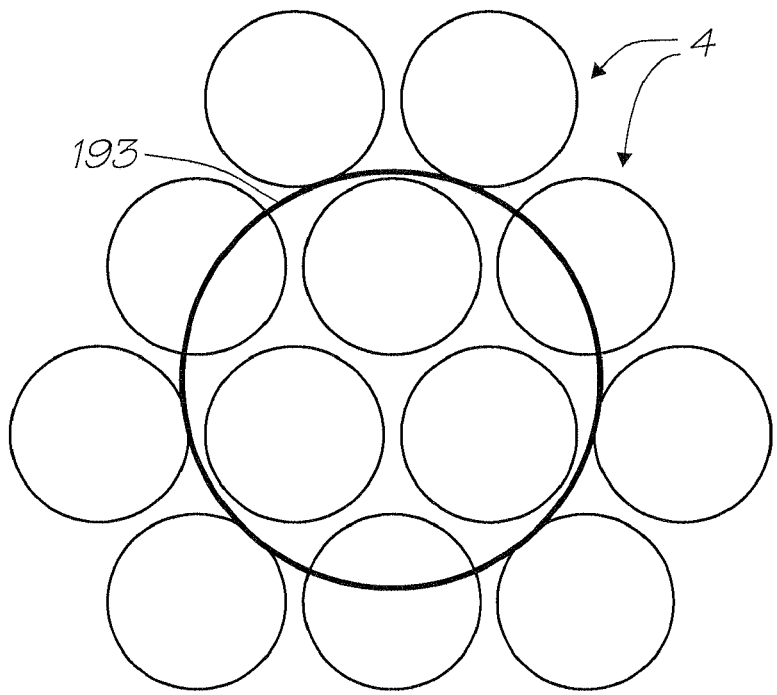
FIG. 6 is a plan view showing a relationship between a set of the tags shown in FIG. 5 and a field of view of a netpage sensing device in the form of a netpage pen.

Assuming a circular tag shape, the minimum diameter of the sensor field of view is obtained when the tags are tiled on a equilateral triangular grid, as shown in FIG. 6.

1.2.4 Tag Image Processing and Decoding

Figure 7:
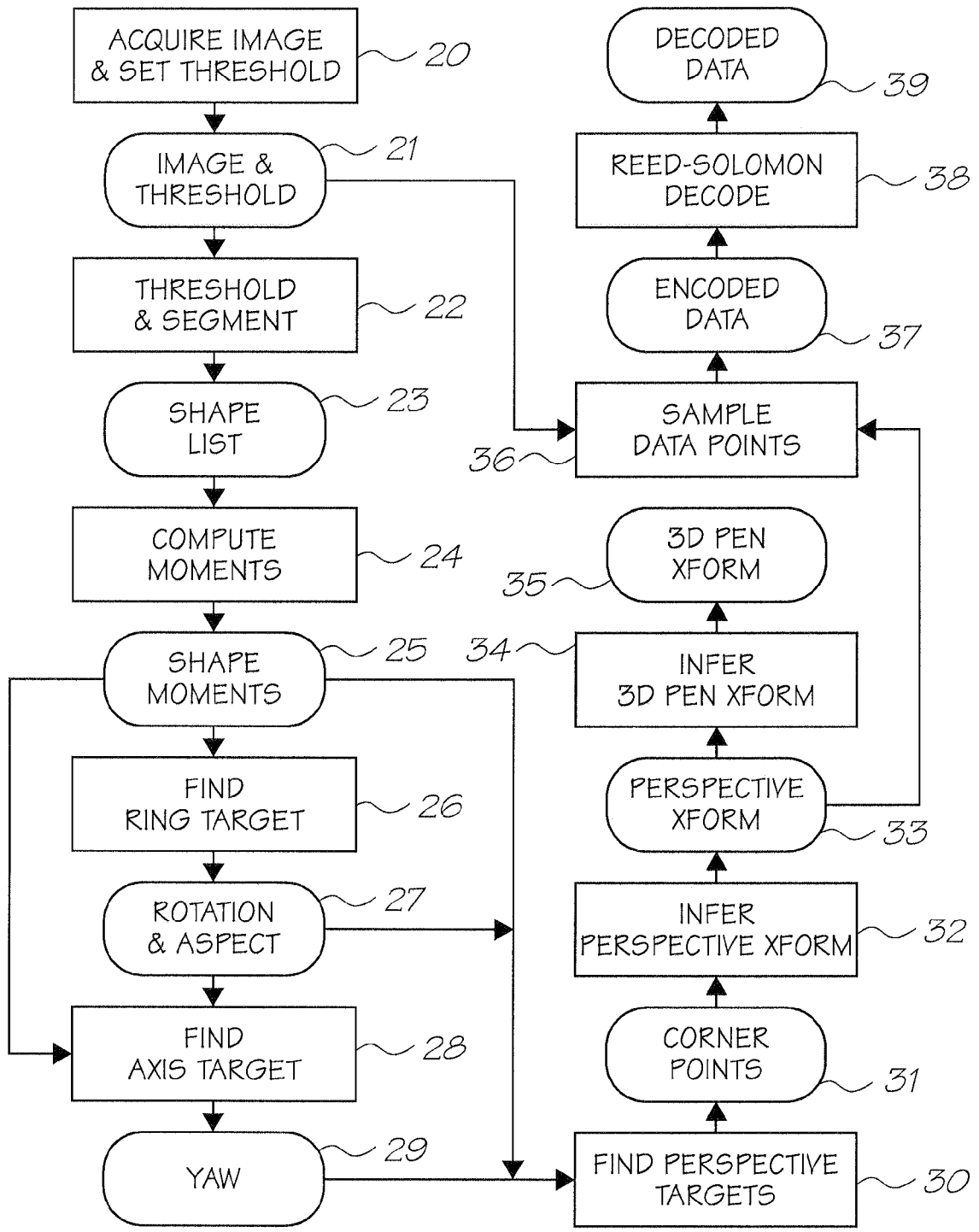
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis.

Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

1.2.5 Tag Map

Figure 22:
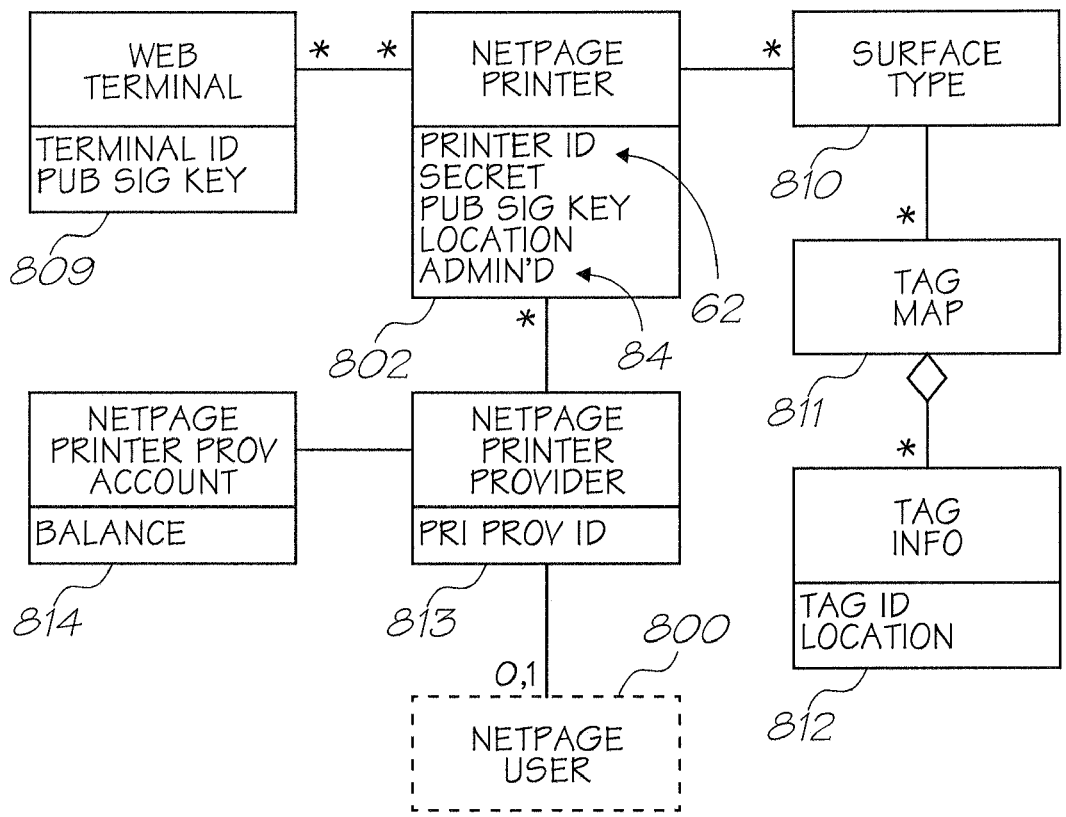
FIG. 22 is a schematic view of a printer class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

1.2.6 Tagging Schemes

Two distinct surface coding schemes are of interest, both of which use the tag structure described earlier in this section. The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

1.3 Document and Page Descriptions

Figure 25:
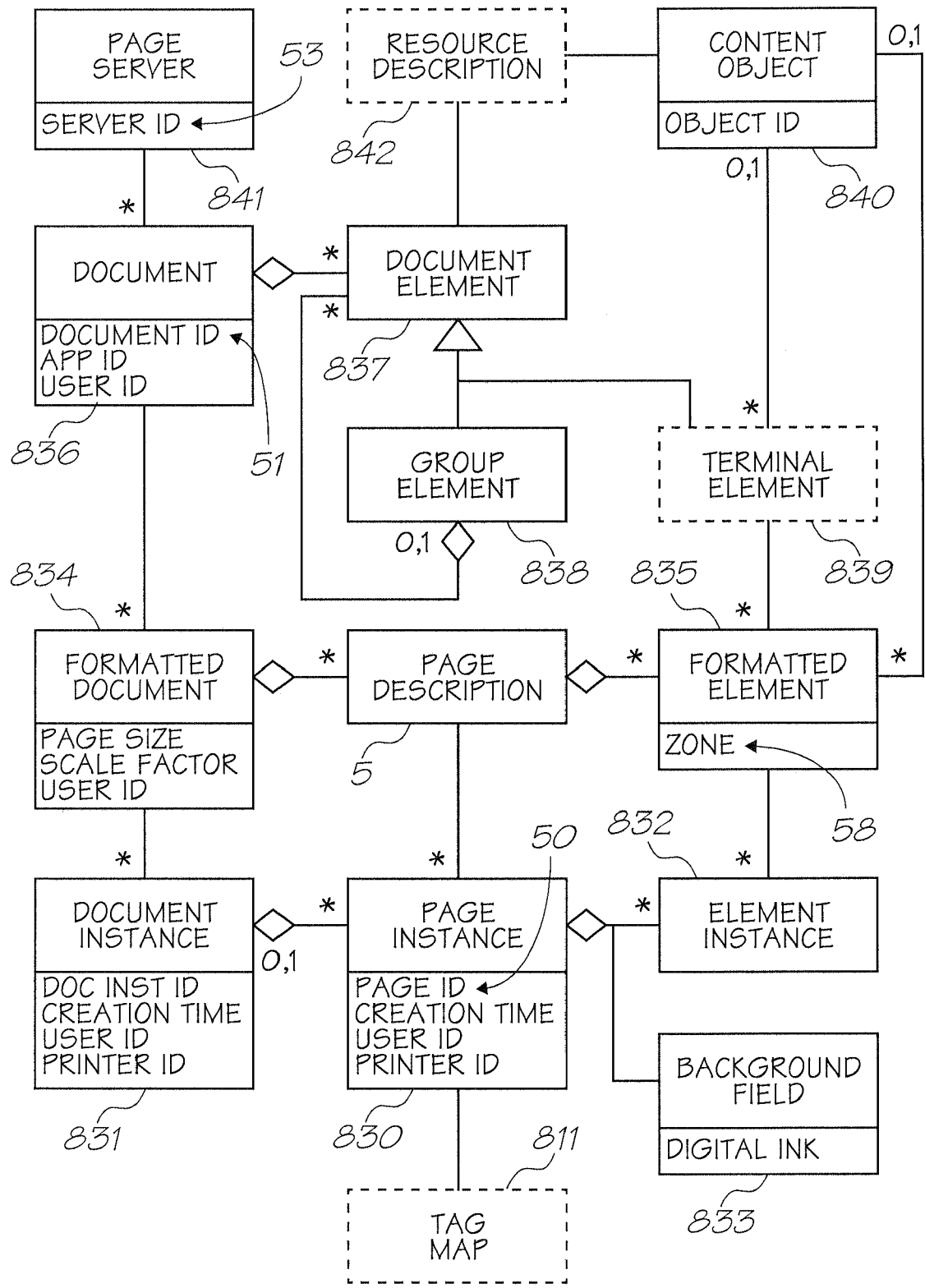
FIG. 25 is a schematic view of a document and page description class diagram.
Figure 26:
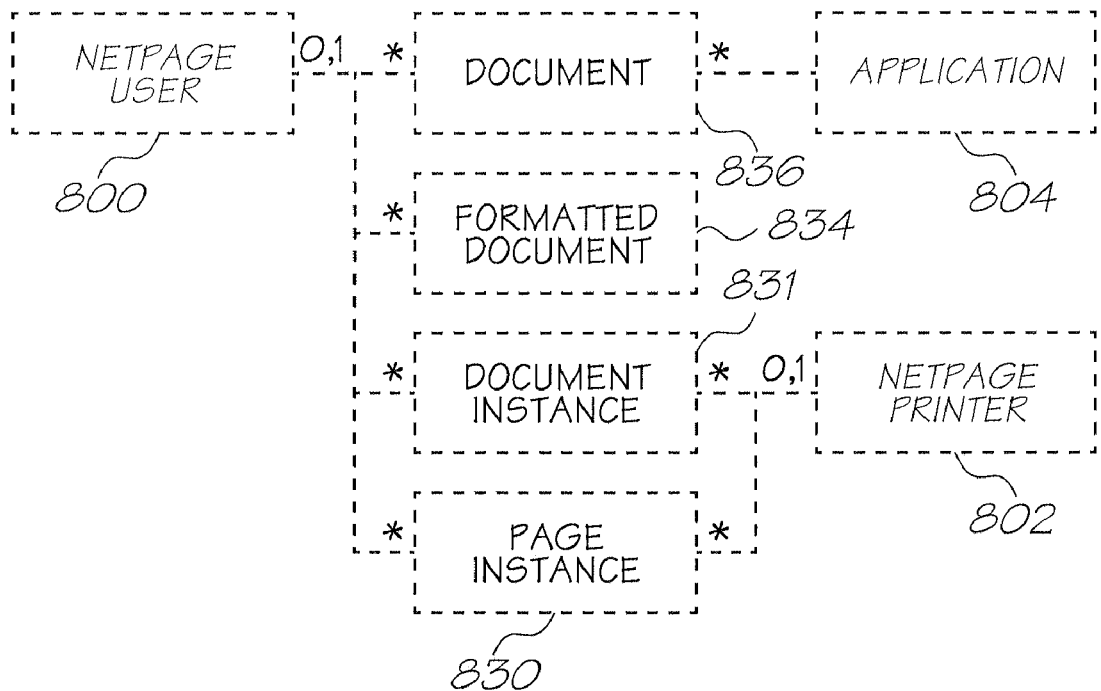
FIG. 26 is a schematic view of a document and page ownership class diagram.

A preferred embodiment of a document and page description class diagram is shown in FIGS. 25 and 26.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size and according to a particular user's scale factor preference, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a user to request a copy of a document without being forced to accept the source document's specific format. The user may be requesting a copy through a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 27:
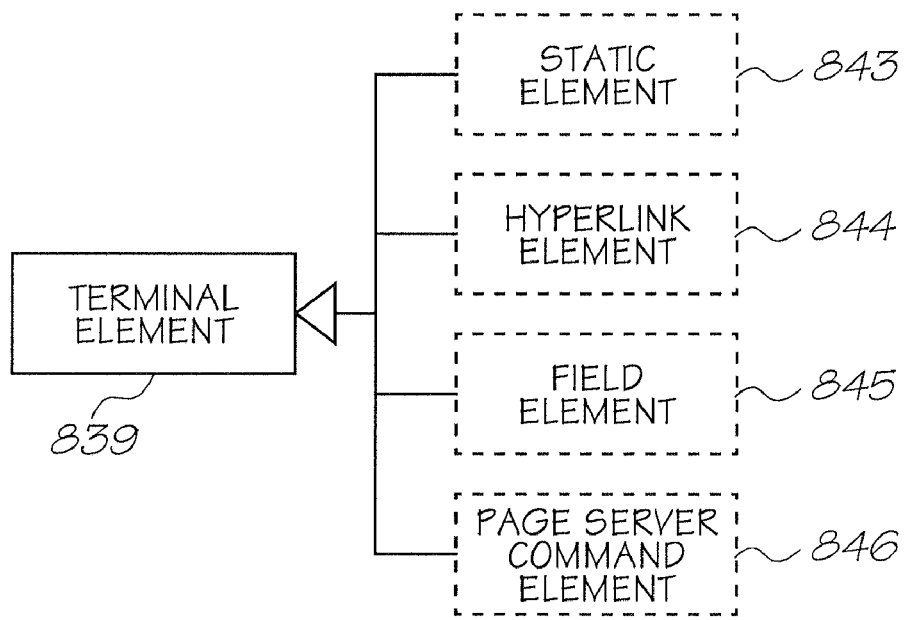
FIG. 27 is a schematic view of a terminal element specialization class diagram.
Figure 28:
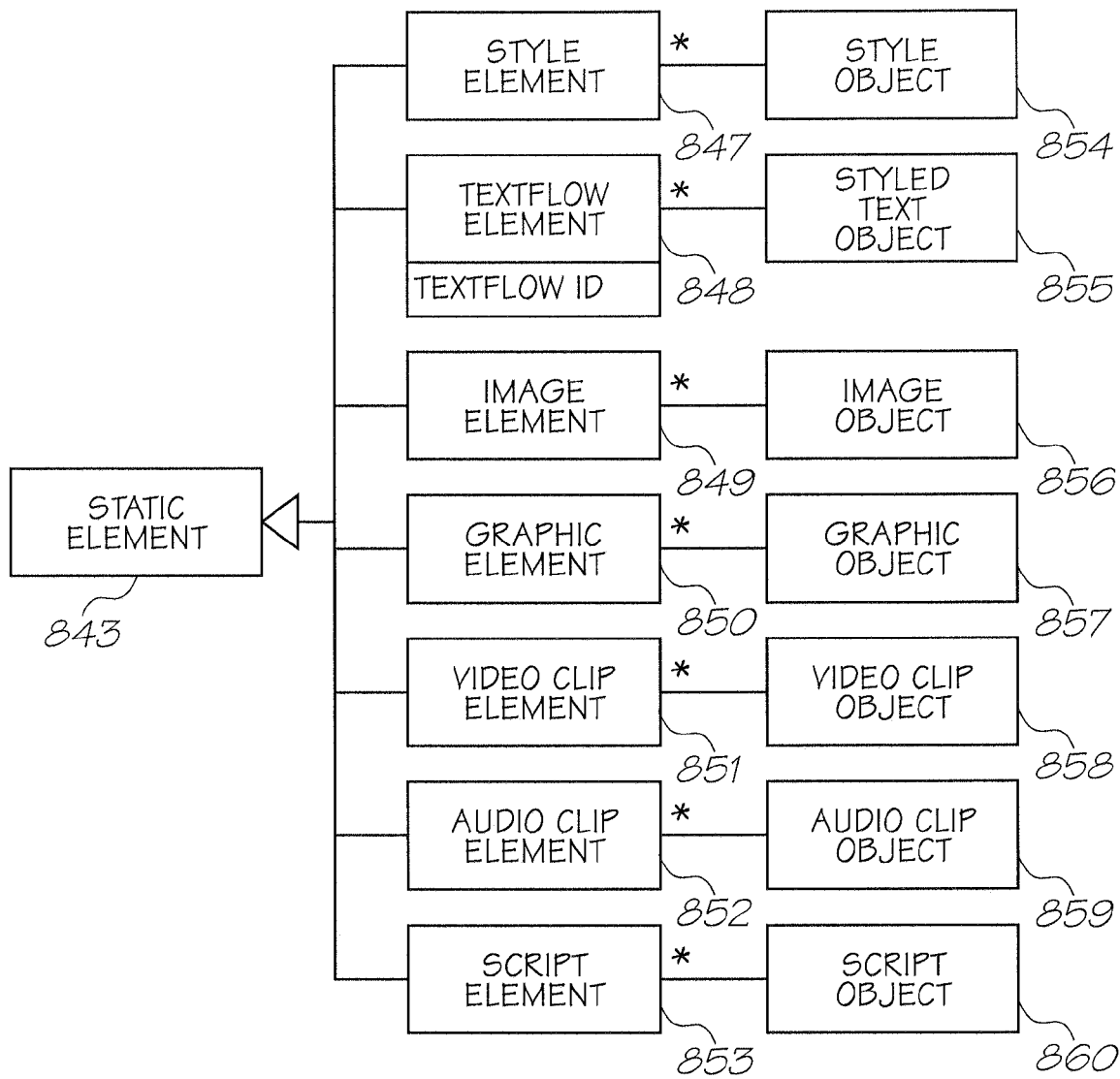
FIG. 28 is a schematic view of a static element specialization class diagram.

A terminal element can be a static element 843, a hyperlink element 844, a field element 845 or a page server command element 846, as shown in FIG. 27. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 28.

A page instance has a background field 833 which is used to record any digital ink captured on the page which does not apply to a specific input element.

In the preferred form of the invention, a tag map 811 is associated with each page instance to allow tags on the page to be translated into locations on the page.

1.4 The Netpage Network

Figure 3:
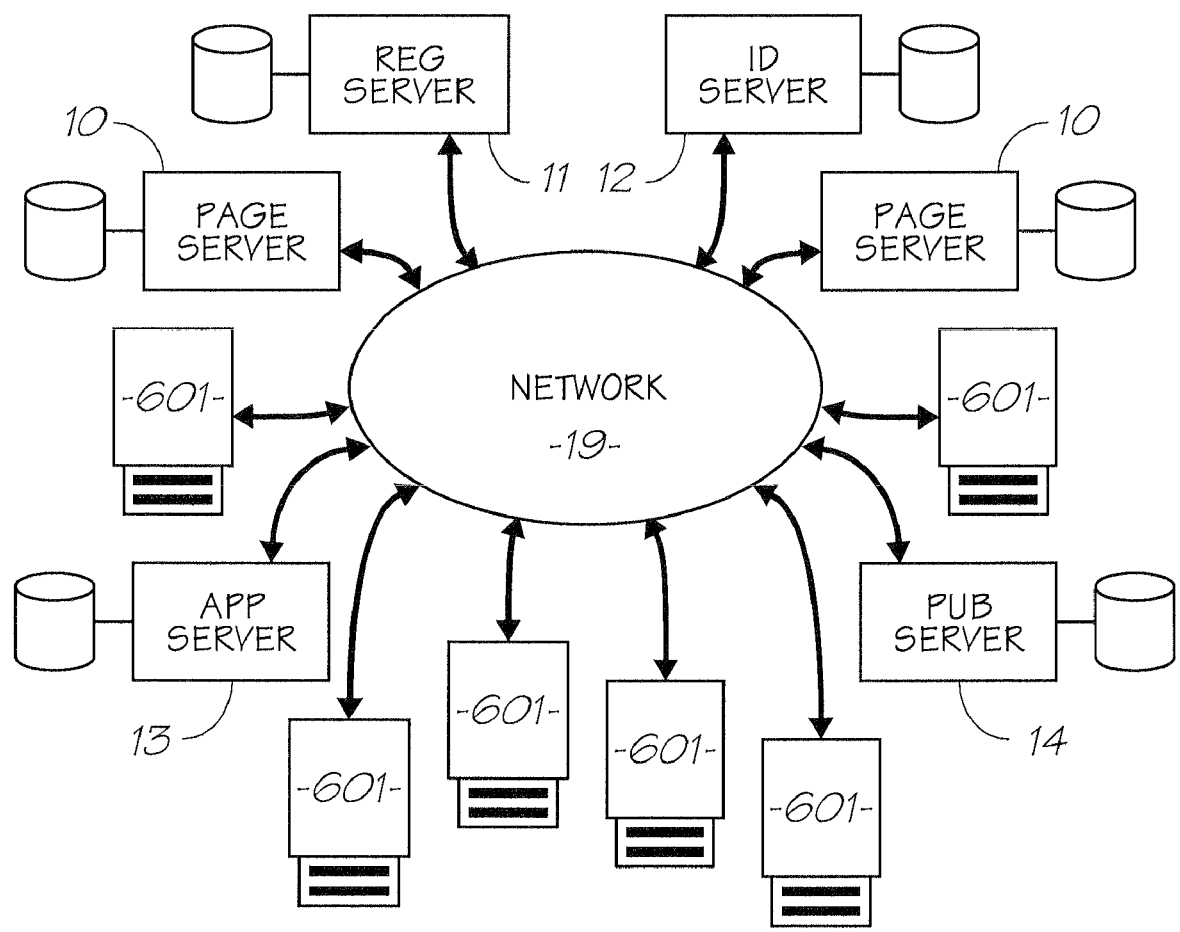
FIG. 3 illustrates a collection of netpage servers and printers interconnected via a network.

In a preferred embodiment, a netpage network consists of a distributed set of netpage page servers 10, netpage registration servers 11, netpage ID servers 12, netpage application servers 13, netpage publication servers 14, and netpage printers 601 connected via a network 19 such as the Internet, as shown in FIG. 3.

The netpage registration server 11 is a server which records relationships between users, pens, printers, applications and publications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage printers send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage printer uses the Internet Distributed Name System (DNS), or similar, to resolve a netpage page ID 50 into the network address of the netpage page server handling the corresponding page instance.

A netpage application server 13 is a server which hosts interactive netpage applications. A netpage publication server 14 is an application server which publishes netpage documents to netpage printers. They are described in detail in Section 2.

Netpage servers can be hosted on a variety of network server platforms from manufacturers such as IBM, Hewlett-Packard, and Sun. Multiple netpage servers can run concurrently on a single host, and a single server can be distributed over a number of hosts.

Some or all of the functionality provided by netpage servers, and in particular the functionality provided by the ID server and the page server, can also be provided directly in a netpage appliance such as a netpage printer, in a computer workstation, or on a local network.

1.5 The Netpage Printer

The netpage printer 601 is an appliance which is registered with the netpage system and prints netpage documents on demand and via subscription. Each printer has a unique printer ID 62, and is connected to the netpage network via a network such as the Internet, ideally via a broadband connection.

Apart from identity and security settings in non-volatile memory, the netpage printer contains no persistent storage. As far as a user is concerned, "the network is the computer". Netpages function interactively across space and time with the help of the distributed netpage page servers 10, independently of particular netpage printers.

The netpage printer receives subscribed netpage documents from netpage publication servers 14. Each document is distributed in two parts: the page layouts, and the actual text and image objects which populate the pages. Because of personalization, page layouts are typically specific to a particular subscriber and so are pointcast to the subscriber's printer via the appropriate page server. Text and image objects, on the other hand, are typically shared with other subscribers, and so are multicast to all subscribers' printers and the appropriate page servers.

The netpage publication server optimizes the segmentation of document content into pointcasts and multicasts. After receiving the pointcast of a document's page layouts, the printer knows which multicasts, if any, to listen to.

Once the printer has received the complete page layouts and objects that define the document to be printed, it can print the document.

The printer rasterizes and prints odd and even pages simultaneously on both sides of the sheet. It contains duplexed print engine controllers 760 and print engines utilizing Memjet™ printheads 350 for this purpose.

The printing process consists of two decoupled stages: rasterization of page descriptions, and expansion and printing of page images. The raster image processor (RIP) consists of one or more standard DSPs 757 running in parallel. The duplexed print engine controllers consist of custom processors which expand, dither and print page images in real time, synchronized with the operation of the printheads in the print engines.

Printers not enabled for IR printing have the option to print tags using IR-absorptive black ink, although this restricts tags to otherwise empty areas of the page. Although such pages have more limited functionality than IR-printed pages, they are still classed as netpages.

A normal netpage printer prints netpages on sheets of paper. More specialised netpage printers may print onto more specialised surfaces, such as globes. Each printer supports at least one surface type, and supports at least one tag tiling scheme, and hence tag map, for each surface type. The tag map 811 which describes the tag tiling scheme actually used to print a document becomes associated with that document so that the document's tags can be correctly interpreted.

FIG. 2 shows the netpage printer class diagram, reflecting printer-related information maintained by a registration server 11 on the netpage network.

A preferred embodiment of the netpage printer is described in greater detail in Section 6 below, with reference to FIGS. 11 to 16.

1.5.1 Memjet™ Printheads

The netpage system can operate using printers made with a wide range of digital printing technologies, including thermal inkjet, piezoelectric inkjet, laser electrophotographic, and others. However, for wide consumer acceptance, it is desirable that a netpage printer have the following characteristics:
    photographic quality color printing
    high quality text printing
    high reliability
    low printer cost
    low ink cost
    low paper cost
    simple operation
    nearly silent printing
    high printing speed
    simultaneous double sided printing
    compact form factor
    low power consumption No commercially available printing technology has all of these characteristics.

Figure 17:
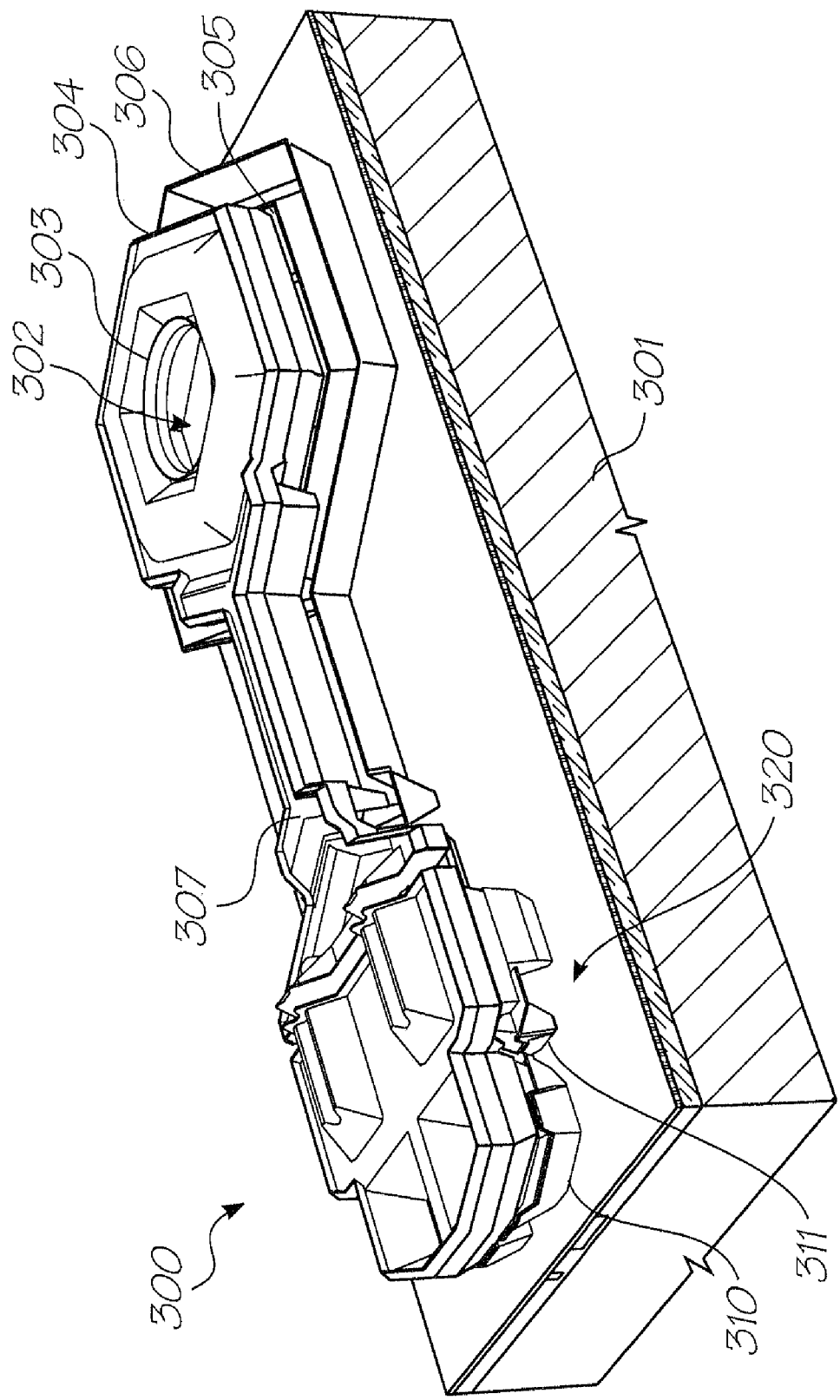
FIG. 17 is a perspective view of a single Memjet™ printing element, as used in, for example, the netpage printer of FIGS. 10 to 12.

To enable to production of printers with these characteristics, the present applicant has invented a new print technology, referred to as Memjet™ technology. Memjet™ is a drop-on-demand inkjet technology that incorporates pagewidth printheads fabricated using microelectromechanical systems (MEMS) technology. FIG. 17 shows a single printing element 300 of a Memjet™ printhead. The netpage wallprinter incorporates 168960 printing elements 300 to form a 1600 dpi pagewidth duplex printer. This printer simultaneously prints cyan, magenta, yellow, black, and infrared inks as well as paper conditioner and ink fixative.

The printing element 300 is approximately 110 microns long by 32 microns wide. Arrays of these printing elements are formed on a silicon substrate 301 that incorporates CMOS logic, data transfer, timing, and drive circuits (not shown).

Major elements of the printing element 300 are the nozzle 302, the nozzle rim 303, the nozzle chamber 304, the fluidic seal 305, the ink channel rim 306, the lever arm 307, the active actuator beam pair 308, the passive actuator beam pair 309, the active actuator anchor 310, the passive actuator anchor 311, and the ink inlet 312.

The active actuator beam pair 308 is mechanically joined to the passive actuator beam pair 309 at the join 319. Both beams pairs are anchored at their respective anchor points 310 and 311. The combination of elements 308, 309, 310, 311, and 319 form a cantilevered electrothermal bend actuator 320.

Figure 18:
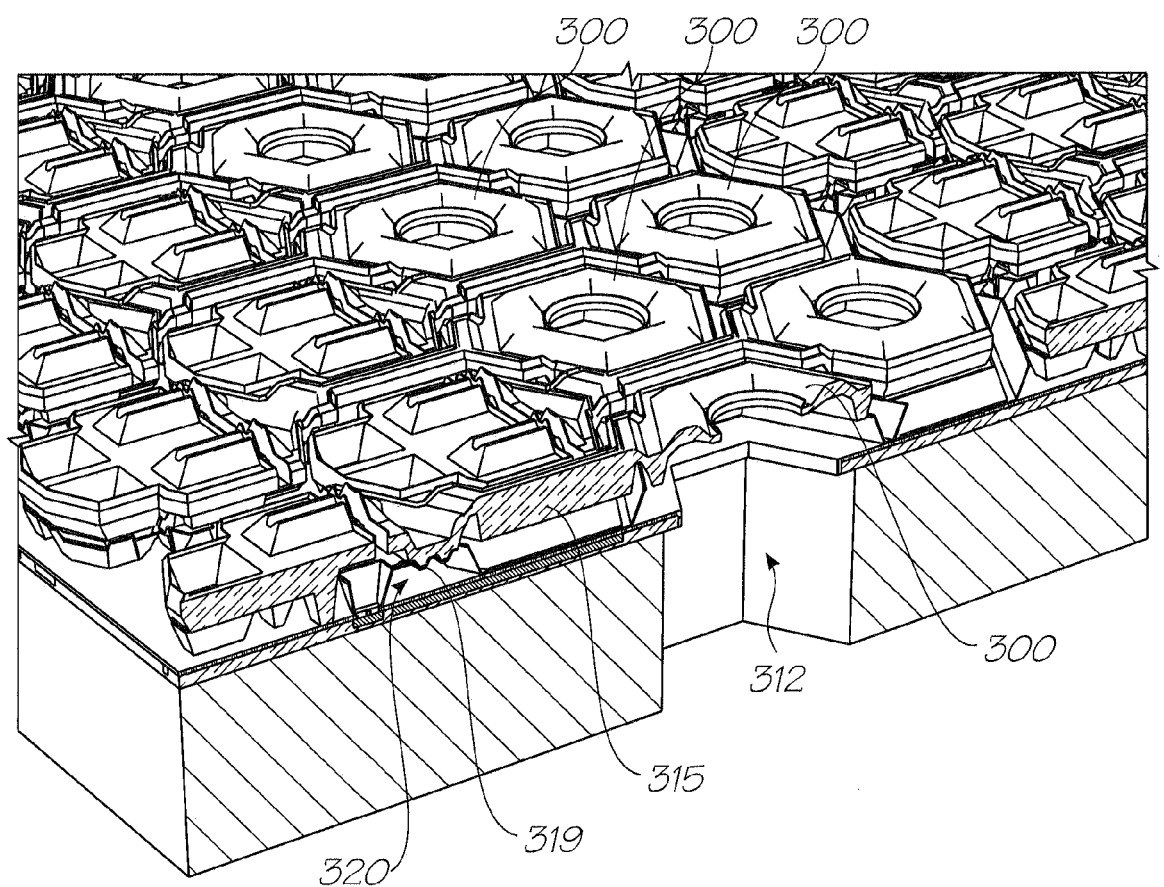
FIG. 18 is a perspective view of a small part of an array of Memjet™ printing elements.

FIG. 18 shows a small part of an array of printing elements 300, including a cross section 315 of a printing element 300. The cross section 315 is shown without ink, to clearly show the ink inlet 312 that passes through the silicon wafer 301.

Figure 19:
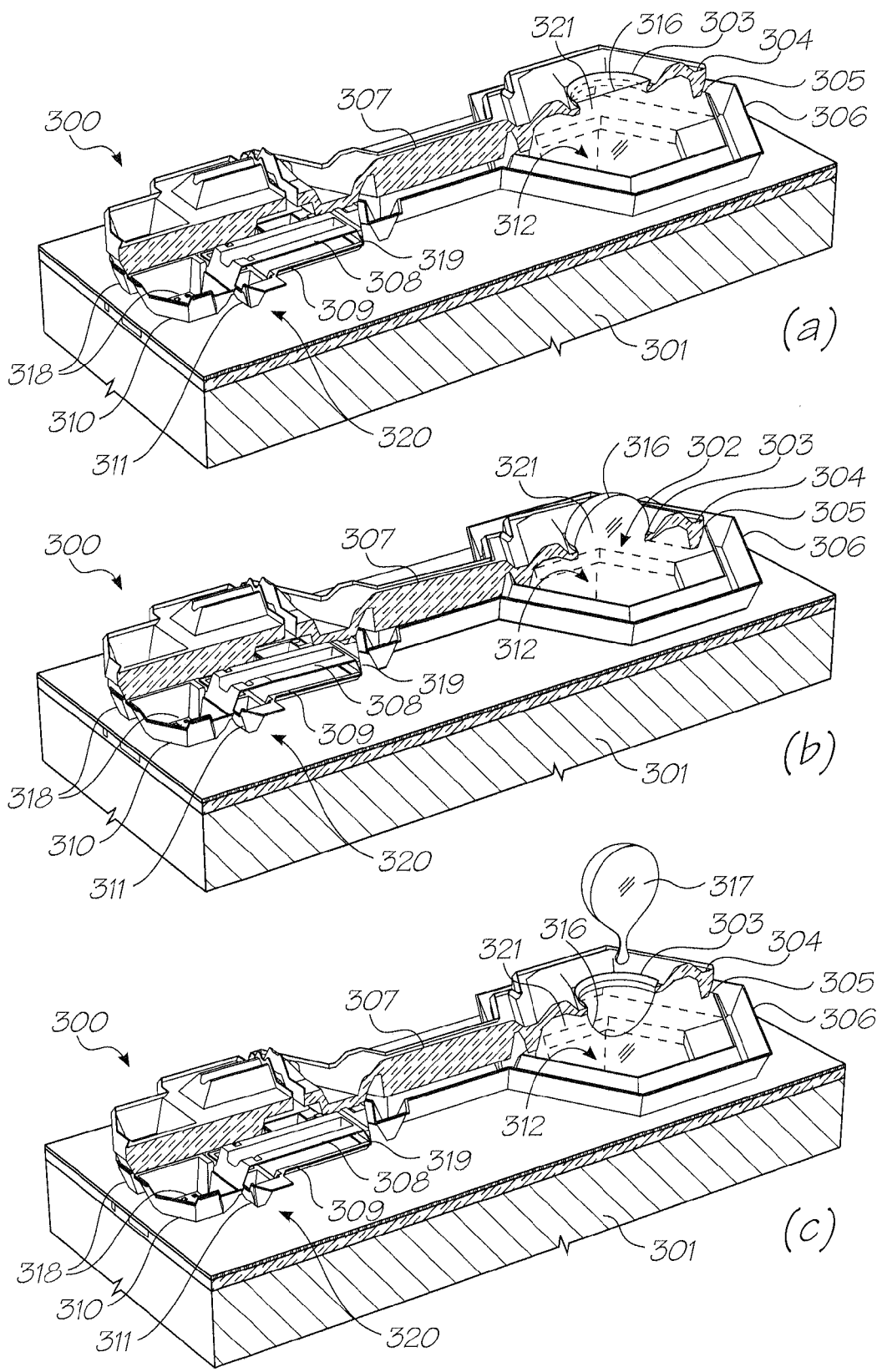
FIG. 19 is a series of perspective views illustrating the operating cycle of the Memjet™ printing element shown in FIG. 13.

FIGS. 19(*a*), 19(*b*) and 19(*c*) show the operating cycle of a Memjet™ printing element 300.

FIG. 19(*a*) shows the quiescent position of the ink meniscus 316 prior to printing an ink droplet. Ink is retained in the nozzle chamber by surface tension at the ink meniscus 316 and at the fluidic seal 305 formed between the nozzle chamber 304 and the ink channel rim 306.

While printing, the printhead CMOS circuitry distributes data from the print engine controller to the correct printing element, latches the data, and buffers the data to drive the electrodes 318 of the active actuator beam pair 308. This causes an electrical current to pass through the beam pair 308 for about one microsecond, resulting in Joule heating. The temperature increase resulting from Joule heating causes the beam pair 308 to expand. As the passive actuator beam pair 309 is not heated, it does not expand, resulting in a stress difference between the two beam pairs. This stress difference is partially resolved by the cantilevered end of the electrothermal bend actuator 320 bending towards the substrate 301. The lever arm 307 transmits this movement to the nozzle chamber 304. The nozzle chamber 304 moves about two microns to the position shown in FIG. 19(*b*). This increases the ink pressure, forcing ink 321 out of the nozzle 302, and causing the ink meniscus 316 to bulge. The nozzle rim 303 prevents the ink meniscus 316 from spreading across the surface of the nozzle chamber 304.

As the temperature of the beam pairs 308 and 309 equalizes, the actuator 320 returns to its original position. This aids in the break-off of the ink droplet 317 from the ink 321 in the nozzle chamber, as shown in FIG. 19(*c*). The nozzle chamber is refilled by the action of the surface tension at the meniscus 316.

Figure 20:
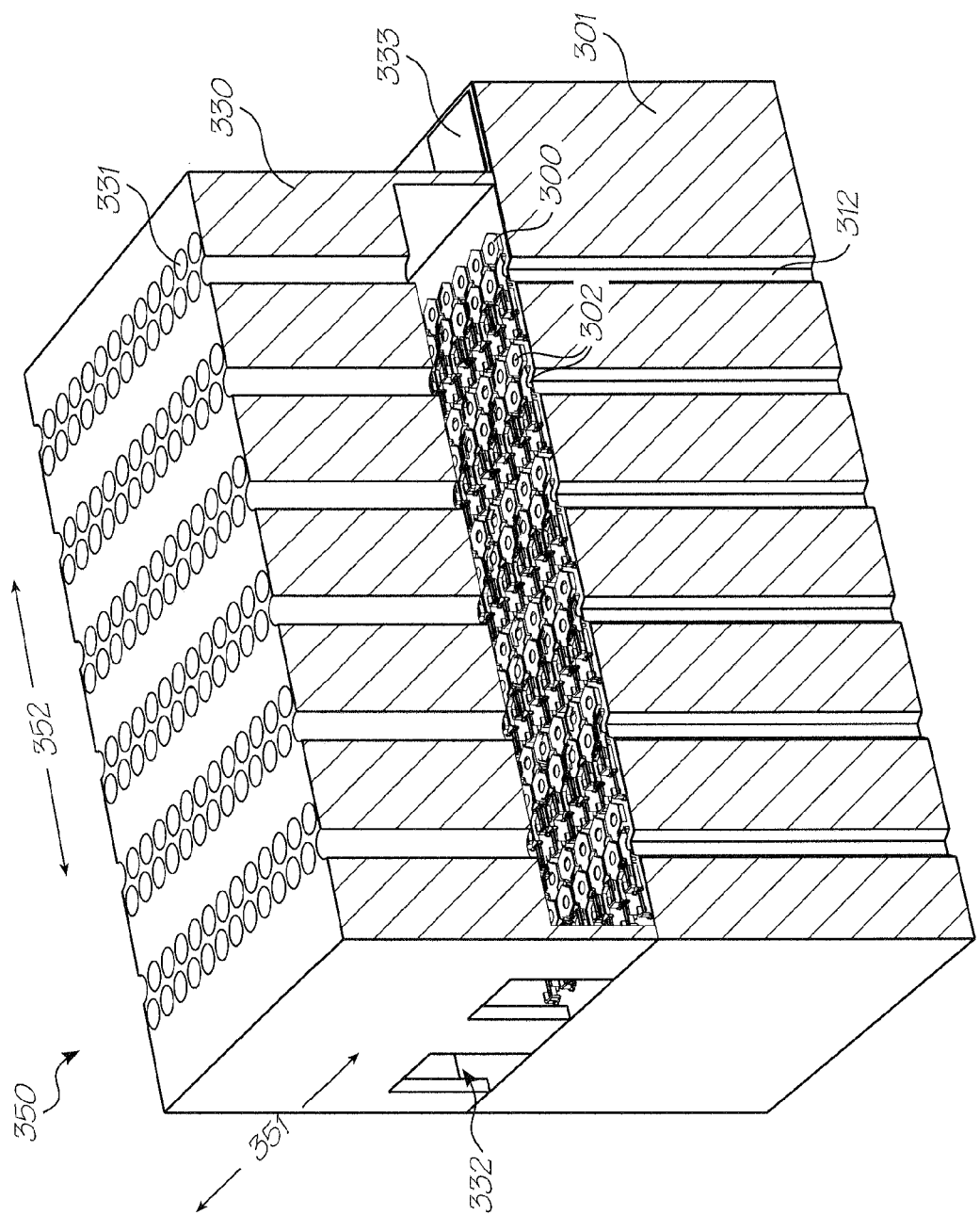
FIG. 20 is a perspective view of a short segment of a pagewidth Memjet™ printhead.
Figure 21:
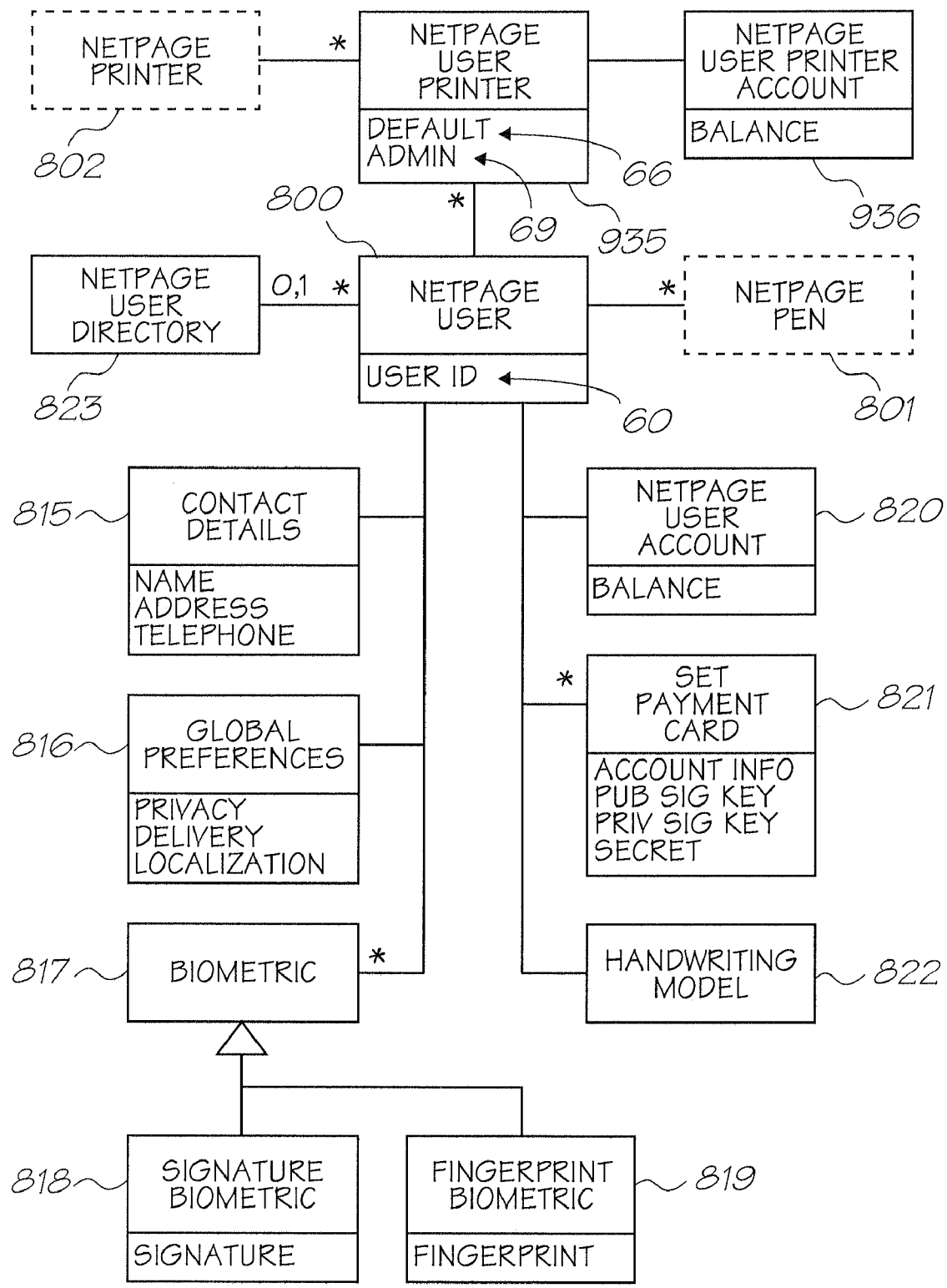
FIG. 21 is a schematic view of a user class diagram.

FIG. 20 shows a segment of a printhead 350. In a netpage printer, the length of the printhead is the full width of the paper (typically 210 mm) in the direction 351. The segment shown is 0.4 mm long (about 0.2% of a complete printhead). When printing, the paper is moved past the fixed printhead in the direction 352. The printhead has 6 rows of interdigitated printing elements 300, printing the six colors or types of ink supplied by the ink inlets 312.

To protect the fragile surface of the printhead during operation, a nozzle guard wafer 330 is attached to the printhead substrate 301. For each nozzle 302 there is a corresponding nozzle guard hole 331 through which the ink droplets are fired. To prevent the nozzle guard holes 331 from becoming blocked by paper fibers or other debris, filtered air is pumped through the air inlets 332 and out of the nozzle guard holes during printing. To prevent ink 321 from drying, the nozzle guard is sealed while the printer is idle.

1.6 The Netpage Pen

The active sensing device of the netpage system is typically a pen 101, which, using its embedded controller 134, is able to capture and decode IR position tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen is encrypted and wirelessly transmitted to the printer (or base station), the printer or base station interpreting the data with respect to the (known) page structure.

Figure 23:
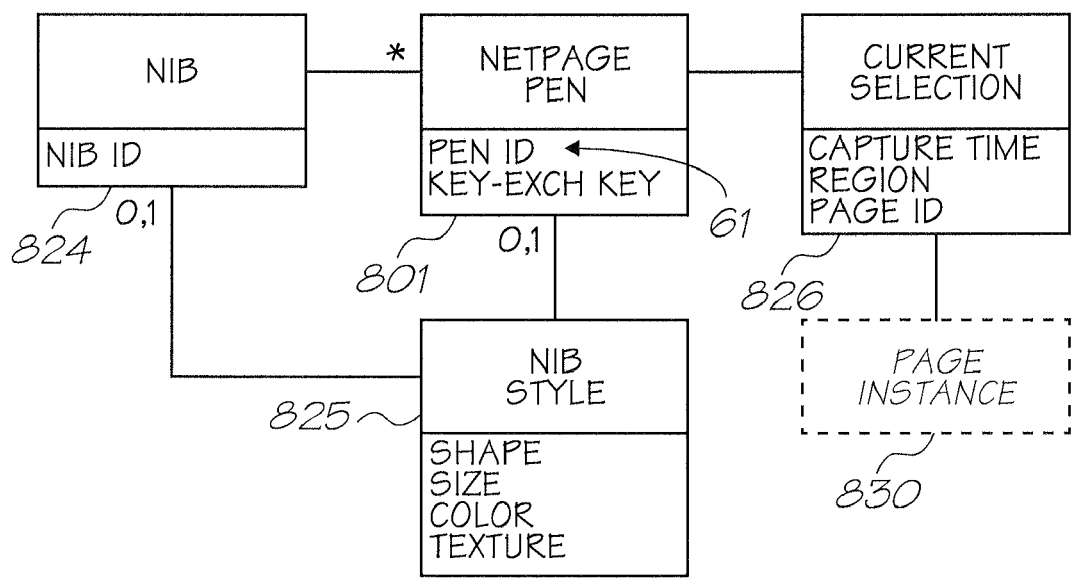
FIG. 23 is a schematic view of a pen class diagram.

The preferred embodiment of the netpage pen operates both as a normal marking ink pen and as a non-marking stylus. The marking aspect, however, is not necessary for using the netpage system as a browsing system, such as when it is used as an Internet interface. Each netpage pen is registered with the netpage system and has a unique pen ID 61. FIG. 23 shows the netpage pen class diagram, reflecting pen-related information maintained by a registration server 11 on the netpage network.

When either nib is in contact with a netpage, the pen determines its position and orientation relative to the page. The nib is attached to a force sensor, and the force on the nib is interpreted relative to a threshold to indicate whether the pen is "up" or "down". This allows a interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

Whenever the pen is within range of a printer with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the netpage printer via a short-range radio link. The transmitted digital ink is encrypted for privacy and security and packetized for efficient transmission, but is always flushed on a pen-up event to ensure timely handling in the printer.

When the pen is out-of-range of a printer it buffers digital ink in internal memory, which has a capacity of over ten minutes of continuous handwriting. When the pen is once again within range of a printer, it transfers any buffered digital ink.

A pen can be registered with any number of printers, but because all state data resides in netpages both on paper and on the network, it is largely immaterial which printer a pen is communicating with at any particular time.

Figure 10:
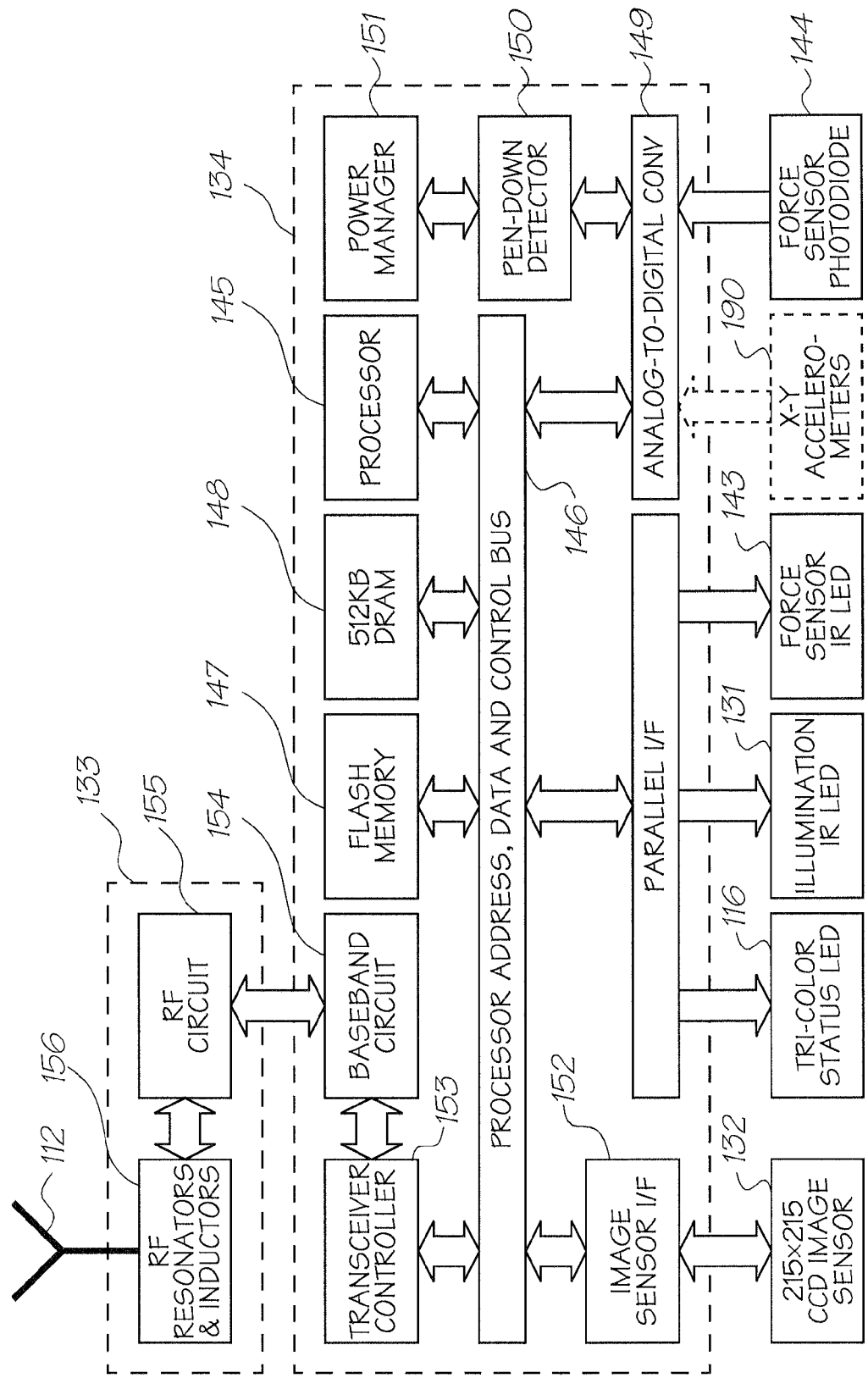
FIG. 10 is a schematic block diagram of a pen controller for the netpage pen.

A preferred embodiment of the pen is described in greater detail in Section 6 below, with reference to FIGS. 8 to 10.

1.7 Netpage Interaction

The netpage printer 601 receives data relating to a stroke from the pen 101 when the pen is used to interact with a netpage 1. The coded data 3 of the tags 4 is read by the pen when it is used to execute a movement, such as a stroke. The data allows the identity of the particular page and associated interactive element to be determined and an indication of the relative positioning of the pen relative to the page to be obtained. The indicating data is transmitted to the printer, where it resolves, via the DNS, the page ID 50 of the stroke into the network address of the netpage page server 10 which maintains the corresponding page instance 830. It then transmits the stroke to the page server. If the page was recently identified in an earlier stroke, then the printer may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register is indicated by the lack of response from the pen's "ok" LED.

There are two kinds of input elements in a netpage page description: hyperlinks and form fields. Input through a form field can also trigger the activation of an associated hyperlink.

1.7.1 Hyperlinks

A hyperlink is a means of sending a message to a remote application, and typically elicits a printed response in the netpage system.

Figure 29:
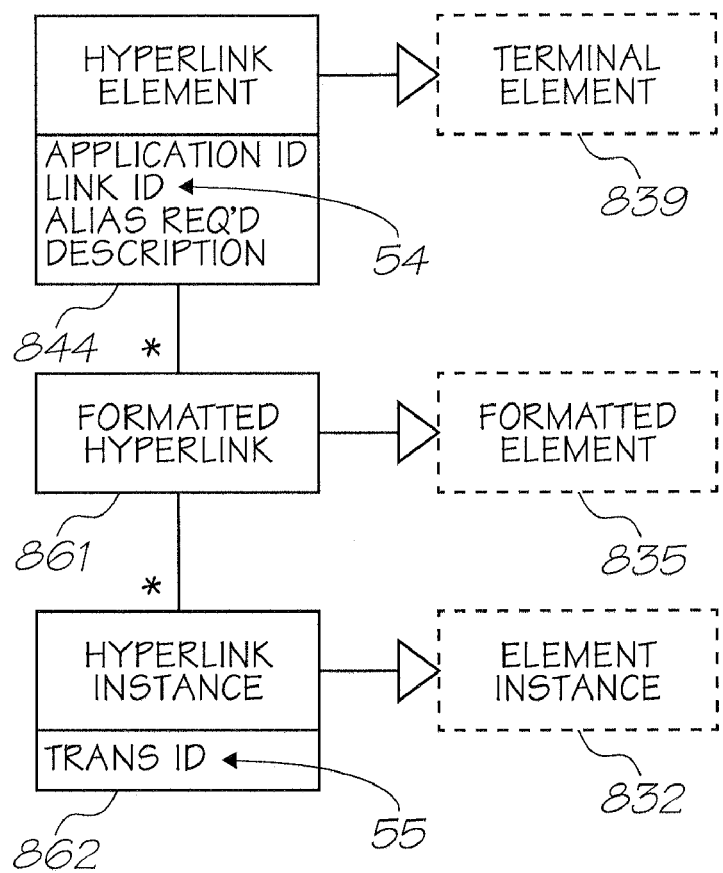
FIG. 29 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 29.

Figure 30:
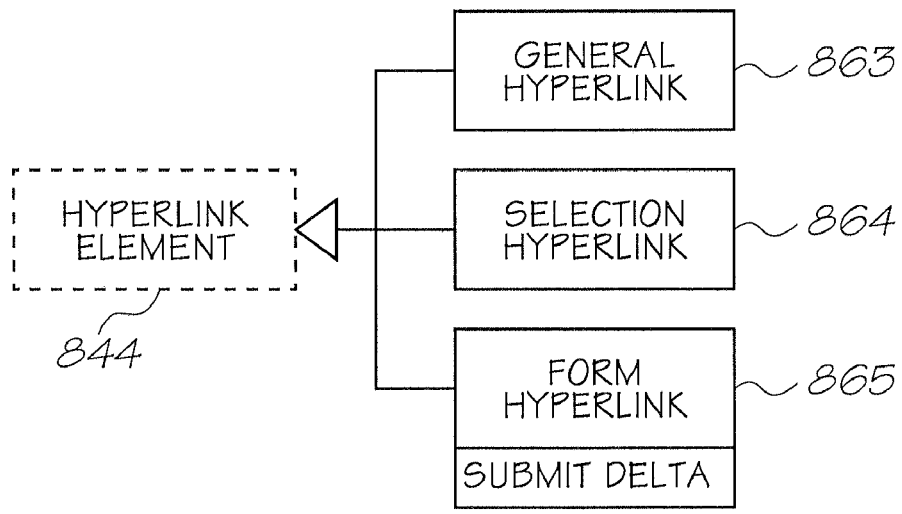
FIG. 30 is a schematic view of a hyperlink element specialization class diagram.

When a hyperlink is activated, the page server sends a request to an application somewhere on the network. The application is identified by an application ID 64, and the application ID is resolved in the normal way via the DNS. There are three types of hyperlinks: general hyperlinks 863, form hyperlinks 865, and selection hyperlinks 864, as shown in FIG. 30. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 31:
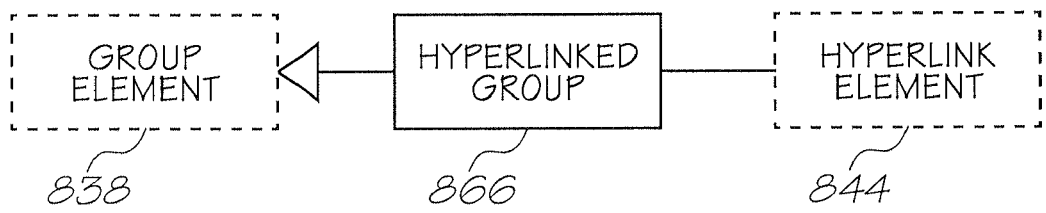
FIG. 31 is a schematic view of a hyperlinked group class diagram.

A hyperlinked group 866 is a group element 838 which has an associated hyperlink, as shown in FIG. 31. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

1.7.2 Forms

A form defines a collection of related input fields used to capture a related set of inputs through a printed netpage. A form allows a user to submit one or more parameters to an application software program running on a server.

Figure 32:
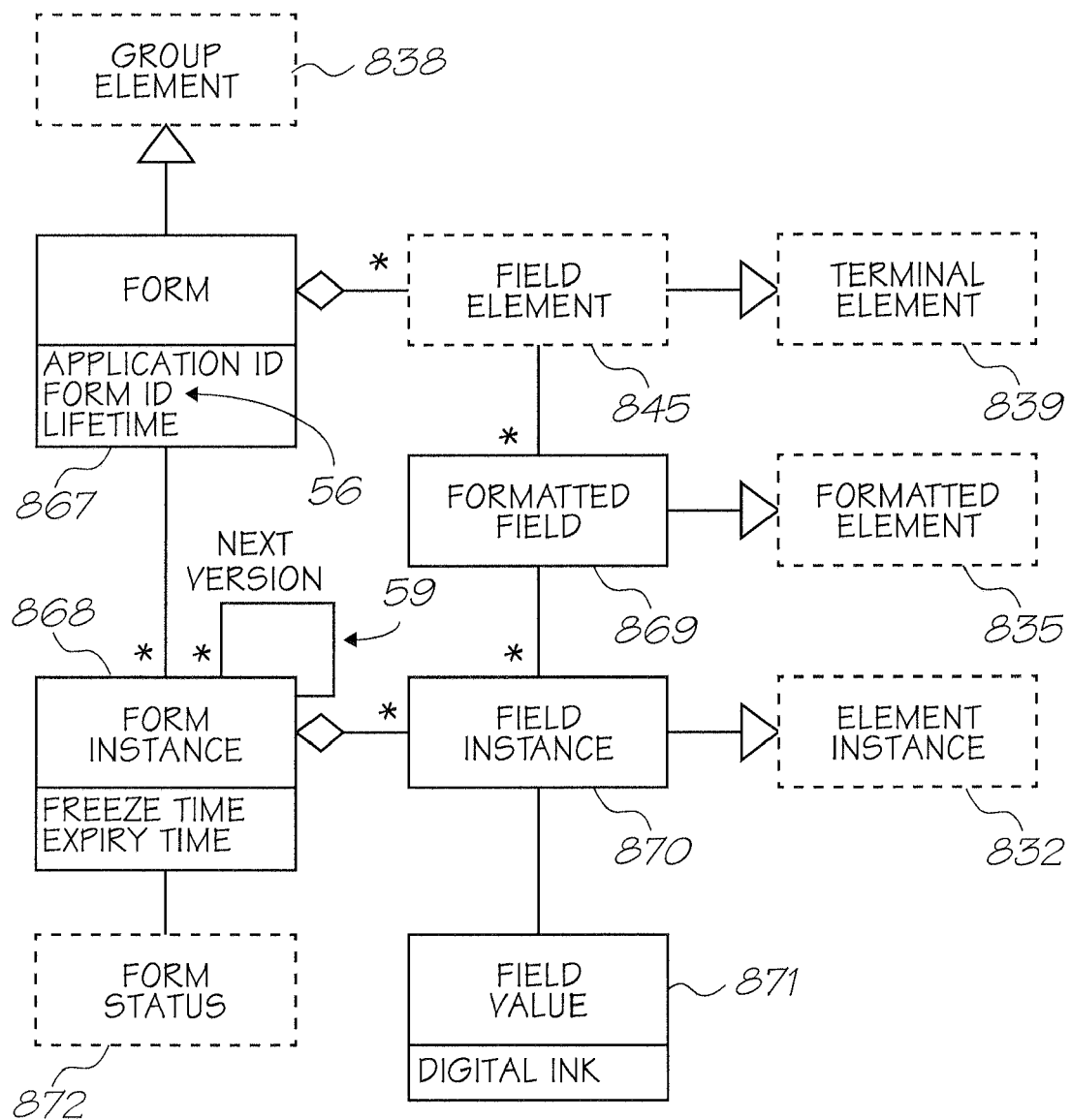
FIG. 32 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 32.

Each form instance has a status 872 which indicates whether the form is active, frozen, submitted, void or expired. A form is active when first printed. A form becomes frozen once it is signed or once its freeze time is reached. A form becomes submitted once one of its submission hyperlinks has been activated, unless the hyperlink has its "submit delta" attribute set. A form becomes void when the user invokes a void form, reset form or duplicate form page command. A form expires when its specified expiry time is reached, i.e. when the time the form has been active exceeds the form's specified lifetime. While the form is active, form input is allowed. Input through a form which is not active is instead captured in the background field 833 of the relevant page instance. When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 33:
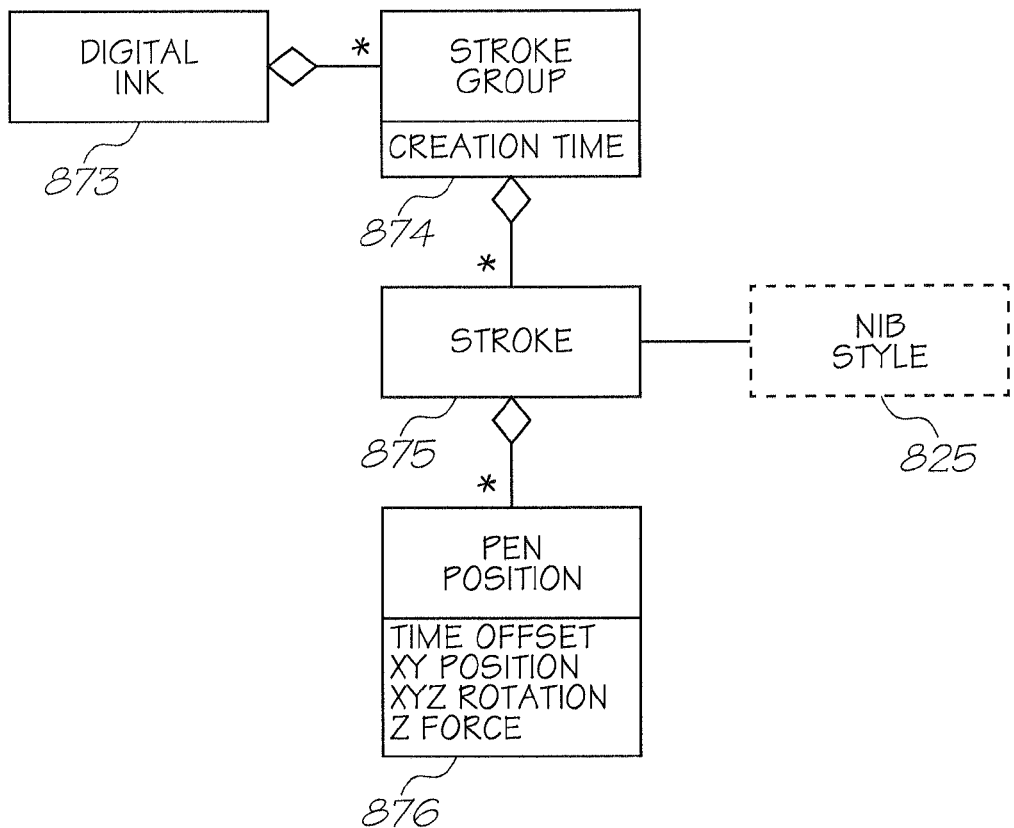
FIG. 33 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 33.

Figure 34:
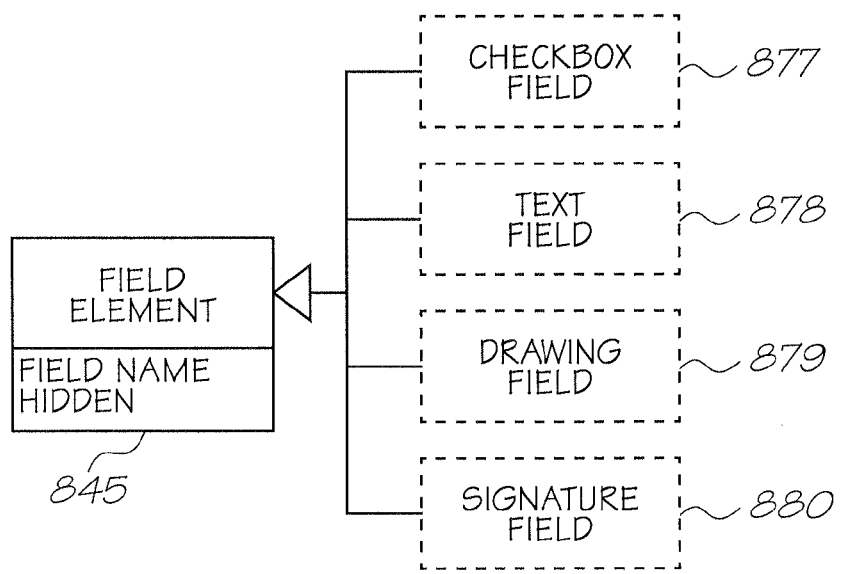
FIG. 34 is a schematic view of a field element specialization class diagram.

A field element 845 can be a checkbox field 877, a text field 878, a drawing field 879, or a signature field 880. The field element class diagram is shown in FIG. 34. Any digital ink captured in a field's zone 58 is assigned to the field.

Figure 35:
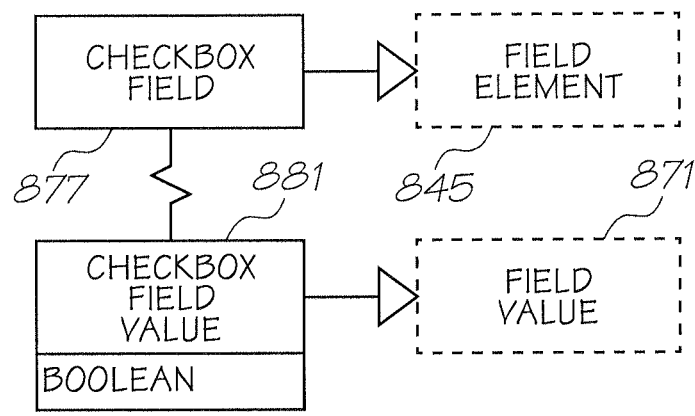
FIG. 35 is a schematic view of a checkbox field class diagram.

A checkbox field has an associated boolean value 881, as shown in FIG. 35. Any mark (a tick, a cross, a stroke, a fill zigzag, etc.) captured in a checkbox field's zone causes a true value to be assigned to the field's value.

Figure 36:
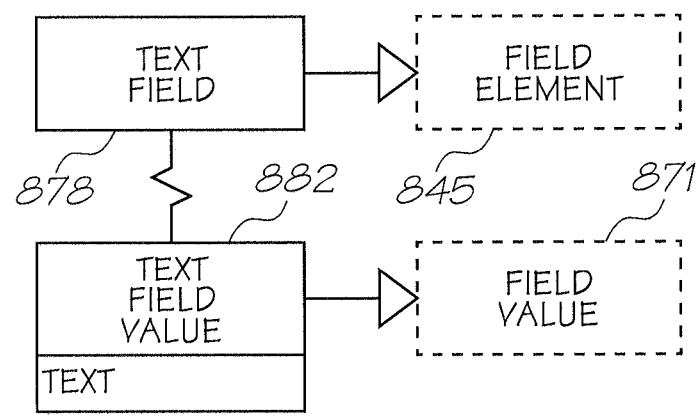
FIG. 36 is a schematic view of a text field class diagram.

A text field has an associated text value 882, as shown in FIG. 36. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, August 1990, the contents of which are herein incorporated by cross-reference).

Figure 37:
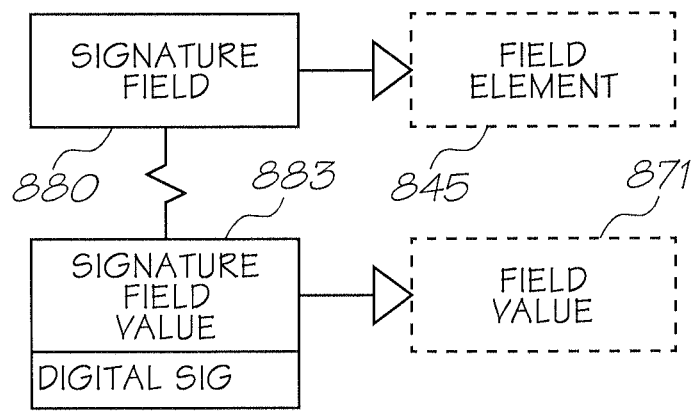
FIG. 37 is a schematic view of a signature field class diagram.

A signature field has an associated digital signature value 883, as shown in FIG. 37. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—The State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-throughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary, Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 2 summarises these various pen interactions with a netpage.

TABLE 2

Summary of pen interactions with a netpage

| Object | Type | Pen input | Action |
| --- | --- | --- | --- |
| Hyperlink | General | Click | Submit action to application |
|  | Form | Click | Submit form to application |
|  | Selection | Click | Submit selection to application |
| Form field | Checkbox | Any mark | Assign true to field |
|  | Text | Handwriting | Convert digital ink to text; assign text to field |
|  | Drawing | Digital ink | Assign digital ink to field |
|  | Signature | Signature | Verify digital ink signature; generate digital signature of form; assign digital signature to field |
| None | — | Circumscription | Assign digital ink to current selection |

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

Figure 38:
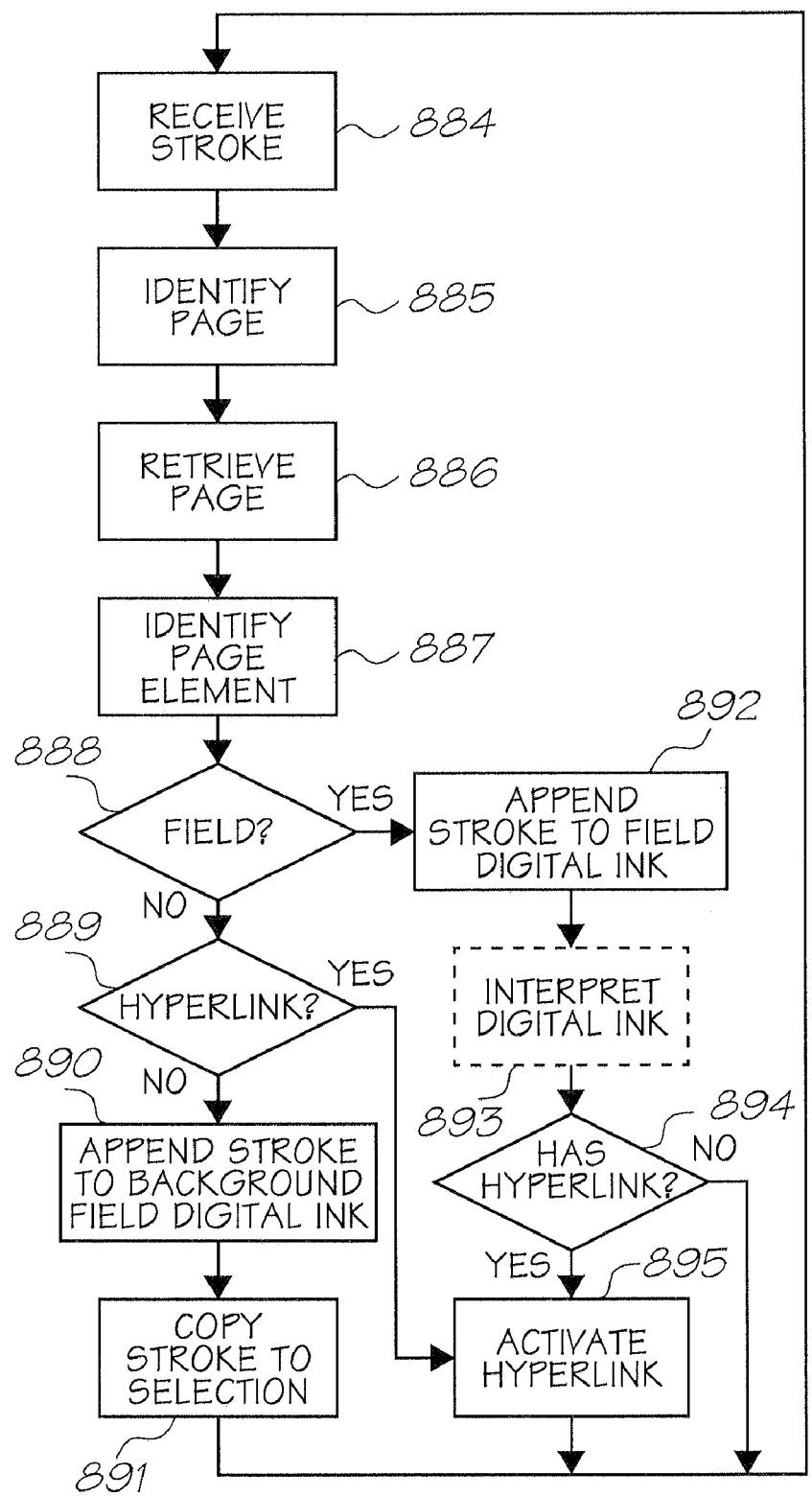
FIG. 38 is a flowchart of an input processing algorithm.

FIG. 38 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 38A:
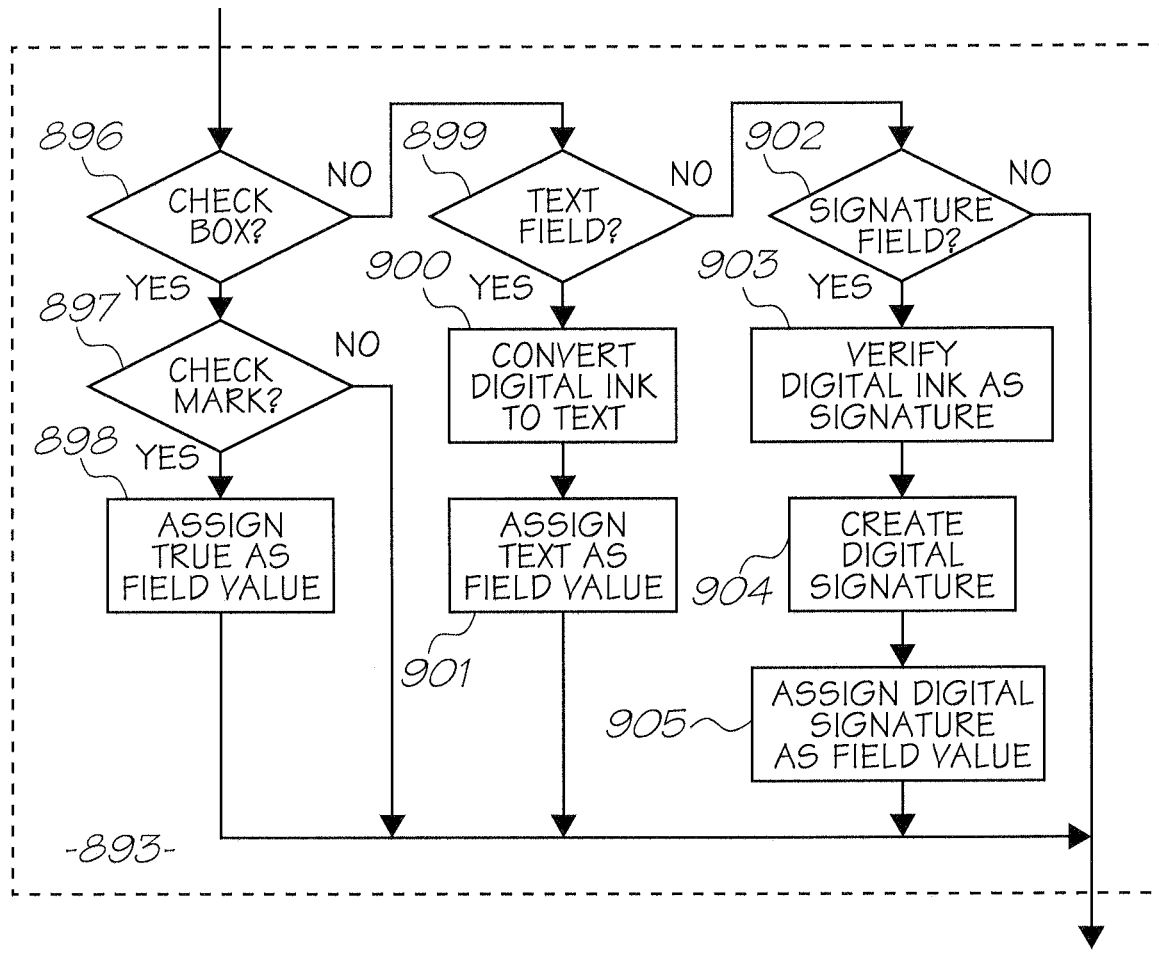
FIG. 38a is a detailed flowchart of one step of the flowchart of FIG. 38.

FIG. 38a shows a detailed flowchart of step 893 in the process shown in FIG. 38, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

1.7.3 Page Server Commands

A page server command is a command which is handled locally by the page server. It operates directly on form, page and document instances.

Figure 39:
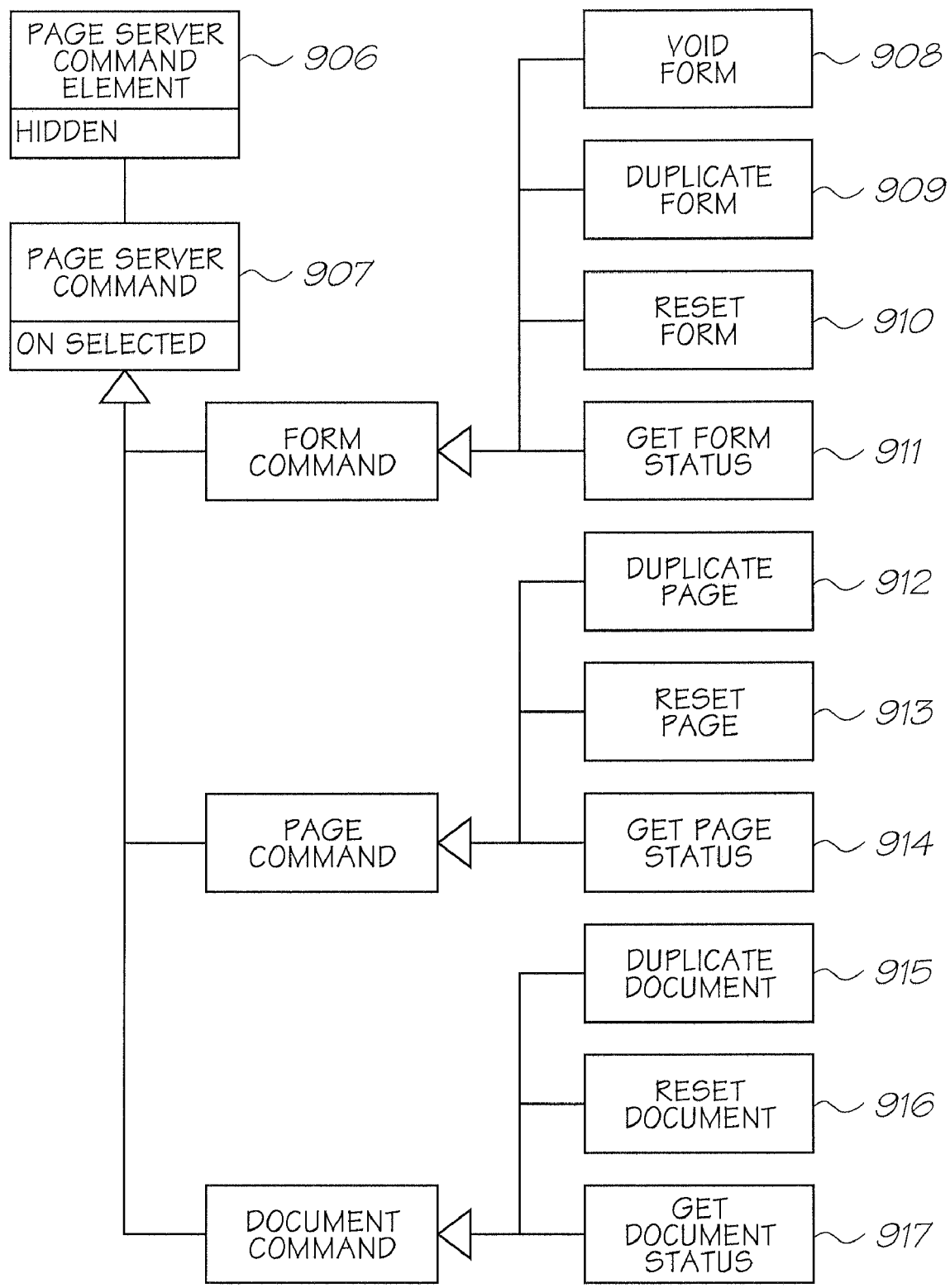
FIG. 39 is a schematic view of a page server command element class diagram.

A page server command 907 can be a void form command 908, a duplicate form command 909, a reset form command 910, a get form status command 911, a duplicate page command 912, a reset page command 913, a get page status command 914, a duplicate document command 915, a reset document command 916, or a get document status command 917, as shown in FIG. 39.

A void form command voids the corresponding form instance. A duplicate form command voids the corresponding form instance and then produces an active printed copy of the current form instance with field values preserved. The copy contains the same hyperlink transaction IDs as the original, and so is indistinguishable from the original to an application. A reset form command voids the corresponding form instance and then produces an active printed copy of the form instance with field values discarded. A get form status command produces a printed report on the status of the corresponding form instance, including who published it, when it was printed, for whom it was printed, and the form status of the form instance.

Since a form hyperlink instance contains a transaction ID, the application has to be involved in producing a new form instance. A button requesting a new form instance is therefore typically implemented as a hyperlink.

A duplicate page command produces a printed copy of the corresponding page instance with the background field value preserved. If the page contains a form or is part of a form, then the duplicate page command is interpreted as a duplicate form command. A reset page command produces a printed copy of the corresponding page instance with the background field value discarded. If the page contains a form or is part of a form, then the reset page command is interpreted as a reset form command. A get page status command produces a printed report on the status of the corresponding page instance, including who published it, when it was printed, for whom it was printed, and the status of any forms it contains or is part of.

The netpage logo which appears on every netpage is usually associated with a duplicate page element.

When a page instance is duplicated with field values preserved, field values are printed in their native form, i.e. a checkmark appears as a standard checkmark graphic, and text appears as typeset text. Only drawings and signatures appear in their original form, with a signature accompanied by a standard graphic indicating successful signature verification.

A duplicate document command produces a printed copy of the corresponding document instance with background field values preserved. If the document contains any forms, then the duplicate document command duplicates the forms in the same way a duplicate form command does. A reset document command produces a printed copy of the corresponding document instance with background field values discarded. If the document contains any forms, then the reset document command resets the forms in the same way a reset form command does. A get document status command produces a printed report on the status of the corresponding document instance, including who published it, when it was printed, for whom it was printed, and the status of any forms it contains. If the page server command's "on selected" attribute is set, then the command operates on the page identified by the pen's current selection rather than on the page containing the command. This allows a menu of page server commands to be printed. If the target page doesn't contain a page server command element for the designated page server command, then the command is ignored.

An application can provide application-specific handling by embedding the relevant page server command element in a hyperlinked group. The page server activates the hyperlink associated with the hyperlinked group rather than executing the page server command.

A page server command element is hidden if its "hidden" attribute is set. A hidden command element does not have an input zone on a page and so cannot be activated directly by a user. It can, however, be activated via a page server command embedded in a different page, if that page server command has its "on selected" attribute set.

1.8 Standard Features of Netpages

In the preferred form, each netpage is printed with the netpage logo at the bottom to indicate that it is a netpage and therefore has interactive properties. The logo also acts as a copy button. In most cases pressing the logo produces a copy of the page. In the case of a form, the button produces a copy of the entire form. And in the case of a secure document, such as a ticket or coupon, the button elicits an explanatory note or advertising page.

The default single-page copy function is handled directly by the relevant netpage page server. Special copy functions are handled by linking the logo button to an application.

1.9 User Help System

In a preferred embodiment, the netpage printer has a single button labelled "Help". When pressed it elicits a single help page 46 of information, including:
  status of printer connection
  status of printer consumables
  top-level help menu
  document function menu
  top-level netpage network directory The help menu provides a hierarchical manual on how to use the netpage system.

The document function menu includes the following functions:
  print a copy of a document
  print a clean copy of a form
  print the status of a document A document function is initiated by selecting the document and then pressing the button. The status of a document indicates who published it and when, to whom it was delivered, and to whom and when it was subsequently submitted as a form.

The help page is obviously unavailable if the printer is unable to print. In this case the "error" light is lit and the user can request remote diagnosis over the network.

2 Personalized Publication Model

In the following description, news is used as a canonical publication example to illustrate personalization mechanisms in the netpage system. Although news is often used in the limited sense of newspaper and newsmagazine news, the intended scope in the present context is wider.

In the netpage system, the editorial content and the advertising content of a news publication are personalized using different mechanisms. The editorial content is personalized according to the reader's explicitly stated and implicitly captured interest profile. The advertising content is personalized according to the reader's locality and demographic.

2.1 Editorial Personalization

A subscriber can draw on two kinds of news sources: those that deliver news publications, and those that deliver news streams. While news publications are aggregated and edited by the publisher, news streams are aggregated either by a news publisher or by a specialized news aggregator. News publications typically correspond to traditional newspapers and newsmagazines, while news streams can be many and varied: a "raw" news feed from a news service, a cartoon strip, a freelance writer's column, a friend's bulletin board, or the reader's own e-mail.

The netpage publication server supports the publication of edited news publications as well as the aggregation of multiple news streams. By handling the aggregation and hence the formatting of news streams selected directly by the reader, the server is able to place advertising on pages over which it otherwise has no editorial control.

The subscriber builds a daily newspaper by selecting one or more contributing news publications, and creating a personalized version of each. The resulting daily editions are printed and bound together into a single newspaper. The various members of a household typically express their different interests and tastes by selecting different daily publications and then customizing them.

For each publication, the reader optionally selects specific sections. Some sections appear daily, while others appear weekly. The daily sections available from The New York Times online, for example, include "Page One Plus", "National", "International", "Opinion", "Business", "Arts/Living", "Technology", and "Sports". The set of available sections is specific to a publication, as is the default subset.

The reader can extend the daily newspaper by creating custom sections, each one drawing on any number of news streams. Custom sections might be created for e-mail and friends' announcements ("Personal"), or for monitoring news feeds for specific topics ("Alerts" or "Clippings").

For each section, the reader optionally specifies its size, either qualitatively (e.g. short, medium, or long), or numerically (i.e. as a limit on its number of pages), and the desired proportion of advertising, either qualitatively (e.g. high, normal, low, none), or numerically (i.e. as a percentage).

The reader also optionally expresses a preference for a large number of shorter articles or a small number of longer articles. Each article is ideally written (or edited) in both short and long forms to support this preference.

An article may also be written (or edited) in different versions to match the expected sophistication of the reader, for example to provide children's and adults' versions. The appropriate version is selected according to the reader's age. The reader can specify a "reading age" which takes precedence over their biological age.

The articles which make up each section are selected and prioritized by the editors, and each is assigned a useful lifetime. By default they are delivered to all relevant subscribers, in priority order, subject to space constraints in the subscribers' editions.

In sections where it is appropriate, the reader may optionally enable collaborative filtering. This is then applied to articles which have a sufficiently long lifetime. Each article which qualifies for collaborative filtering is printed with rating buttons at the end of the article. The buttons can provide an easy choice (e.g. "liked" and "disliked"), making it more likely that readers will bother to rate the article.

Articles with high priorities and short lifetimes are therefore effectively considered essential reading by the editors and are delivered to most relevant subscribers.

The reader optionally specifies a serendipity factor, either qualitatively (e.g. do or don't surprise me), or numerically. A high serendipity factor lowers the threshold used for matching during collaborative filtering. A high factor makes it more likely that the corresponding section will be filled to the reader's specified capacity. A different serendipity factor can be specified for different days of the week.

The reader also optionally specifies topics of particular interest within a section, and this modifies the priorities assigned by the editors.

The speed of the reader's Internet connection affects the quality at which images can be delivered. The reader optionally specifies a preference for fewer images or smaller images or both. If the number or size of images is not reduced, then images may be delivered at lower quality (i.e. at lower resolution or with greater compression).

At a global level, the reader specifies how quantities, dates, times and monetary values are localized. This involves specifying whether units are imperial or metric, a local timezone and time format, and a local currency, and whether the localization consist of in situ translation or annotation. These preferences are derived from the reader's locality by default.

To reduce reading difficulties caused by poor eyesight, the reader optionally specifies a global preference for a larger presentation. Both text and images are scaled accordingly, and less information is accommodated on each page.

The language in which a news publication is published, and its corresponding text encoding, is a property of the publication and not a preference expressed by the user. However, the netpage system can be configured to provide automatic translation services in various guises.

2.2 Advertising Localization and Targeting

The personalization of the editorial content directly affects the advertising content, because advertising is typically placed to exploit the editorial context. Travel ads, for example, are more likely to appear in a travel section than elsewhere. The value of the editorial content to an advertiser (and therefore to the publisher) lies in its ability to attract large numbers of readers with the right demographics.

Effective advertising is placed on the basis of locality and demographics. Locality determines proximity to particular services, retailers etc., and particular interests and concerns associated with the local community and environment. Demographics determine general interests and preoccupations as well as likely spending patterns.

A news publisher's most profitable product is advertising "space", a multi-dimensional entity determined by the publication's geographic coverage, the size of its readership, its readership demographics, and the page area available for advertising.

In the netpage system, the netpage publication server computes the approximate multi-dimensional size of a publication's saleable advertising space on a per-section basis, taking into account the publication's geographic coverage, the section's readership, the size of each reader's section edition, each reader's advertising proportion, and each reader's demographic.

In comparison with other media, the netpage system allows the advertising space to be defined in greater detail, and allows smaller pieces of it to be sold separately. It therefore allows it to be sold at closer to its true value.

For example, the same advertising "slot" can be sold in varying proportions to several advertisers, with individual readers' pages randomly receiving the advertisement of one advertiser or another, overall preserving the proportion of space sold to each advertiser.

The netpage system allows advertising to be linked directly to detailed product information and online purchasing. It therefore raises the intrinsic value of the advertising space.

Because personalization and localization are handled automatically by netpage publication servers, an advertising aggregator can provide arbitrarily broad coverage of both geography and demographics. The subsequent disaggregation is efficient because it is automatic. This makes it more cost-effective for publishers to deal with advertising aggregators than to directly capture advertising. Even though the advertising aggregator is taking a proportion of advertising revenue, publishers may find the change profit-neutral because of the greater efficiency of aggregation. The advertising aggregator acts as an intermediary between advertisers and publishers, and may place the same advertisement in multiple publications.

It is worth noting that ad placement in a netpage publication can be more complex than ad placement in the publication's traditional counterpart, because the publication's advertising space is more complex. While ignoring the full complexities of negotiations between advertisers, advertising aggregators and publishers, the preferred form of the netpage system provides some automated support for these negotiations, including support for automated auctions of advertising space. Automation is particularly desirable for the placement of advertisements which generate small amounts of income, such as small or highly localized advertisements.

Once placement has been negotiated, the aggregator captures and edits the advertisement and records it on a netpage ad server. Correspondingly, the publisher records the ad placement on the relevant netpage publication server. When the netpage publication server lays out each user's personalized publication, it picks the relevant advertisements from the netpage ad server.

2.3 User Profiles
2.3.1 Information Filtering

The personalization of news and other publications relies on an assortment of user-specific profile information, including:

- publication customizations
- collaborative filtering vectors
- contact details
- presentation preferences The customization of a publication is typically publication-specific, and so the customization information is maintained by the relevant netpage publication server.

A collaborative filtering vector consists of the user's ratings of a number of news items. It is used to correlate different users' interests for the purposes of making recommendations. Although there are benefits to maintaining a single collaborative filtering vector independently of any particular publication, there are two reasons why it is more practical to maintain a separate vector for each publication: there is likely to be more overlap between the vectors of subscribers to the same publication than between those of subscribers to different publications; and a publication is likely to want to present its users' collaborative filtering vectors as part of the value of its brand, not to be found elsewhere.

Collaborative filtering vectors are therefore also maintained by the relevant netpage publication server.

Contact details, including name, street address, ZIP Code, state, country, telephone numbers, are global by nature, and are maintained by a netpage registration server.

Presentation preferences, including those for quantities, dates and times, are likewise global and maintained in the same way.

The localization of advertising relies on the locality indicated in the user's contact details, while the targeting of advertising relies on personal information such as date of birth, gender, marital status, income, profession, education, or qualitative derivatives such as age range and income range.

For those users who choose to reveal personal information for advertising purposes, the information is maintained by the relevant netpage registration server. In the absence of such information, advertising can be targeted on the basis of the demographic associated with the user's ZIP or ZIP+4 Code.

Each user, pen, printer, application provider and application is assigned its own unique identifier, and the netpage registration server maintains the relationships between them, as shown in FIGS. 21, 22, 23 and 24. For registration purposes, a publisher is a special kind of application provider, and a publication is a special kind of application.

Each user 800 may be authorized to use any number of printers 802, and each printer may allow any number of users to use it. Each user has a single default printer (at 66), to which periodical publications are delivered by default, whilst pages printed on demand are delivered to the printer through which the user is interacting. The server keeps track of which publishers a user has authorized to print to the user's default printer. A publisher does not record the ID of any particular printer, but instead resolves the ID when it is required. The user may also be designated as having administrative privileges 69 on the printer, allowing the user to authorize other users to use the printer. This only has meaning if the printer requires administrative privileges 84 for such operations.

When a user subscribes 808 to a publication 807, the publisher 806 (i.e. application provider 803) is authorized to print to a specified printer or the user's default printer. This authorization can be revoked at any time by the user. Each user may have several pens 801, but a pen is specific to a single user. If a user is authorized to use a particular printer, then that printer recognizes any of the user's pens.

The pen ID is used to locate the corresponding user profile maintained by a particular netpage registration server, via the DNS in the usual way.

A Web terminal 809 can be authorized to print on a particular netpage printer, allowing Web pages and netpage documents encountered during Web browsing to be conveniently printed on the nearest netpage printer.

The netpage system can collect, on behalf of a printer provider, fees and commissions on income earned through publications printed on the provider's printers. Such income can include advertising fees, click-through fees, e-commerce commissions, and transaction fees. If the printer is owned by the user, then the user is the printer provider.

Each user also has a netpage account 820 which is used to accumulate micro-debits and credits (such as those described in the preceding paragraph); contact details 815, including name, address and telephone numbers; global preferences 816, including privacy, delivery and localization settings; any number of biometric records 817, containing the user's encoded signature 818, fingerprint 819 etc; a handwriting model 819 automatically maintained by the system; and SET payment card accounts 821, with which e-commerce payments can be made.

In addition to the user-specific netpage account, each user also has a netpage account 936 specific to each printer the user is authorized to use. Each printer-specific account is used to accumulate micro-debits and credits related to the user's activities on that printer. The user is billed on a regular basis for any outstanding debit balances.

A user optionally appears in the netpage user directory 823, allowing other users to locate and direct e-mail (etc.) to the user.

2.4 Intelligent Page Layout

The netpage publication server automatically lays out the pages of each user's personalized publication on a section-by-section basis. Since most advertisements are in the form of pre-formatted rectangles, they are placed on the page before the editorial content.

The advertising ratio for a section can be achieved with wildly varying advertising ratios on individual pages within the section, and the ad layout algorithm exploits this. The algorithm is configured to attempt to co-locate closely tied editorial and advertising content, such as placing ads for roofing material specifically within the publication because of a special feature on do-it-yourself roofing repairs.

The editorial content selected for the user, including text and associated images and graphics, is then laid out according to various aesthetic rules.

The entire process, including the selection of ads and the selection of editorial content, must be iterated once the layout has converged, to attempt to more closely achieve the user's stated section size preference. The section size preference can, however, be matched on average over time, allowing significant day-to-day variations.

2.5 Document Format

Once the document is laid out, it is encoded for efficient distribution and persistent storage on the netpage network.

The primary efficiency mechanism is the separation of information specific to a single user's edition and information shared between multiple users' editions. The specific information consists of the page layout. The shared information consists of the objects to which the page layout refers, including images, graphics, and pieces of text.

A text object contains fully-formatted text represented in the Extensible Markup Language (XML) using the Extensible Stylesheet Language (XSL). XSL provides precise control over text formatting independently of the region into which the text is being set, which in this case is being provided by the layout. The text object contains embedded language codes to enable automatic translation, and embedded hyphenation hints to aid with paragraph formatting.

An image object encodes an image in the JPEG 2000 wavelet-based compressed image format. A graphic object encodes a 2D graphic in Scalable Vector Graphics (SVG) format.

The layout itself consists of a series of placed image and graphic objects, linked textflow objects through which text objects flow, hyperlinks and input fields as described above, and watermark regions. These layout objects are summarized in Table 3. The layout uses a compact format suitable for efficient distribution and storage.

TABLE 3 netpage layout objects

| Layout object | Attribute | Format of linked object |
| --- | --- | --- |
| Image | Position | — |
|  | Image object ID | JPEG 2000 |
| Graphic | Position | — |
|  | Graphic object ID | SVG |
| Textflow | Textflow ID | — |
|  | Zone | — |
|  | Optional text object ID | XML/XSL |
| Hyperlink | Type | — |
|  | Zone | — |
|  | Application ID, etc. | — |
| Field | Type | — |
|  | Meaning | — |
|  | Zone | — |
| Watermark | Zone | — |

2.6 Document Distribution

As described above, for purposes of efficient distribution and persistent storage on the netpage network, a user-specific page layout is separated from the shared objects to which it refers.

When a subscribed publication is ready to be distributed, the netpage publication server allocates, with the help of the netpage ID server 12, a unique ID for each page, page instance, document, and document instance.

The server computes a set of optimized subsets of the shared content and creates a multicast channel for each subset, and then tags each user-specific layout with the names of the multicast channels which will carry the shared content used by that layout. The server then pointcasts each user's layouts to that user's printer via the appropriate page server, and when the pointcasting is complete, multicasts the shared content on the specified channels. After receiving its pointcast, each page server and printer subscribes to the multicast channels specified in the page layouts. During the multicasts, each page server and printer extracts from the multicast streams those objects referred to by its page layouts. The page servers persistently archive the received page layouts and shared content.

Once a printer has received all the objects to which its page layouts refer, the printer re-creates the fully-populated layout and then rasterizes and prints it.

Under normal circumstances, the printer prints pages faster than they can be delivered. Assuming a quarter of each page is covered with images, the average page has a size of less than 400 KB. The printer can therefore hold in excess of 100 such pages in its internal 64 MB memory, allowing for temporary buffers etc. The printer prints at a rate of one page per second. This is equivalent to 400 KB or about 3 Mbit of page data per second, which is similar to the highest expected rate of page data delivery over a broadband network.

Even under abnormal circumstances, such as when the printer runs out of paper, it is likely that the user will be able to replenish the paper supply before the printer's 100-page internal storage capacity is exhausted.

However, if the printer's internal memory does fill up, then the printer will be unable to make use of a multicast when it first occurs. The netpage publication server therefore allows printers to submit requests for re-multicasts. When a critical number of requests is received or a timeout occurs, the server re-multicasts the corresponding shared objects.

Once a document is printed, a printer can produce an exact duplicate at any time by retrieving its page layouts and contents from the relevant page server.

2.7 On-Demand Documents

When a netpage document is requested on demand, it can be personalized and delivered in much the same way as a periodical. However, since there is no shared content, delivery is made directly to the requesting printer without the use of multicast.

When a non-netpage document is requested on demand, it is not personalized, and it is delivered via a designated netpage formatting server which reformats it as a netpage document. A netpage formatting server is a special instance of a netpage publication server. The netpage formatting server has knowledge of various Internet document formats, including Adobe's Portable Document Format (PDF), and Hypertext Markup Language (HTML). In the case of HTML, it can make use of the higher resolution of the printed page to present Web pages in a multi-column format, with a table of contents. It can automatically include all Web pages directly linked to the requested page. The user can tune this behavior via a preference.

The netpage formatting server makes standard netpage behavior, including interactivity and persistence, available on any Internet document, no matter what its origin and format. It hides knowledge of different document formats from both the netpage printer and the netpage page server, and hides knowledge of the netpage system from Web servers.

3 Security 3.1 Cryptography

Cryptography is used to protect sensitive information, both in storage and in transit, and to authenticate parties to a transaction. There are two classes of cryptography in widespread use: secret-key cryptography and public-key cryptography. The netpage network uses both classes of cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the key pair.

Public-key cryptography can be used to create a digital signature. The holder of the private key can create a known hash of a message and then encrypt the hash using the private key. Anyone can then verify that the encrypted hash constitutes the "signature" of the holder of the private key with respect to that particular message by decrypting the encrypted hash using the public key and verifying the hash against the message. If the signature is appended to the message, then the recipient of the message can verify both that the message is genuine and that it has not been altered in transit.

To make public-key cryptography work, there has to be a way to distribute public keys which prevents impersonation. This is normally done using certificates and certificate authorities. A certificate authority is a trusted third party which authenticates the connection between a public key and someone's identity. The certificate authority verifies the person's identity by examining identity documents, and then creates and signs a digital certificate containing the person's identity details and public key. Anyone who trusts the certificate authority can use the public key in the certificate with a high degree of certainty that it is genuine. They just have to verify that the certificate has indeed been signed by the certificate authority, whose public key is well-known.

In most transaction environments, public-key cryptography is only used to create digital signatures and to securely exchange secret session keys. Secret-key cryptography is used for all other purposes.

In the following discussion, when reference is made to the secure transmission of information between a netpage printer and a server, what actually happens is that the printer obtains the server's certificate, authenticates it with reference to the certificate authority, uses the public key-exchange key in the certificate to exchange a secret session key with the server, and then uses the secret session key to encrypt the message data. A session key, by definition, can have an arbitrarily short lifetime.

3.2 Netpage Printer Security

Each netpage printer is assigned a pair of unique identifiers at time of manufacture which are stored in read-only memory in the printer and in the netpage registration server database. The first ID 62 is public and uniquely identifies the printer on the netpage network. The second ID is secret and is used when the printer is first registered on the network.

When the printer connects to the netpage network for the first time after installation, it creates a signature public/private key pair. It transmits the secret ID and the public key securely to the netpage registration server. The server compares the secret ID against the printer's secret ID recorded in its database, and accepts the registration if the IDs match. It then creates and signs a certificate containing the printer's public ID and public signature key, and stores the certificate in the registration database.

The netpage registration server acts as a certificate authority for netpage printers, since it has access to secret information allowing it to verify printer identity.

When a user subscribes to a publication, a record is created in the netpage registration server database authorizing the publisher to print the publication to the user's default printer or a specified printer. Every document sent to a printer via a page server is addressed to a particular user and is signed by the publisher using the publisher's private signature key. The page server verifies, via the registration database, that the publisher is authorized to deliver the publication to the specified user. The page server verifies the signature using the publisher's public key, obtained from the publisher's certificate stored in the registration database.

The netpage registration server accepts requests to add printing authorizations to the database, so long as those requests are initiated via a pen registered to the printer.

3.3 Netpage Pen Security

Each netpage pen is assigned a unique identifier at time of manufacture which is stored in read-only memory in the pen and in the netpage registration server database. The pen ID 61 uniquely identifies the pen on the netpage network.

A netpage pen can "know" a number of netpage printers, and a printer can "know" a number of pens. A pen communicates with a printer via a radio frequency signal whenever it is within range of the printer. Once a pen and printer are registered, they regularly exchange session keys. Whenever the pen transmits digital ink to the printer, the digital ink is always encrypted using the appropriate session key. Digital ink is never transmitted in the clear.

A pen stores a session key for every printer it knows, indexed by printer ID, and a printer stores a session key for every pen it knows, indexed by pen ID. Both have a large but finite storage capacity for session keys, and will forget a session key on a least-recently-used basis if necessary.

When a pen comes within range of a printer, the pen and printer discover whether they know each other. If they don't know each other, then the printer determines whether it is supposed to know the pen. This might be, for example, because the pen belongs to a user who is registered to use the printer. If the printer is meant to know the pen but doesn't, then it initiates the automatic pen registration procedure. If the printer isn't meant to know the pen, then it agrees with the pen to ignore it until the pen is placed in a charging cup, at which time it initiates the registration procedure.

In addition to its public ID, the pen contains a secret key-exchange key. The key-exchange key is also recorded in the netpage registration server database at time of manufacture. During registration, the pen transmits its pen ID to the printer, and the printer transmits the pen ID to the netpage registration server. The server generates a session key for the printer and pen to use, and securely transmits the session key to the printer. It also transmits a copy of the session key encrypted with the pen's key-exchange key. The printer stores the session key internally, indexed by the pen ID, and transmits the encrypted session key to the pen. The pen stores the session key internally, indexed by the printer ID.

Although a fake pen can impersonate a pen in the pen registration protocol, only a real pen can decrypt the session key transmitted by the printer.

When a previously unregistered pen is first registered, it is of limited use until it is linked to a user. A registered but "un-owned" pen is only allowed to be used to request and fill in netpage user and pen registration forms, to register a new user to which the new pen is automatically linked, or to add a new pen to an existing user.

The pen uses secret-key rather than public-key encryption because of hardware performance constraints in the pen.

3.4 Secure Documents

The netpage system supports the delivery of secure documents such as tickets and coupons. The netpage printer includes a facility to print watermarks, but will only do so on request from publishers who are suitably authorized. The publisher indicates its authority to print watermarks in its certificate, which the printer is able to authenticate.

The "watermark" printing process uses an alternative dither matrix in specified "watermark" regions of the page. Back-to-back pages contain mirror-image watermark regions which coincide when printed. The dither matrices used in odd and even pages' watermark regions are designed to produce an interference effect when the regions are viewed together, achieved by looking through the printed sheet.

The effect is similar to a watermark in that it is not visible when looking at only one side of the page, and is lost when the page is copied by normal means.

Pages of secure documents cannot be copied using the built-in netpage copy mechanism described in Section 1.9 above. This extends to copying netpages on netpage-aware photocopiers.

Secure documents are typically generated as part of e-commerce transactions. They can therefore include the user's photograph which was captured when the user registered biometric information with the netpage registration server, as described in Section 2.

When presented with a secure netpage document, the recipient can verify its authenticity by requesting its status in the usual way. The unique ID of a secure document is only valid for the lifetime of the document, and secure document IDs are allocated non-contiguously to prevent their prediction by opportunistic forgers. A secure document verification pen can be developed with built-in feedback on verification failure, to support easy point-of-presentation document verification.

Clearly neither the watermark nor the user's photograph are secure in a cryptographic sense. They simply provide a significant obstacle to casual forgery. Online document verification, particularly using a verification pen, provides an added level of security where it is needed, but is still not entirely immune to forgeries.

3.5 Non-Repudiation

In the netpage system, forms submitted by users are delivered reliably to forms handlers and are persistently archived on netpage page servers. It is therefore impossible for recipients to repudiate delivery.

E-commerce payments made through the system, as described in Section 4, are also impossible for the payee to repudiate.

4 Electronic Commerce Model

4.1 Secure Electronic Transaction (Set)

The netpage system uses the Secure Electronic Transaction (SET) system as one of its payment systems. SET, having been developed by MasterCard and Visa, is organized around payment cards, and this is reflected in the terminology. However, much of the system is independent of the type of accounts being used.

In SET, cardholders and merchants register with a certificate authority and are issued with certificates containing their public signature keys. The certificate authority verifies a cardholder's registration details with the card issuer as appropriate, and verifies a merchant's registration details with the acquirer as appropriate. Cardholders and merchants store their respective private signature keys securely on their computers. During the payment process, these certificates are used to mutually authenticate a merchant and cardholder, and to authenticate them both to the payment gateway.

SET has not yet been adopted widely, partly because cardholder maintenance of keys and certificates is considered burdensome. Interim solutions which maintain cardholder keys and certificates on a server and give the cardholder access via a password have met with some success.

4.2 Set Payments

In the netpage system the netpage registration server acts as a proxy for the netpage user (i.e. the cardholder) in SET payment transactions.

The netpage system uses biometrics to authenticate the user and authorize SET payments. Because the system is pen-based, the biometric used is the user's on-line signature, consisting of time-varying pen position and pressure. A fingerprint biometric can also be used by designing a fingerprint sensor into the pen, although at a higher cost. The type of biometric used only affects the capture of the biometric, not the authorization aspects of the system.

The first step to being able to make SET payments is to register the user's biometric with the netpage registration server. This is done in a controlled environment, for example a bank, where the biometric can be captured at the same time as the user's identity is verified. The biometric is captured and stored in the registration database, linked to the user's record. The user's photograph is also optionally captured and linked to the record. The SET cardholder registration process is completed, and the resulting private signature key and certificate are stored in the database. The user's payment card information is also stored, giving the netpage registration server enough information to act as the user's proxy in any SET payment transaction.

When the user eventually supplies the biometric to complete a payment, for example by signing a netpage order form, the printer securely transmits the order information, the pen ID and the biometric data to the netpage registration server. The server verifies the biometric with respect to the user identified by the pen ID, and from then on acts as the user's proxy in completing the SET payment transaction.

4.3 Micro-Payments

The netpage system includes a mechanism for micro-payments, to allow the user to be conveniently charged for printing low-cost documents on demand and for copying copyright documents, and possibly also to allow the user to be reimbursed for expenses incurred in printing advertising material. The latter depends on the level of subsidy already provided to the user.

When the user registers for e-commerce, a network account is established which aggregates micro-payments. The user receives a statement on a regular basis, and can settle any outstanding debit balance using the standard payment mechanism.

The network account can be extended to aggregate subscription fees for periodicals, which would also otherwise be presented to the user in the form of individual statements.

4.4 Transactions

When a user requests a netpage in a particular application context, the application is able to embed a user-specific transaction ID 55 in the page. Subsequent input through the page is tagged with the transaction ID, and the application is thereby able to establish an appropriate context for the user's input.

When input occurs through a page which is not user-specific, however, the application must use the user's unique identity to establish a context. A typical example involves adding items from a pre-printed catalog page to the user's virtual "shopping cart". To protect the user's privacy, however, the unique user ID 60 known to the netpage system is not divulged to applications. This is to prevent different application providers from easily correlating independently accumulated behavioral data.

Figure 24:
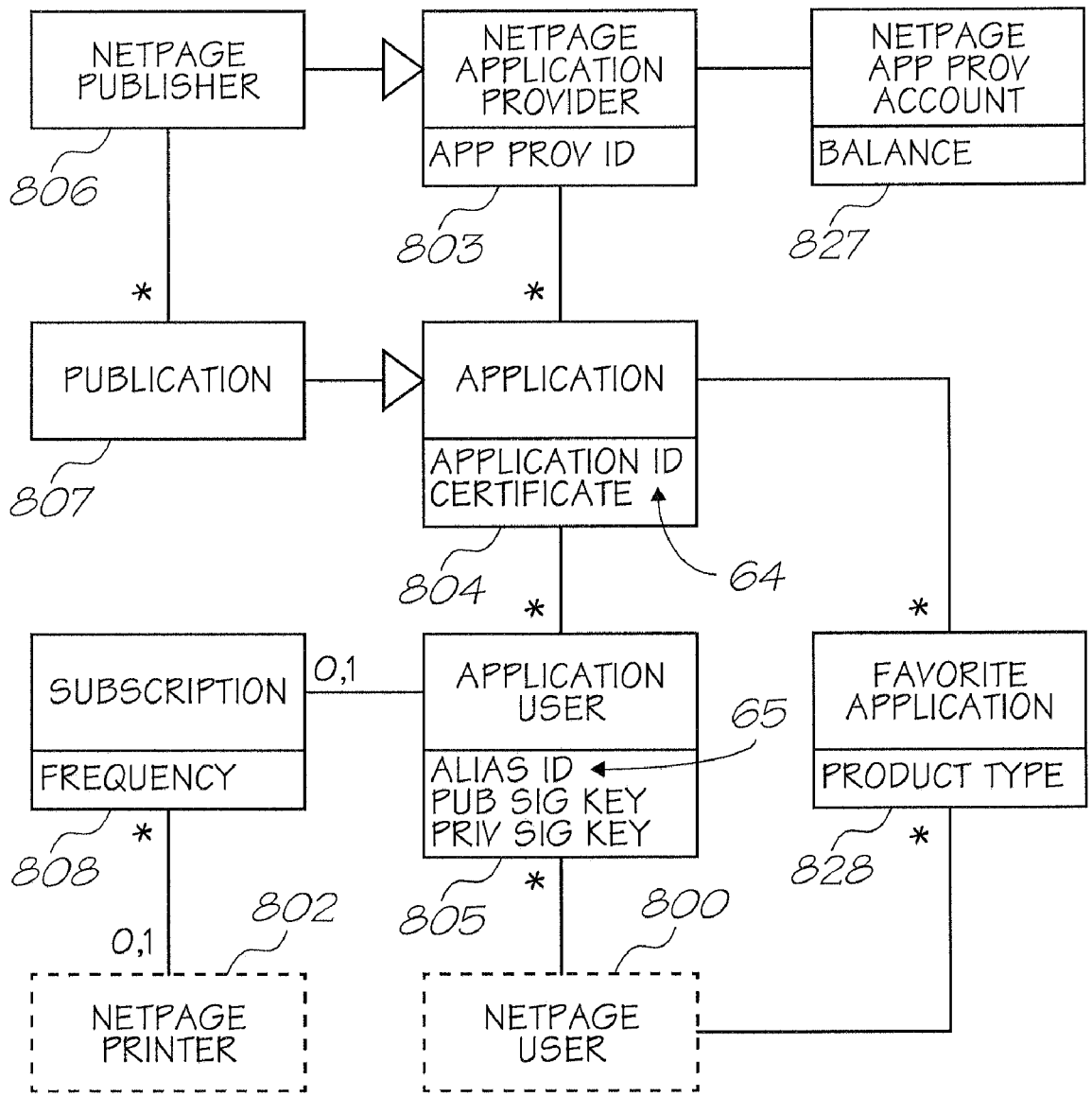
FIG. 24 is a schematic view of an application class diagram.

The netpage registration server instead maintains an anonymous relationship between a user and an application via a unique alias ID 65, as shown in FIG. 24. Whenever the user activates a hyperlink tagged with the "registered" attribute, the netpage page server asks the netpage registration server to translate the associated application ID 64, together with the pen ID 61, into an alias ID 65. The alias ID is then submitted to the hyperlink's application.

The application maintains state information indexed by alias ID, and is able to retrieve user-specific state information without knowledge of the global identity of the user.

The system also maintains an independent certificate and private signature key for each of a user's applications, to allow it to sign application transactions on behalf of the user using only application-specific information.

To assist the system in routing product bar code (UPC) "hyperlink" activations, the system records a favorite application on behalf of the user for any number of product types.

Each application is associated with an application provider, and the system maintains an account on behalf of each application provider, to allow it to credit and debit the provider for click-through fees etc.

An application provider can be a publisher of periodical subscribed content. The system records the user's willingness to receive the subscribed publication, as well as the expected frequency of publication.

5 Communications Protocols

A communications protocol defines an ordered exchange of messages between entities. In the netpage system, entities such as pens, printers and servers utilise a set of defined protocols to cooperatively handle user interaction with the netpage system.

Each protocol is illustrated by way of a sequence diagram in which the horizontal dimension is used to represent message flow and the vertical dimension is used to represent time. Each entity is represented by a rectangle containing the name of the entity and a vertical column representing the lifeline of the entity. During the time an entity exists, the lifeline is shown as a dashed line. During the time an entity is active, the lifeline is shown as a double line. Because the protocols considered here do not create or destroy entities, lifelines are generally cut short as soon as an entity ceases to participate in a protocol.

5.1 Subscription Delivery Protocol

Figure 40:
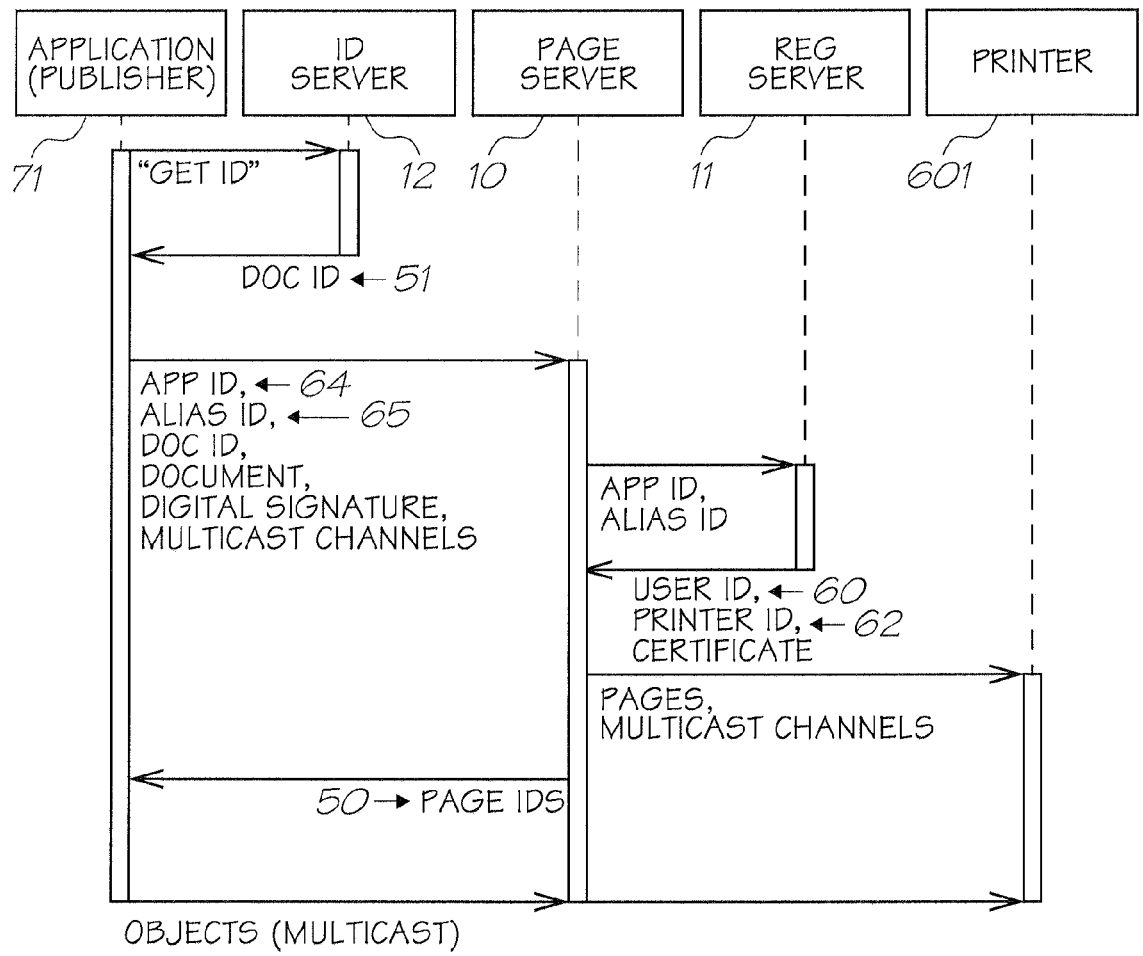
FIG. 40 is a schematic view of a subscription delivery protocol.

A preferred embodiment of a subscription delivery protocol is shown in FIG. 40.

A large number of users may subscribe to a periodical publication. Each user's edition may be laid out differently, but many users' editions will share common content such as text objects and image objects. The subscription delivery protocol therefore delivers document structures to individual printers via pointcast, but delivers shared content objects via multicast.

The application (i.e. publisher) first obtains a document ID 51 for each document from an ID server 12. It then sends each document structure, including its document ID and page descriptions, to the page server 10 responsible for the document's newly allocated ID. It includes its own application ID 64, the subscriber's alias ID 65, and the relevant set of multicast channel names. It signs the message using its private signature key.

The page server uses the application ID and alias ID to obtain from the registration server the corresponding user ID 60, the user's selected printer ID 62 (which may be explicitly selected for the application, or may be the user's default printer), and the application's certificate.

The application's certificate allows the page server to verify the message signature. The page server's request to the registration server fails if the application ID and alias ID don't together identify a subscription 808.

The page server then allocates document and page instance IDs and forwards the page descriptions, including page IDs 50, to the printer. It includes the relevant set of multicast channel names for the printer to listen to.

It then returns the newly allocated page IDs to the application for future reference.

Once the application has distributed all of the document structures to the subscribers' selected printers via the relevant page servers, it multicasts the various subsets of the shared objects on the previously selected multicast channels. Both page servers and printers monitor the appropriate multicast channels and receive their required content objects. They are then able to populate the previously pointcast document structures. This allows the page servers to add complete documents to their databases, and it allows the printers to print the documents.

5.2 Hyperlink Activation Protocol

Figure 42:
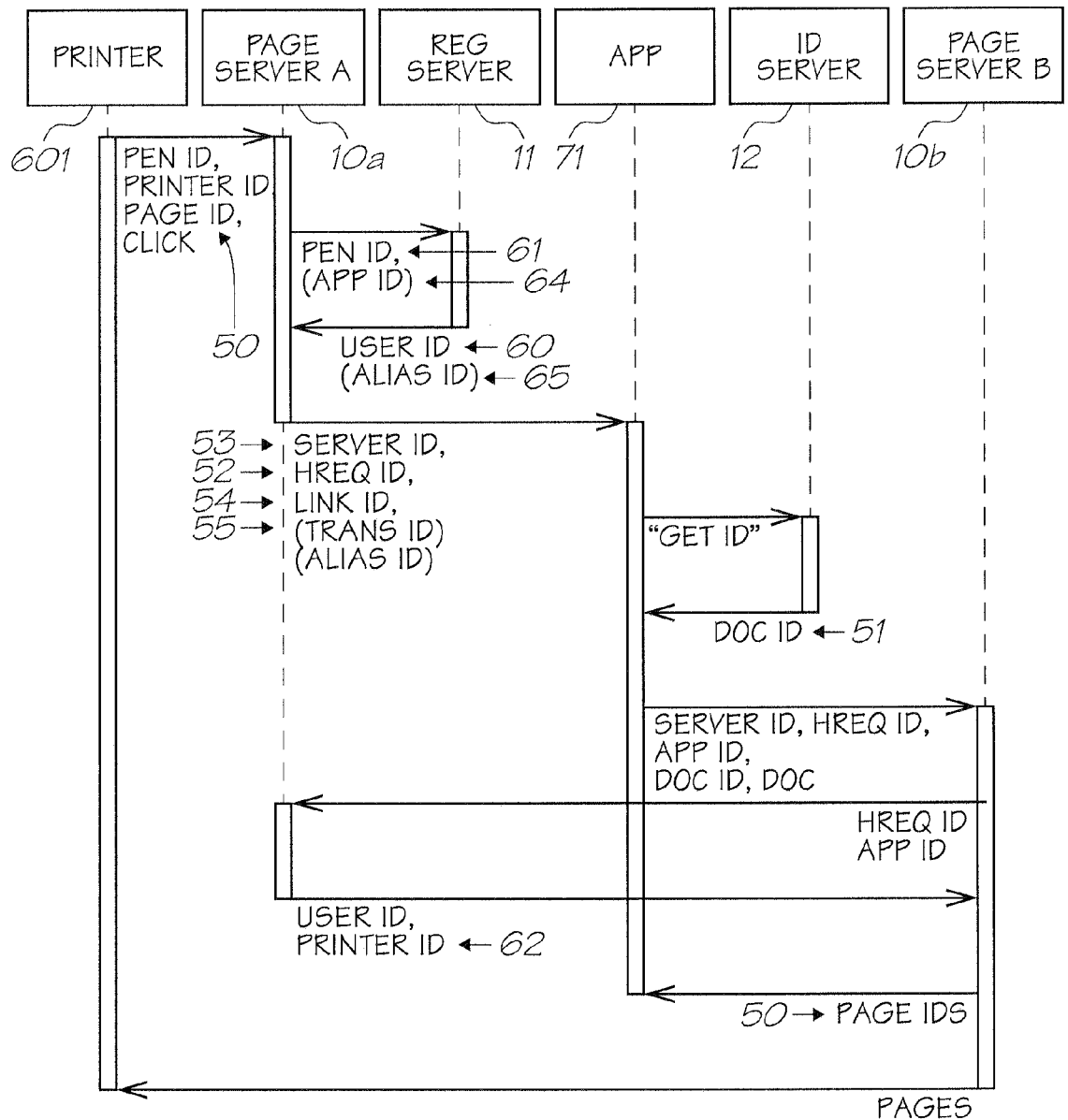
FIG. 42 is a schematic view of a hyperlink activation protocol.

A preferred embodiment of a hyperlink activation protocol is shown in FIG. 42.

When a user clicks on a netpage with a netpage pen, the pen communicates the click to the nearest netpage printer 601. The click identifies the page and a location on the page. The printer already knows the ID 61 of the pen from the pen connection protocol.

The printer determines, via the DNS, the network address of the page server 10*a* handling the particular page ID 50. The address may already be in its cache if the user has recently interacted with the same page. The printer then forwards the pen ID, its own printer ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 41:
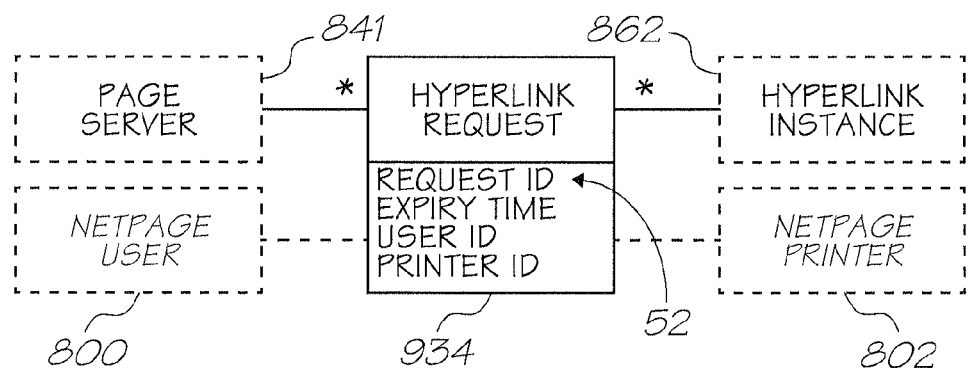
FIG. 41 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 41. The hyperlink request records the IDs of the requesting user and printer, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10*b* responsible for the document's newly allocated ID, together with the requesting page server's ID and the hyperlink request ID.

The second page server sends the hyperlink request ID and application ID to the first page server to obtain the corresponding user ID and printer ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting printer.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

5.3 Handwriting Recognition Protocol

When a user draws a stroke on a netpage with a netpage pen, the pen communicates the stroke to the nearest netpage printer. The stroke identifies the page and a path on the page.

The printer forwards the pen ID 61, its own printer ID 62, the page ID 50 and stroke path to the page server 10 in the usual way.

The page server loads the page description 5 identified by the page ID and determines which input element's zone 58, if any, the stroke intersects. Assuming the relevant input element is a text field 878, the page server appends the stroke to the text field's digital ink.

After a period of inactivity in the zone of the text field, the page server sends the pen ID and the pending strokes to the registration server 11 for interpretation. The registration server identifies the user corresponding to the pen, and uses the user's accumulated handwriting model 822 to interpret the strokes as handwritten text. Once it has converted the strokes to text, the registration server returns the text to the requesting page server. The page server appends the text to the text value of the text field.

5.4 Signature Verification Protocol

Assuming the input element whose zone the stroke intersects is a signature field 880, the page server 10 appends the stroke to the signature field's digital ink.

After a period of inactivity in the zone of the signature field, the page server sends the pen ID 61 and the pending strokes to the registration server 11 for verification. It also sends the application ID 64 associated with the form of which the signature field is part, as well as the form ID 56 and the current data content of the form. The registration server identifies the user corresponding to the pen, and uses the user's dynamic signature biometric 818 to verify the strokes as the user's signature. Once it has verified the signature, the registration server uses the application ID 64 and user ID 60 to identify the user's application-specific private signature key. It then uses the key to generate a digital signature of the form data, and returns the digital signature to the requesting page server. The page server assigns the digital signature to the signature field and sets the associated form's status to frozen.

The digital signature includes the alias ID 65 of the corresponding user. This allows a single form to capture multiple users' signatures.

5.5 Form Submission Protocol

Figure 43:
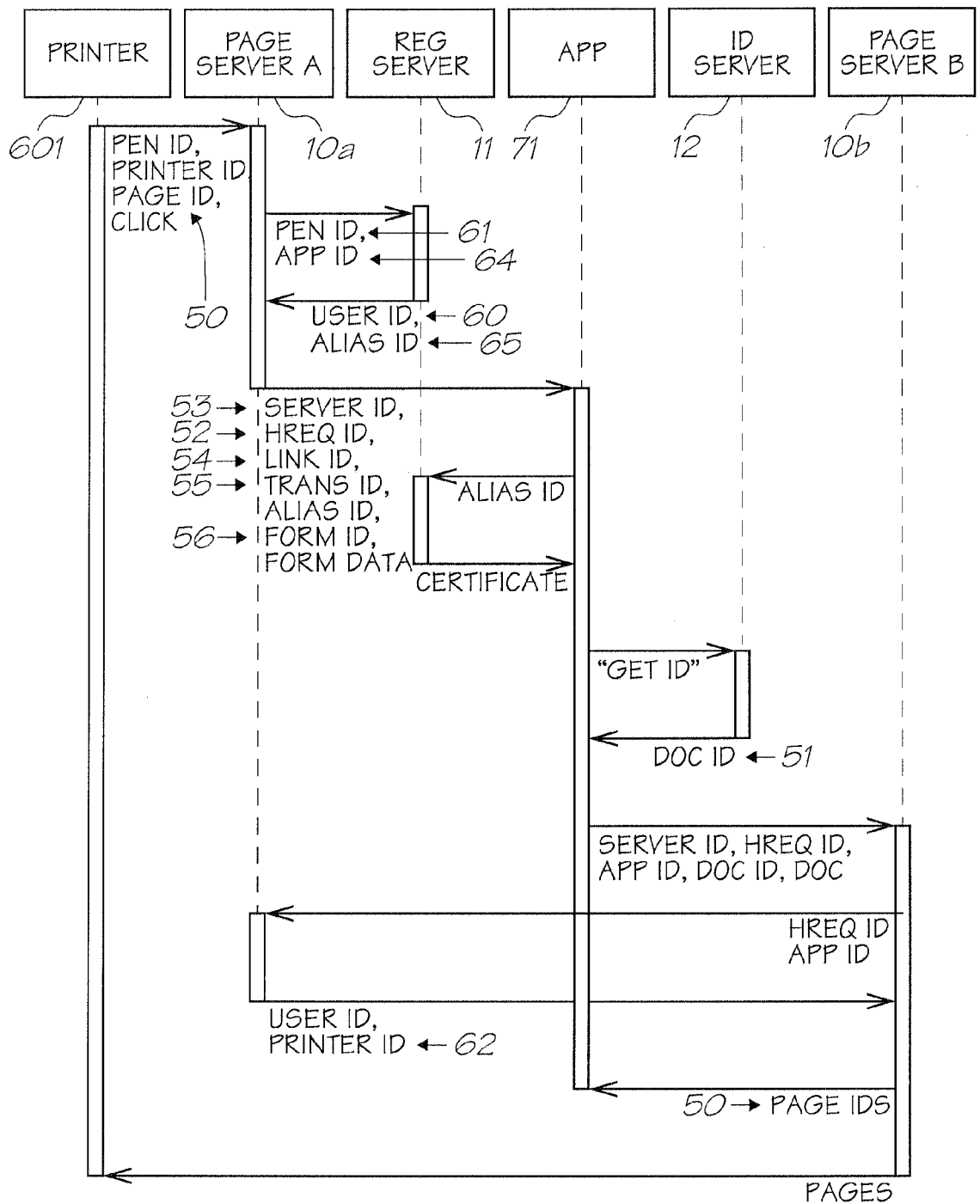
FIG. 43 is a schematic view of a form submission protocol.

A preferred embodiment of a form submission protocol is shown in FIG. 43.

Form submission occurs via a form hyperlink activation. It thus follows the protocol defined in Section 5.2, with some form-specific additions.

In the case of a form hyperlink, the hyperlink activation message sent by the page server 10 to the application 71 also contains the form ID 56 and the current data content of the form. If the form contains any signature fields, then the application verifies each one by extracting the alias ID 65 associated with the corresponding digital signature and obtaining the corresponding certificate from the registration server 11.

6 Netpage Pen Description

6.1 Pen Mechanics

Referring to FIGS. 8 and 9, the pen, generally designated by reference numeral 101, includes a housing 102 in the form of a plastics moulding having walls 103 defining an interior space 104 for mounting the pen components. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;
Ink cartridge 118 nib 119 out; and
Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

6.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a receiver, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

7 Netpage Printer Description

7.1 Printer Mechanics

Figure 12A:
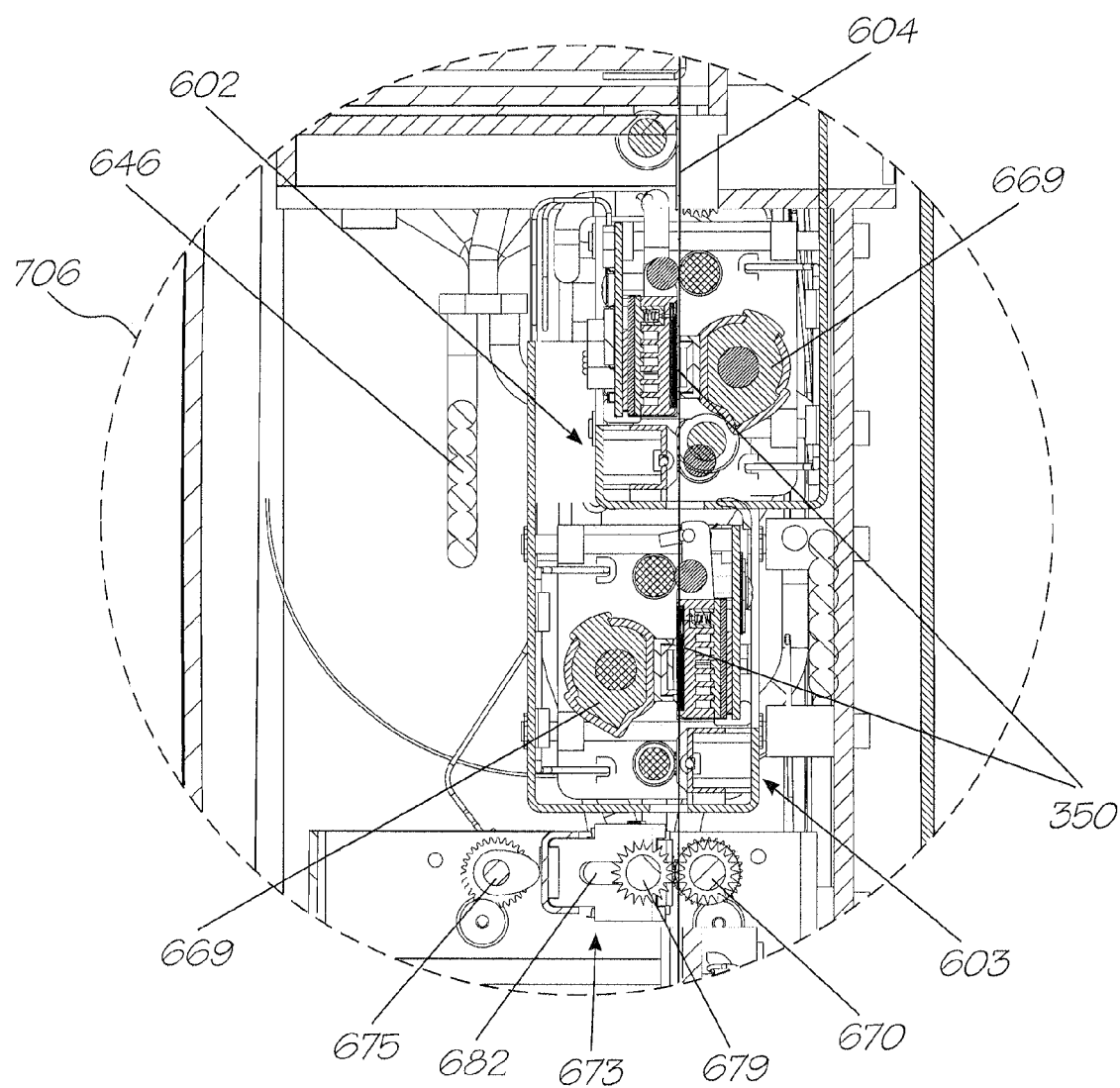
FIG. 12a is an enlarged portion of FIG. 12 showing a section of the duplexed print engines and glue wheel assembly.

The vertically-mounted netpage wallprinter 601 is shown fully assembled in FIG. 11. It prints netpages on Letter/A4 sized media using duplexed 8½" Memjet™ print engines 602 and 603, as shown in FIGS. 12 and 12a. It uses a straight paper path with the paper 604 passing through the duplexed print engines 602 and 603 which print both sides of a sheet simultaneously, in full color and with full bleed.

An integral binding assembly 605 applies a strip of glue along one edge of each printed sheet, allowing it to adhere to the previous sheet when pressed against it. This creates a final bound document 618 which can range in thickness from one sheet to several hundred sheets.

The replaceable ink cartridge 627, shown in FIG. 13 coupled with the duplexed print engines, has bladders or chambers for storing fixative, adhesive, and cyan, magenta, yellow, black and infrared inks. The cartridge also contains a micro air filter in a base molding. The micro air filter interfaces with an air pump 638 inside the printer via a hose 639. This provides filtered air to the printheads to prevent ingress of micro particles into the Memjet™ printheads 350 which might otherwise clog the printhead nozzles. By incorporating the air filter within the cartridge, the operational life of the filter is effectively linked to the life of the cartridge. The ink cartridge is a fully recyclable product with a capacity for printing and gluing 3000 pages (1500 sheets).

Referring to FIG. 12, the motorized media pick-up roller assembly 626 pushes the top sheet directly from the media tray past a paper sensor on the first print engine 602 into the duplexed Memjet™ printhead assembly. The two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences. Fixative is printed simultaneously to aid drying in the shortest possible time.

The paper exits the first Memjet™ print engine 602 through a set of powered exit spike wheels (aligned along the straight paper path), which act against a rubberized roller. These spike wheels contact the 'wet' printed surface and continue to feed the sheet 604 into the second Memjet™ print engine 603.

Referring to FIGS. 12 and 12a, the paper 604 passes from the duplexed print engines 602 and 603 into the binder assembly 605. The printed page passes between a powered spike wheel axle 670 with a fibrous support roller and another movable axle with spike wheels and a momentary action glue wheel. The movable axle/glue assembly 673 is mounted to a metal support bracket and it is transported forward to interface with the powered axle 670 via gears by action of a camshaft. A separate motor powers this camshaft.

The glue wheel assembly 673 consists of a partially hollow axle 679 with a rotating coupling for the glue supply hose 641 from the ink cartridge 627. This axle 679 connects to a glue wheel, which absorbs adhesive by capillary action through radial holes. A molded housing 682 surrounds the glue wheel, with an opening at the front. Pivoting side moldings and sprung outer doors are attached to the metal bracket and hinge out sideways when the rest of the assembly 673 is thrust forward. This action exposes the glue wheel through the front of the molded housing 682. Tension springs close the assembly and effectively cap the glue wheel during periods of inactivity.

As the sheet 604 passes into the glue wheel assembly 673, adhesive is applied to one vertical edge on the front side (apart from the first sheet of a document) as it is transported down into the binding assembly 605.

7.2 Printer Controller Architecture

Figure 14:
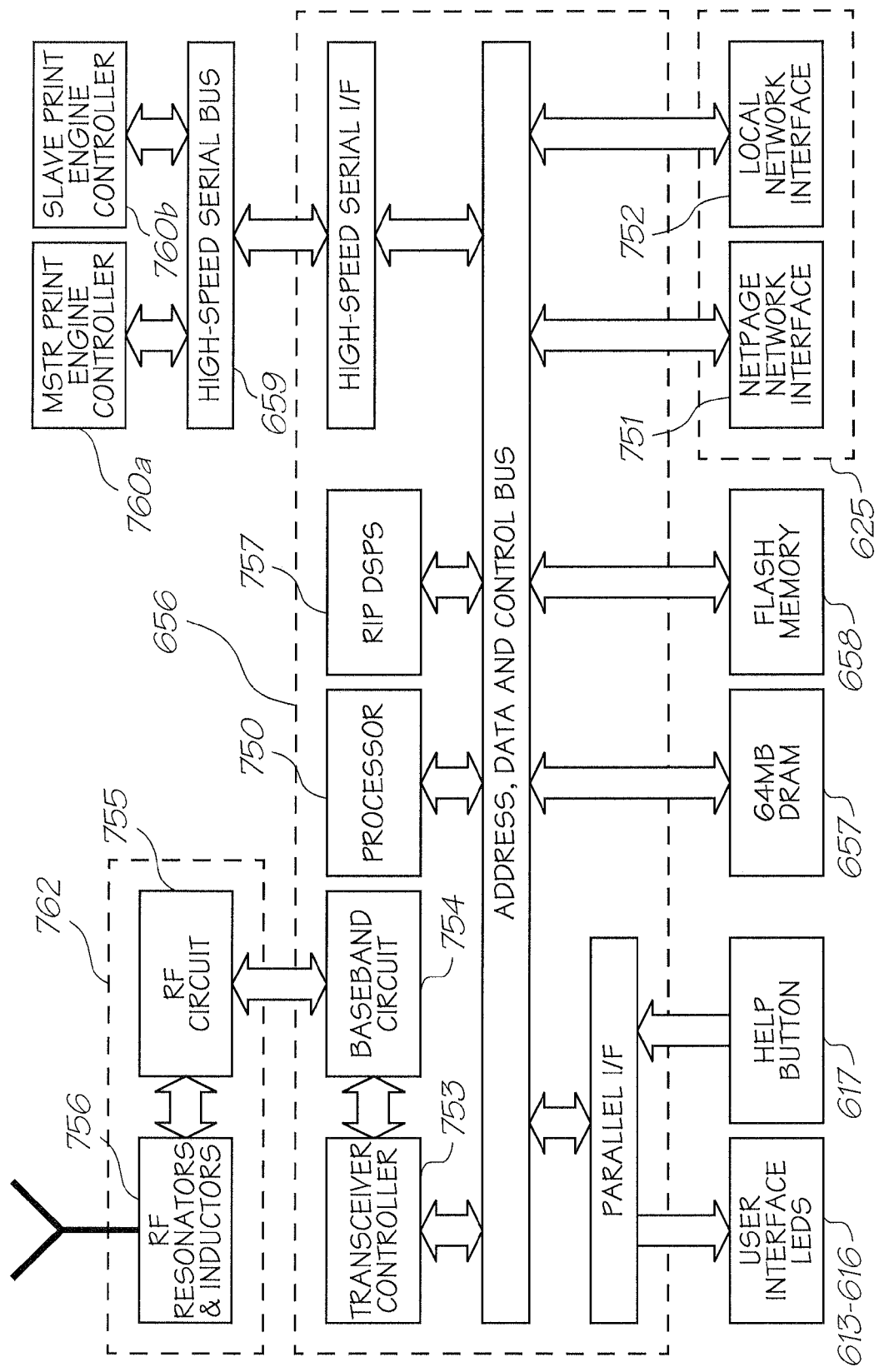
FIG. 14 is a schematic block diagram of a printer controller for the netpage printer.
Figure 15:
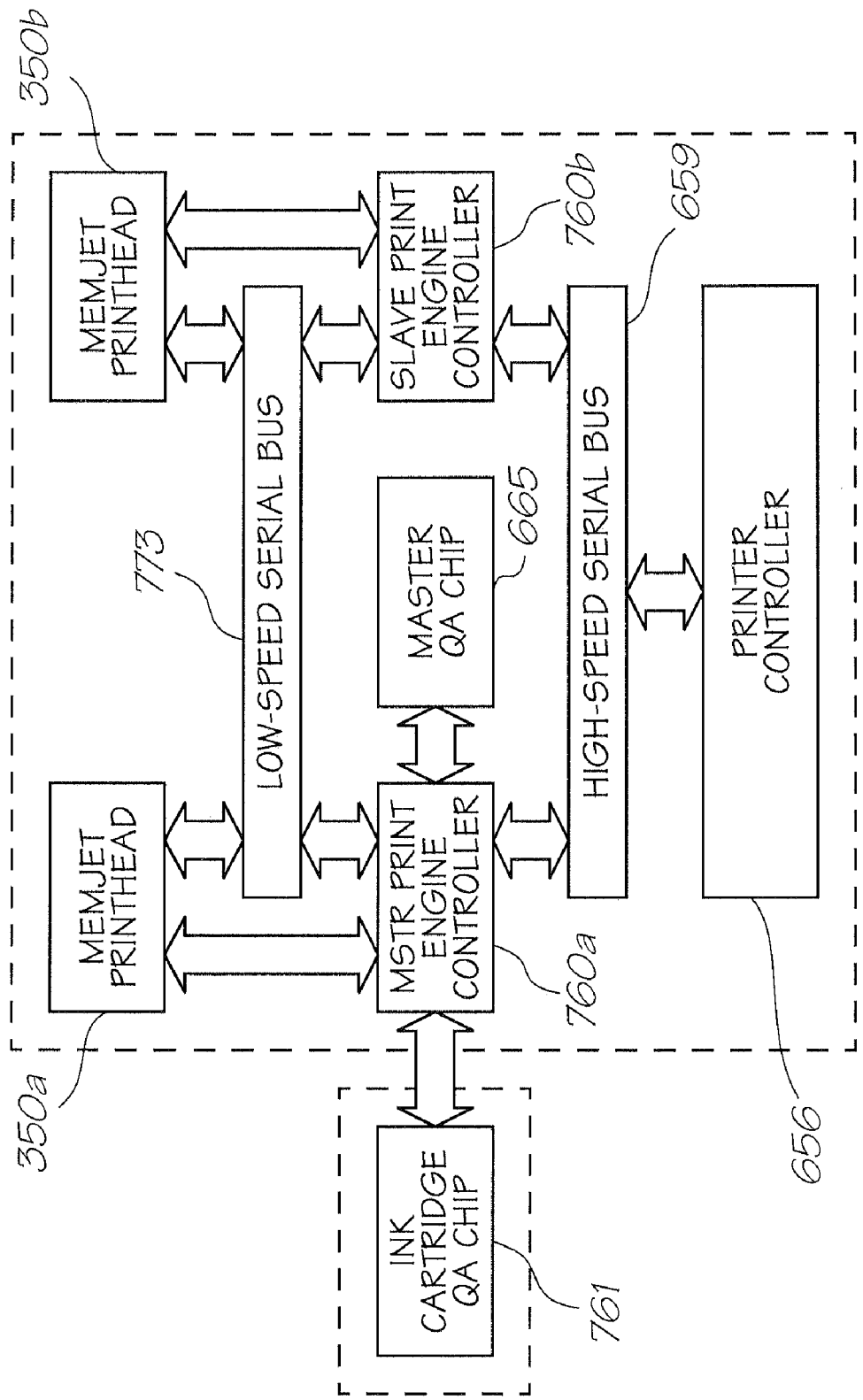
FIG. 15 is a schematic block diagram of duplexed print engine controllers and Memjet™ printheads associated with the printer controller shown in FIG. 14.
Figure 16:
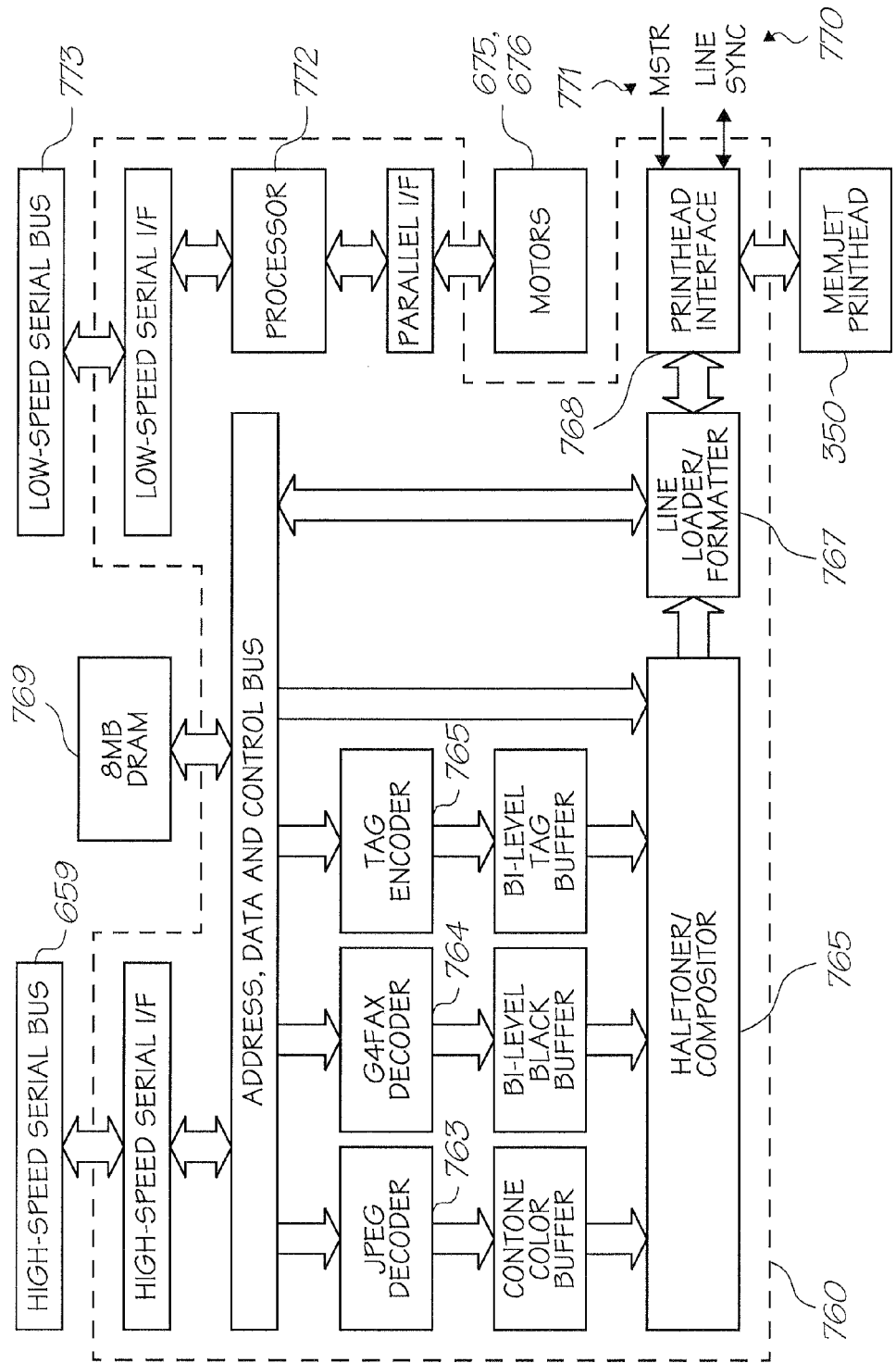
FIG. 16 is a schematic block diagram of the print engine controller shown in FIGS. 14 and 15.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760a and 760b, flash memory 658, and 64 MB of DRAM 657, as illustrated in FIG. 14.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

The master print engine controller 760a controls the paper transport and monitors ink usage in conjunction with the master QA chip 665 and the ink cartridge QA chip 761.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2☐256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. Netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

7.2.1 Rasterization and Printing

Figure 77:
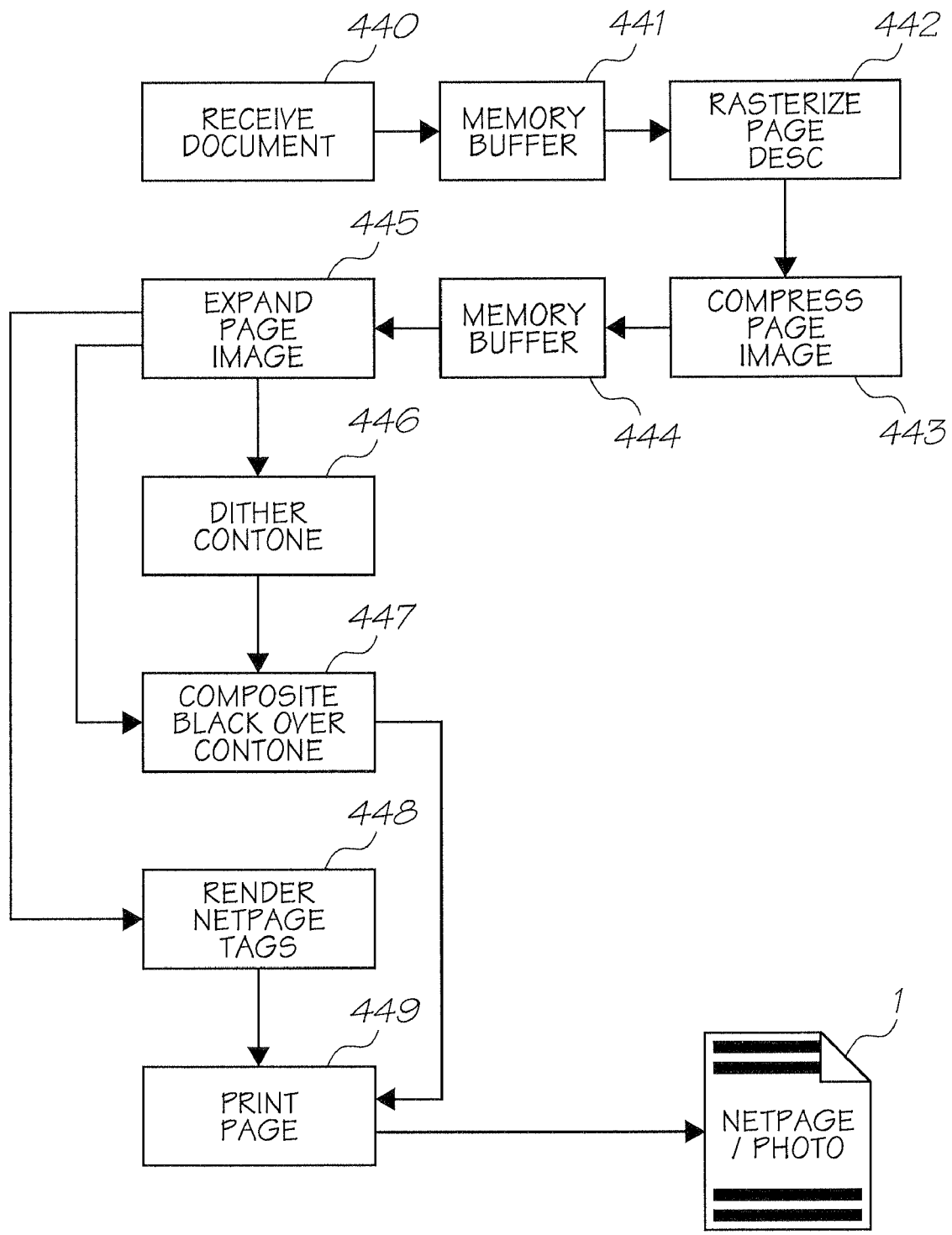
FIG. 77 is a flowchart of document processing in the netpage printer and camera.

As shown in FIG. 77, once the main processor 750 has received (at 440) the document's page layouts and page objects into memory 657 (at 441), it runs the appropriate RIP software on the DSPs 757.

The DSPs 757 rasterize (at 442) each page description and compress (at 443) the rasterized page image. The main processor stores each compressed page image in memory 657 (at 444). The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

Watermark regions in the page description are rasterized to a contone-resolution bi-level bitmap which is losslessly compressed to negligible size and which forms part of the compressed page image.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory 769, and starts the page expansion and printing pipeline. Page expansion and printing is pipelined because it is impractical to store an entire 114 MB bi-level CMYK+IR page image in memory.

The print engine controller expands the compressed page image (at 445), dithers the expanded contone color data to bi-level dots (at 446), composites the expanded bi-level black layer over the dithered contone layer (at 447), renders the expanded netpage tag data (at 448), and finally prints the fully-rendered page (at 449) to produce a printed netpage 1.

7.2.2 Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK+IR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

8 Netpage Photographs

Photographs taken with a digital camera can be printed as netpages. A user can then obtain a pristine copy of a photo via the original print, even if the original print is severely degraded. The photo's digital image is persistently stored on the netpage network, and the printed photo is a netpage linked to the digital image.

A user can archive and organize a collection of photos via a netpage photo manager application. They can organize their photo collection into a set of folders, delete unwanted photos from the collection, and search for photos in the collection.

A photo user can add photos to their netpage photo collection in several ways. They can take photos using a normal digital camera and "squirt" the photos to a receptive device which has access to the netpage network. The squirting interface can be a radio interface (such as Bluetooth) or an infrared interface (such as IrDA). The receptive device can be a mobile phone, a fixed or mobile netpage printer, etc.

They can also take and print photos using a netpage camera, i.e. a digital camera containing a netpage printer and a wireless netpage network interface, as described in section 9 below. It typically transmits photos to the netpage network as they are taken. It can defer transmission until its local storage fills up, or until the user explicitly requests transmission. The netpage system can pre-allocate page IDs to netpage cameras on request, to allow them to print netpage photos while offline.

A photo user can grant other users (such as family members) access to particular folders in their photo collection. Users can thus easily share photos without having to get together and swap negatives or prints. This may be particularly convenient when the photo user is travelling. Even if using a netpage camera, the photo user may choose to defer printing of photos while travelling, and instead retrieve and print the photos on returning home, e.g. in the form of printed pages suitable for inclusion in a normal photo album.

8.1 Application Drawing Notation

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 44, 45:
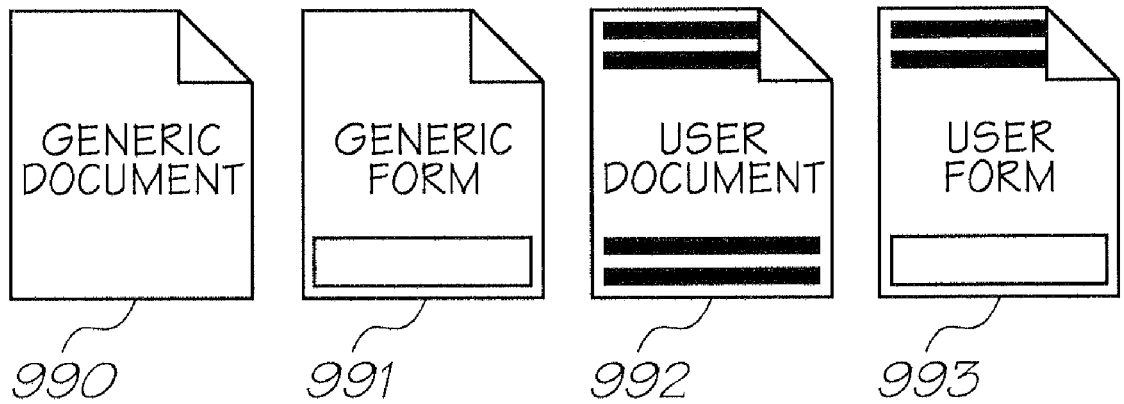
FIG. 44 is a schematic view of a set of user interface flow document icons.
FIG. 45 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 44 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 45, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

8.2 Photo Collection Object Model

Figure 46:
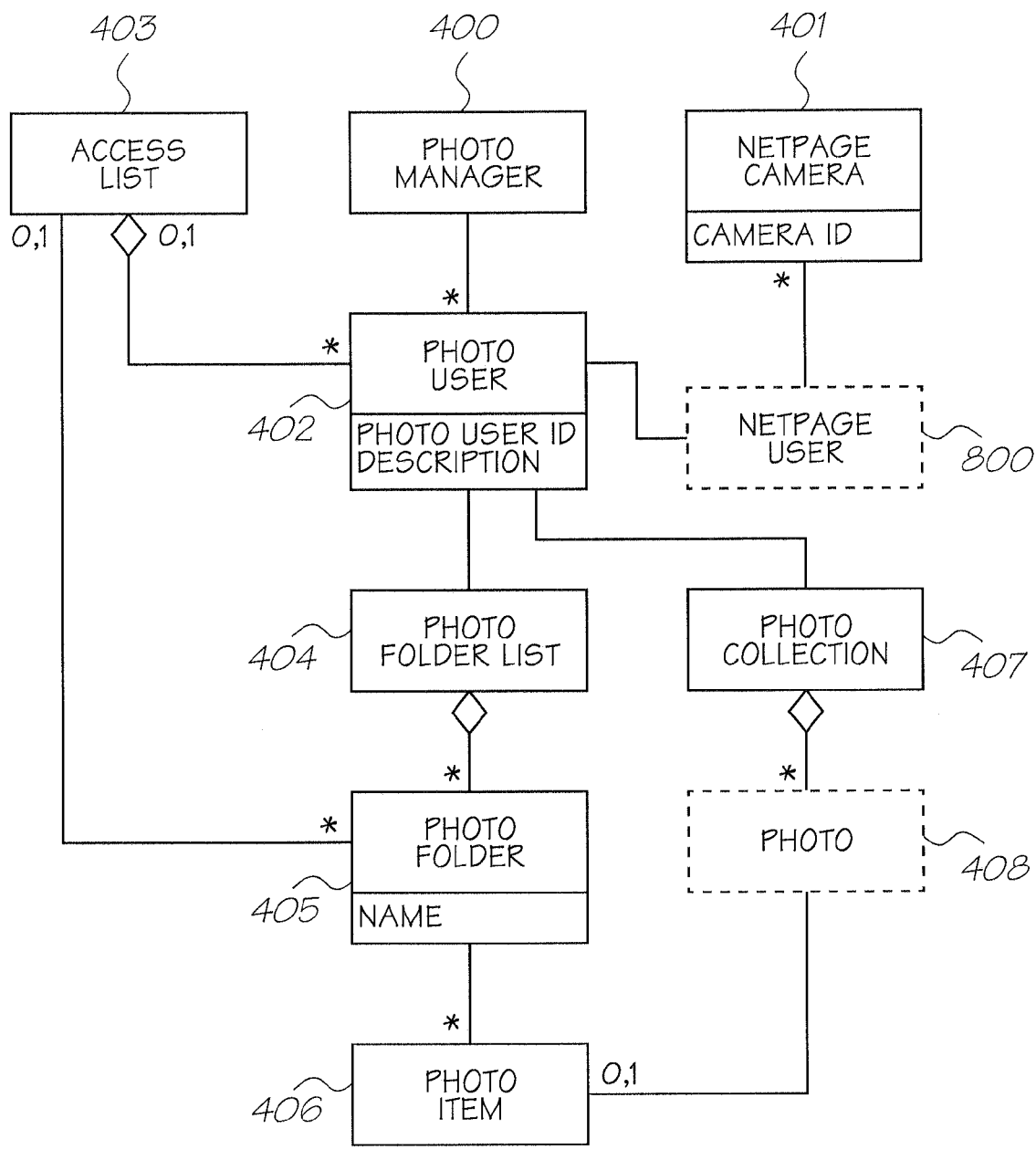
FIG. 46 is a schematic view of a photo collection class diagram.

With reference to the photo collection class diagram shown in FIG. 46, the photo manager 400 manages photo collections on behalf of a number of users. Each photo user 402 is a netpage user 800 (FIG. 21), and the details of the photo user derive, by default, from the details of the corresponding netpage user.

A netpage user may have any number of cameras 401, each of which has an ID by which it identifies itself to the netpage system in much the same way that a netpage pen does. A camera, like a pen, is associated with only one netpage user, allowing the system to uniquely associate any input from a camera with a single user.

Each photo user has a collection 407 of photos, optionally organized 404 into a set of named folders 405. Each folder has an optional access list 403, indicating which other photo users are granted access to view the photos in the folder.

Figure 47:
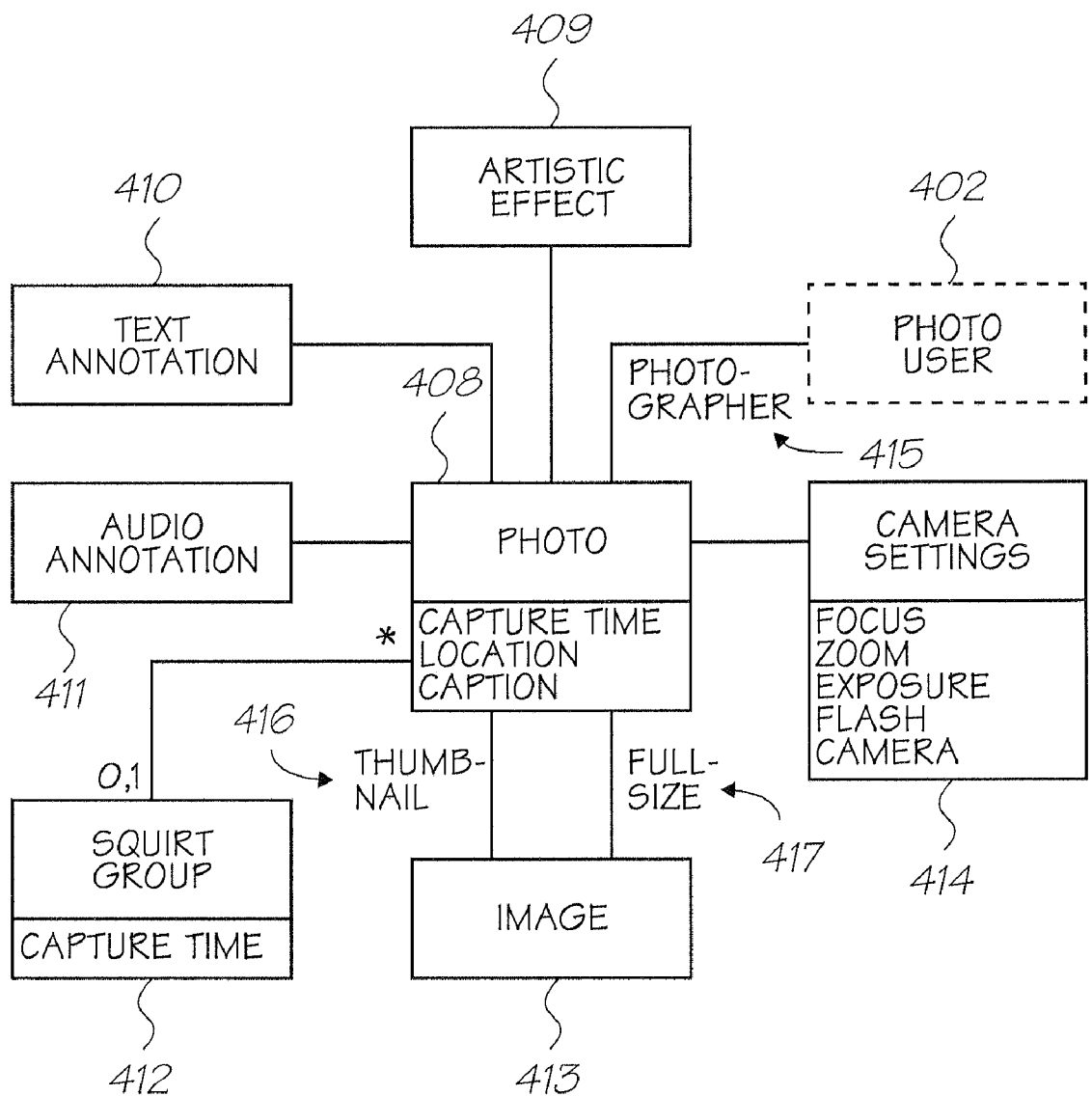
FIG. 47 is a schematic view of a photo class diagram.

With reference to the photo class diagram shown in FIG. 47, each photo 408 in the photo collection has a caption, a capture date and time, and a capture location (e.g. if available from a GPS receiver in the camera). Each photo has a photographer 415. Each photo has a full-size image 417,413 and a corresponding thumbnail image 416,413. Each photo records a set of camera settings 414, including focus, zoom, exposure, whether the flash was used, and the type and model of the camera. Actual camera settings are camera-specific. A photo may have an associated audio annotation 411, if captured by the camera, and a text annotation 410. If the photo was captured and printed by a camera which applied an artistic effect to the photo, then the artistic effect 409 is recorded so that the photo can be reproduced with or without the effect.

If the photo was squirted from a camera, then it is associated with a squirt group 412 which contains all the photos which were squirted as a group. This provides a useful unit of organization when presenting the photo collection to the user.

8.3 Photo Collection User Interface

8.3.1 Netpage Camera Photo Capture

When a user takes a photo using a netpage camera, the camera automatically transmits the photo to the netpage system. Since the camera is uniquely associated with a particular netpage user, the photo manager automatically adds the photo to the user's photo collection. As described earlier, the camera may transmit the photo to the netpage system as soon as it is taken, or it may defer transmission until a more opportune time.

8.3.2 Photo Squirting

Figure 51:
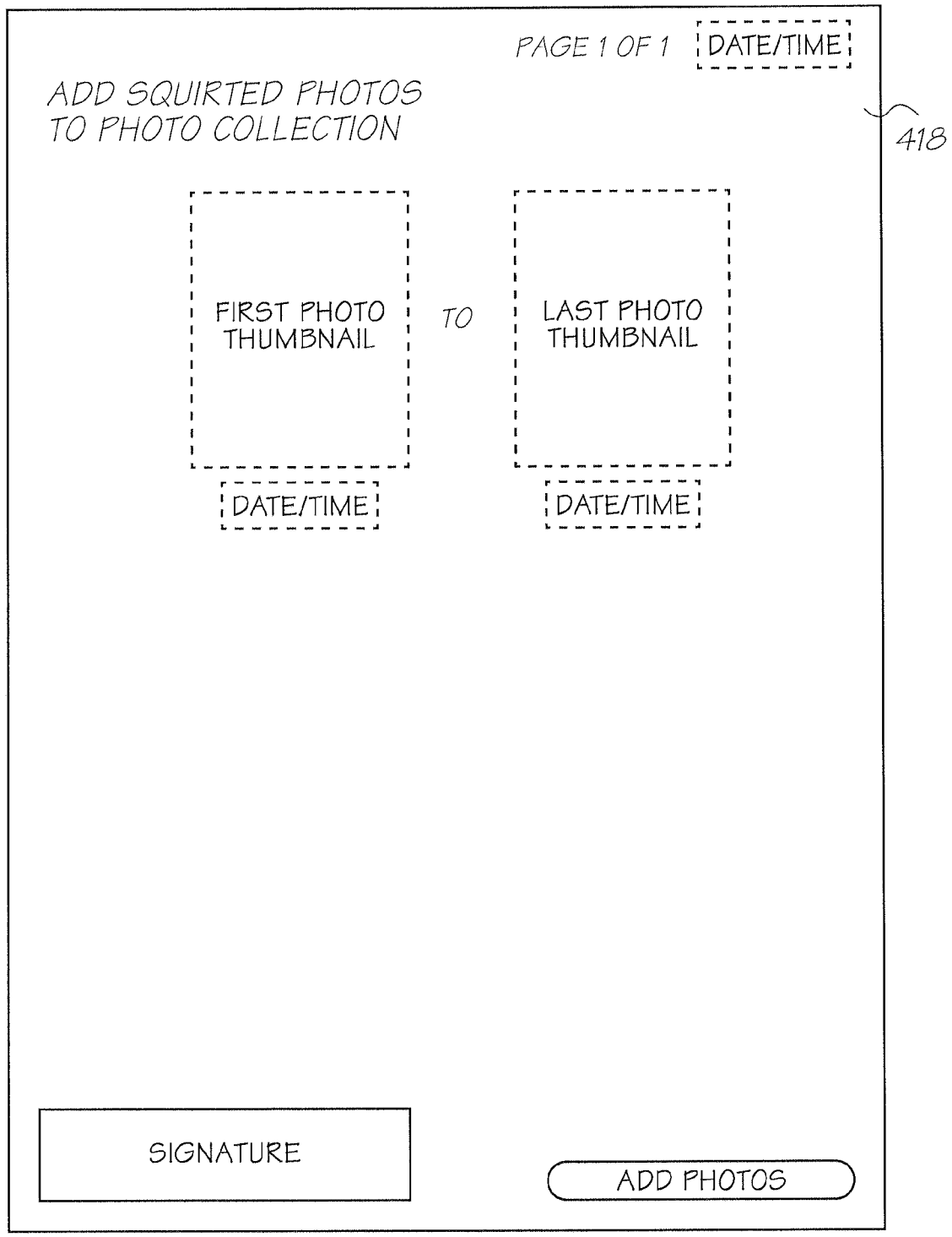
FIG. 51 is a schematic view of an add squirted photos form.

When a user squirts a collection of photos to a netpage printer, the printer sends the photos to the photo manager. If the camera is known to the netpage system, then the camera manager adds the photos to the corresponding user's photo collection. If the camera is not known, then the camera manager produces an Add Squirted Photos form 418 (FIG. 51) which allows the user to provide their identity by pressing the <add photos> button. The page shows the first and last photo in the squirt group. The photo manager optionally requires the user to sign the form to allow their identity to be verified.

Figure 48:
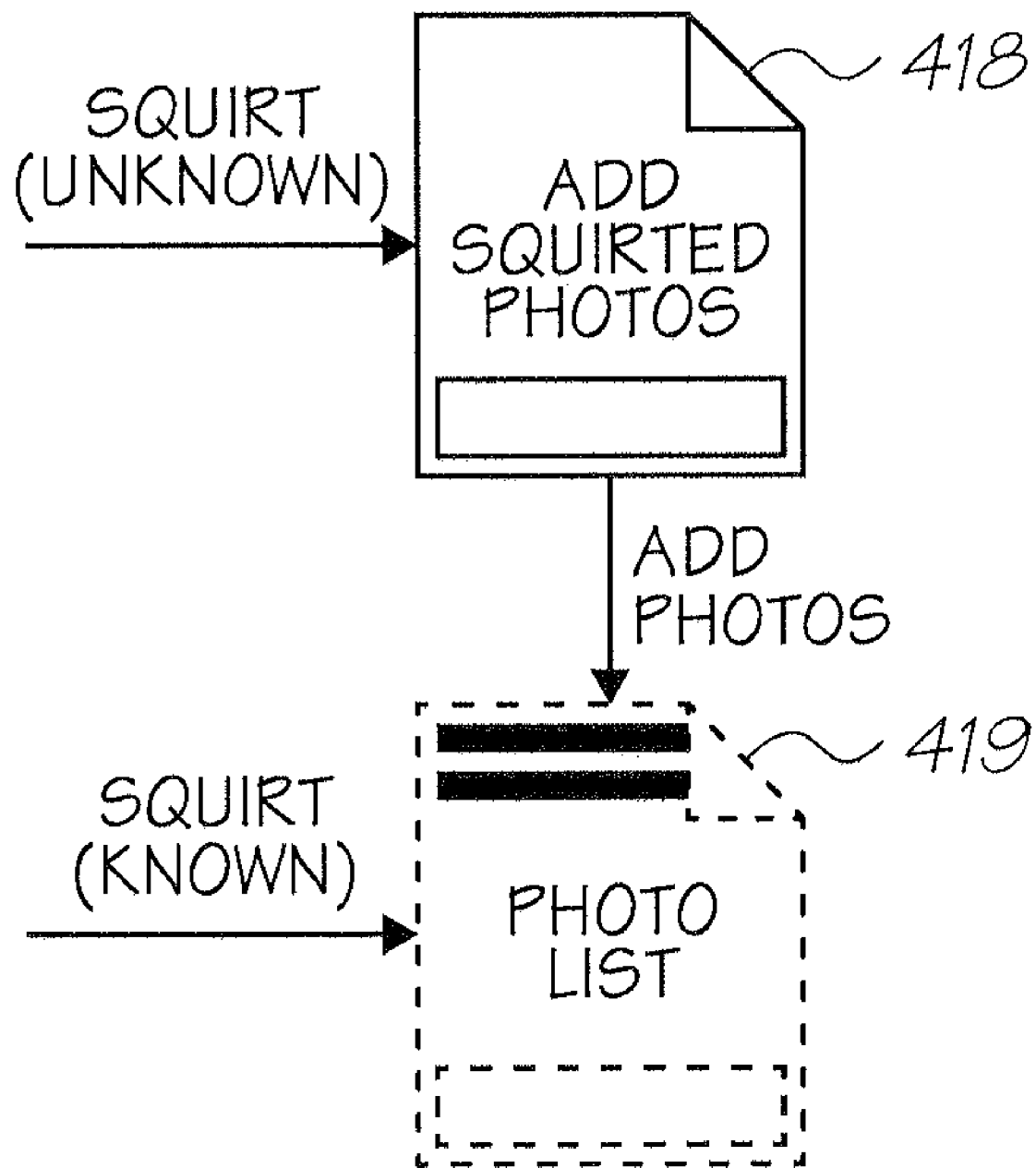
FIG. 48 is a schematic view of a photo squirting user interface flow.

The photo squirting user interface flow is illustrated in FIG. 48.

8.3.3 Photo Browsing

Figure 52:
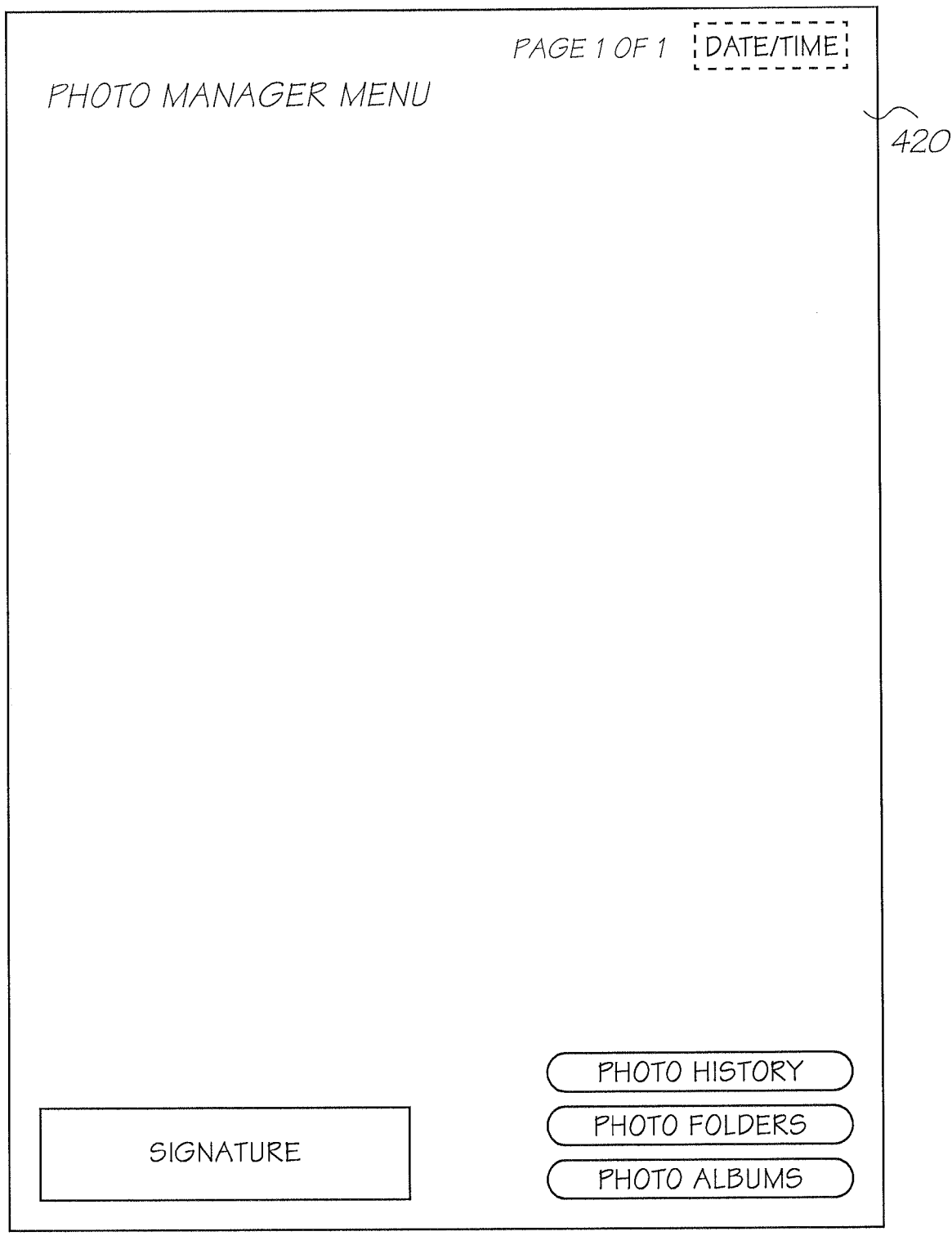
FIG. 52 is a schematic view of a photo manager menu form.

The Photo Manager Menu form 420 (FIG. 52) provides a <photo history> button giving the user access to their photo collection presented by date, and a <photo folders> button giving the user access to their photo collection via their named photo folders. The photo manager optionally requires the user to sign the form to allow their identity to be verified. The user obtains the photo manager menu via the netpage directory or a previously created bookmark.

The photo manager menu also provides a <photo albums> button, giving the user access to their photo albums.

When presented by date, the photo collection is organized into a hierarchy of squirt groups, days, weeks, months and years. Rather than presenting a strict hierarchy, however, the top-level history list also includes recent squirt groups, days, weeks and months. If a group would contain only one subordinate group, then only one group is presented. For example, if a particular week contains only a single squirt group, then the week is presented as directly containing the corresponding photo list.

Figure 53:
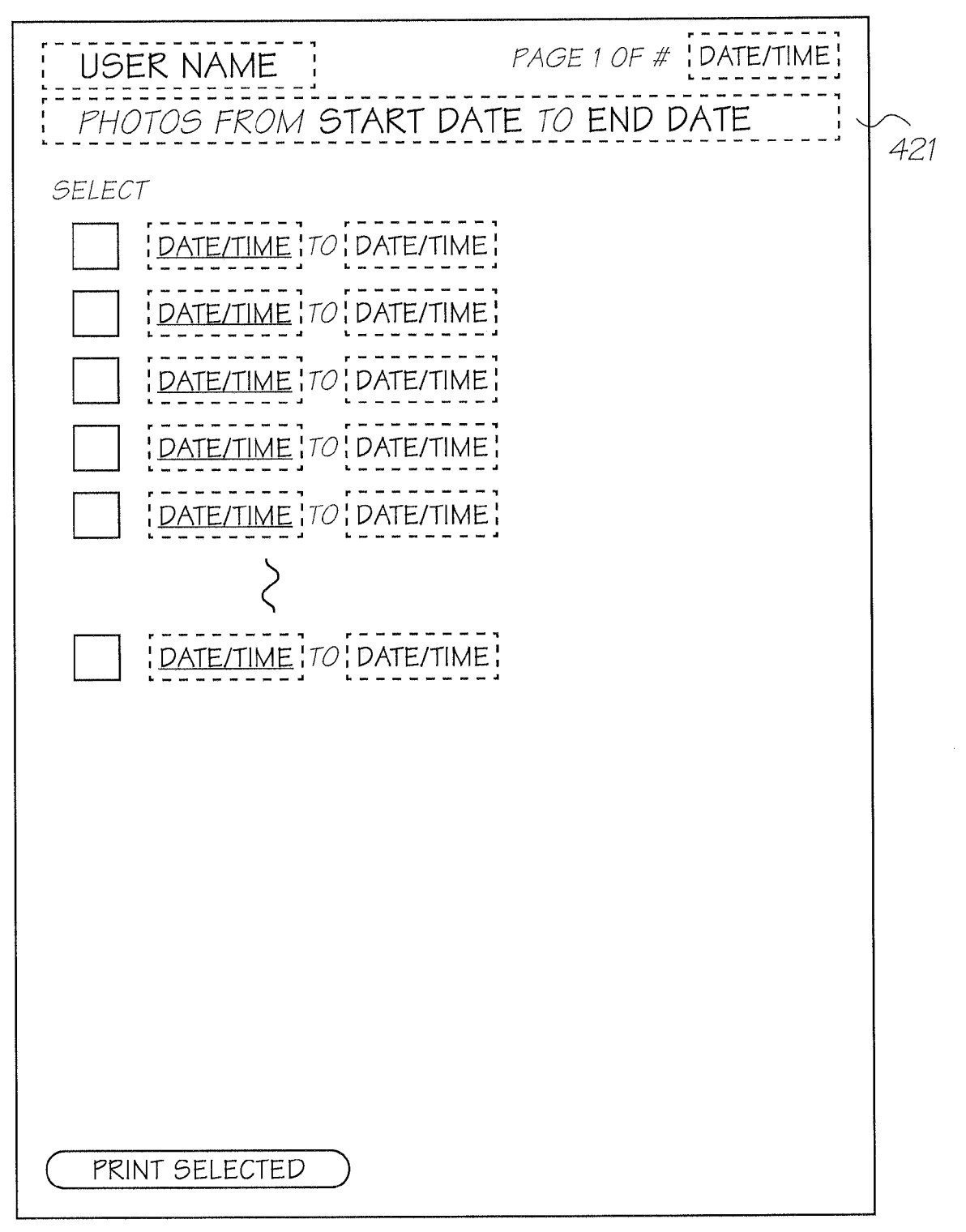

The <photo history> button on the photo manager menu produces a Photo History List form 421 (FIG. 53). Each history list form shows a list of date or date range entries, and each date acts as a hyperlink to a more detailed history list or photo list. Multiple entries can be selected via their selection checkboxes and subsequently copied to a folder via the <copy selected> button, or printed as a set of thumbnails via the <print selected> button.

Figure 54:
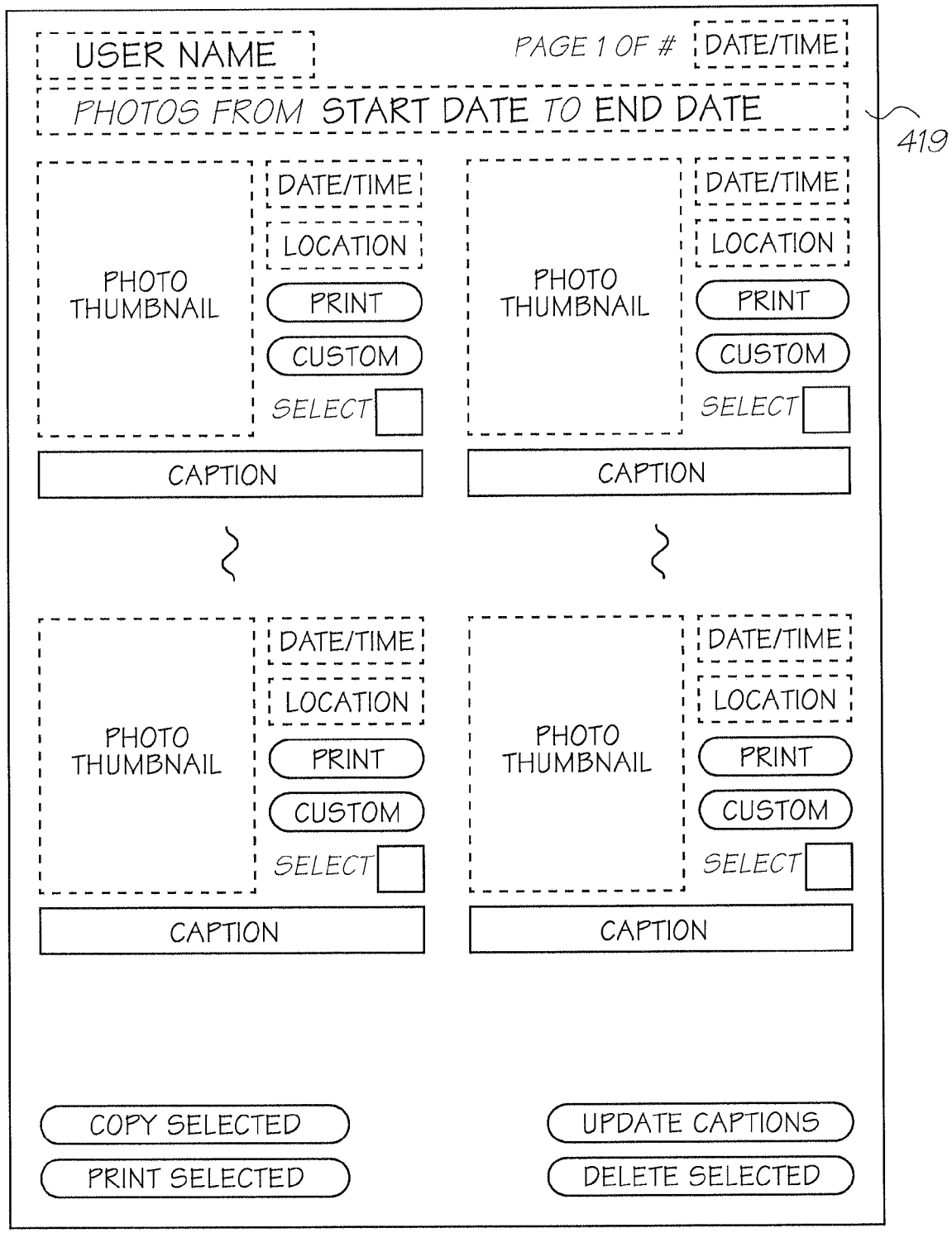
FIG. 54 is a schematic view of a photo list form.

A terminal date hyperlink produces a Photo List form 419 (FIG. 54). Each photo list form shows the thumbnail of each photo in the list, together with its caption, capture date and time, and capture location. Multiple entries can be selected via their selection checkboxes and subsequently copied to a folder via the <copy selected> button, printed as a set of thumbnails via the <print selected> button, or deleted via the <delete selected> button. Each entry has a <print> button and a <custom> button, both described below.

Figure 57:
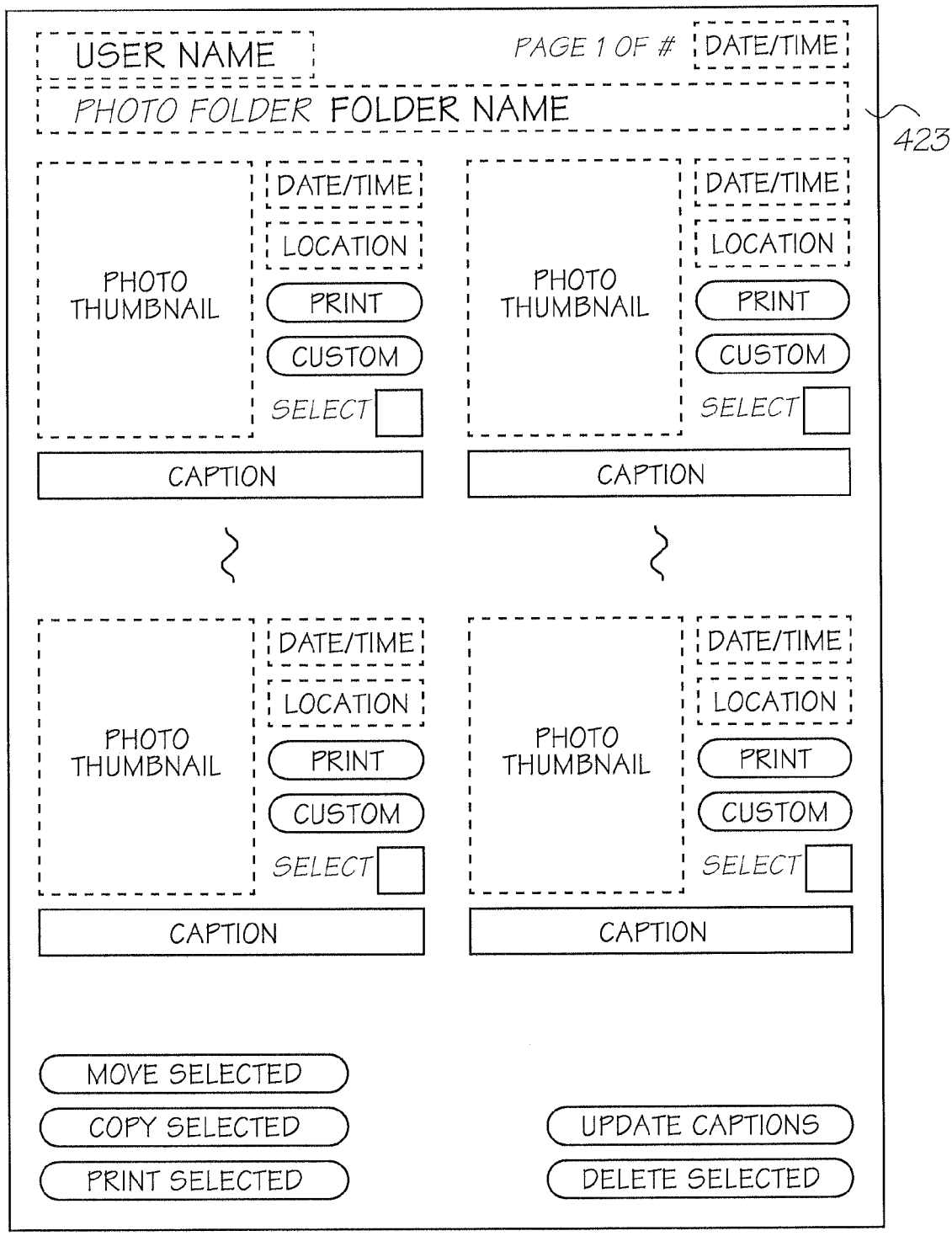
FIG. 57 is a schematic view of a photo folder form.

The <photo folders> button on the photo manager menu produces a Photo Folders form 422 (FIG. 55). The photo folders form shows a list of the user's named folder entries, and each folder name acts as a hyperlink to a Photo Folder form 423 (FIG. 57). The photo folder form shows the thumbnail of each photo in the folder, together with its caption, capture date and time, and capture location. Multiple entries can be selected via their selection checkboxes and subsequently moved to another folder via the <move selected> button, copied to another folder via the <copy selected> button, printed as a set of thumbnails via the <print selected> button, or deleted via the <delete selected> button.

Each entry has a <print> button and a <custom> button, both described below. The caption fields on the photo list and photo folder forms are text entry fields which allow the user to provide captions where none are present or to change captions as desired. After entering a number of captions, the user presses the <update captions> button to update the photos' captions.

A photo must be deleted from both the photo history list and any folders in which it appears to become fully inaccessible via the photo manager. It still remains accessible, however, via any netpage print of the photo.

Figure 56:
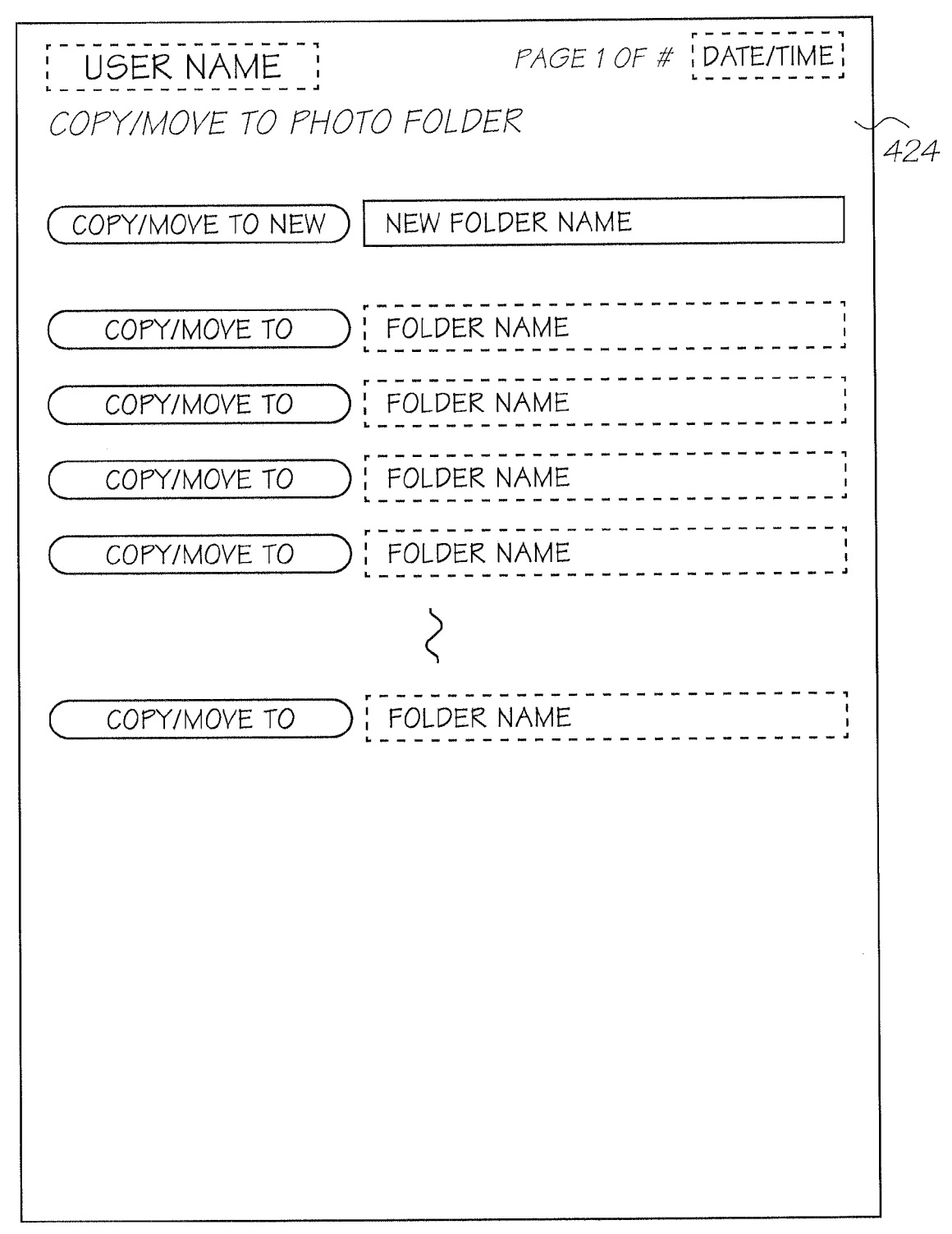

The <copy selected> (or <move selected>) button on the photo history list, photo list and photo folder pages produces a Copy (or Move) to Photo Folder form 424 (FIG. 56), containing a list of the user's named photo folders, each with a <copy to> (or <move to>) button. The form also contains a <copy to new> (or <move to new>) button together with a text field allowing the user to name and select a new folder as the destination for the copy (or move).

Figure 49:
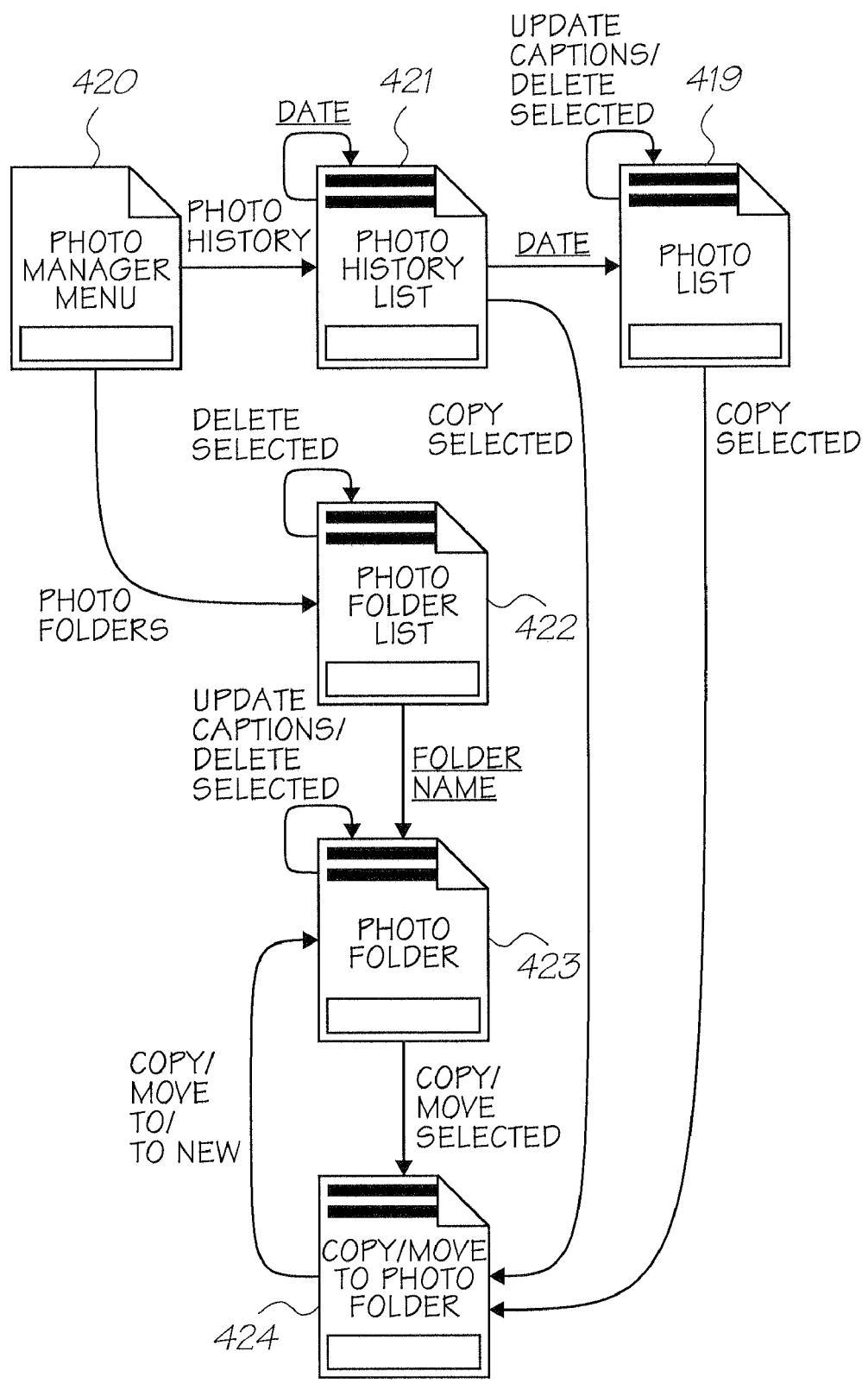
FIG. 49 is a schematic view of a photo browsing user interface flow.

The photo browsing user interface flow is illustrated in FIG. 49.

8.3.4 Photo Printing

Figure 58:
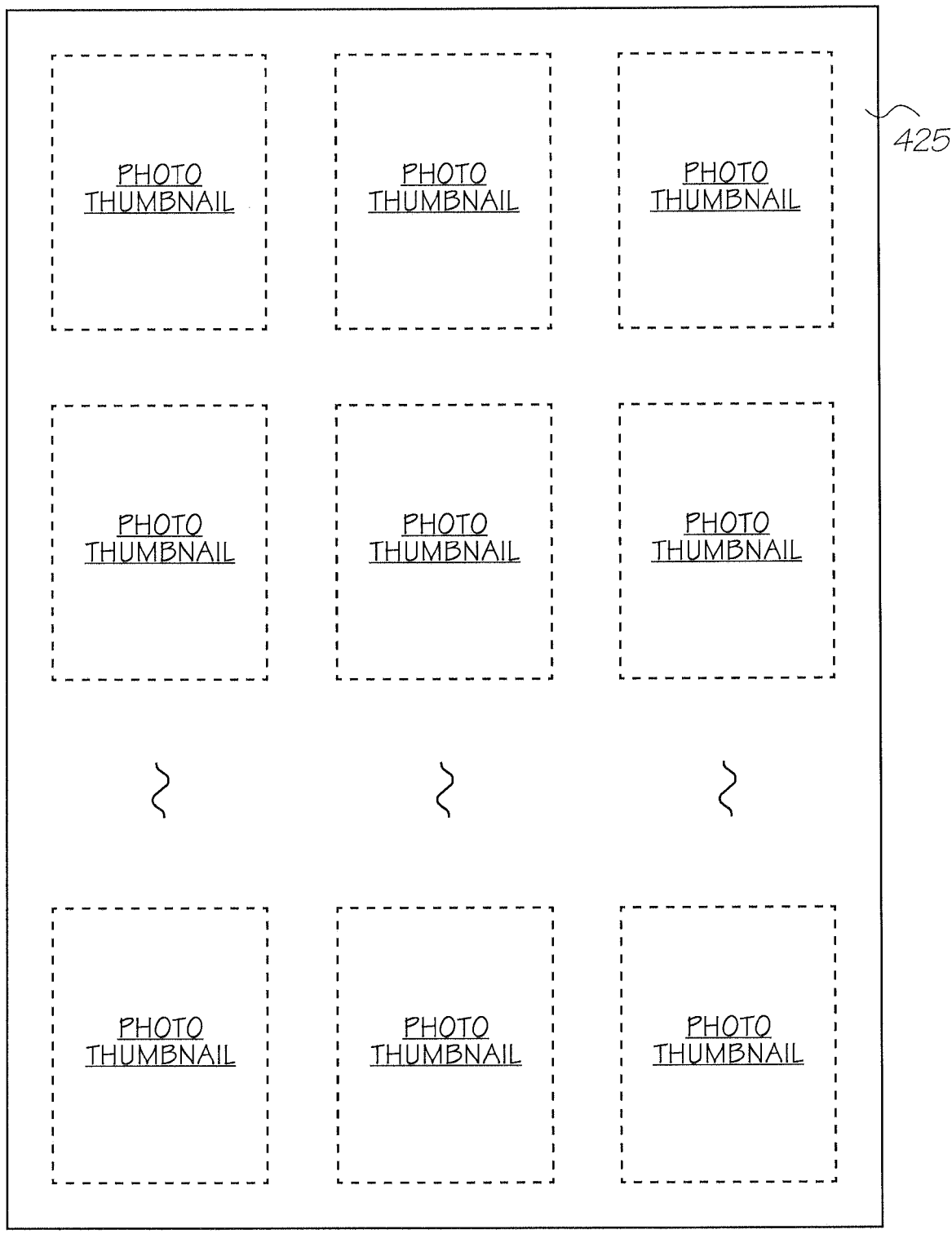
FIG. 58 is a schematic view of a photo thumbnails page.

The <print selected> button on a photo history list, photo list or photo folder form produces a Photo Thumbnails page 425 (FIG. 58), showing an array of thumbnails of the designated photos. Each thumbnail acts as a hyperlink which produces a full-page (e.g. 12×8" or 6×4" depending on paper size) print of the photo.

Each photo entry on a photo list or photo folder form has an associated <print> button which produces a full-page print of the photo. Each entry also has a <custom> button which produces the Custom Photo Print form 427 (FIG. 59) which allows the user to specify custom print options.

The custom print form shows the thumbnail, caption, capture date and time, and capture location of the selected photo.

The user can specify the number of copies of the photo to be printed, and the size of the photo. Sizes include 6×4", 12×8", and various multi-page poster sizes. The <print> button produces the requested printed copies of the photo. Depending on the paper size of the printer, the selected photo size may cause the photo to be repeated to fill the page (e.g. four 6×4" photos on a 12×8" page), or split across multiple pages (e.g. four 6×4" pages for a 12×8" photo).

Each printed photo 426 acts as a hyperlink which produces a Custom Photo Print form 427. Alternatively, the photo acts as a hyperlink which produces a full page print of the photo.

Figure 50:
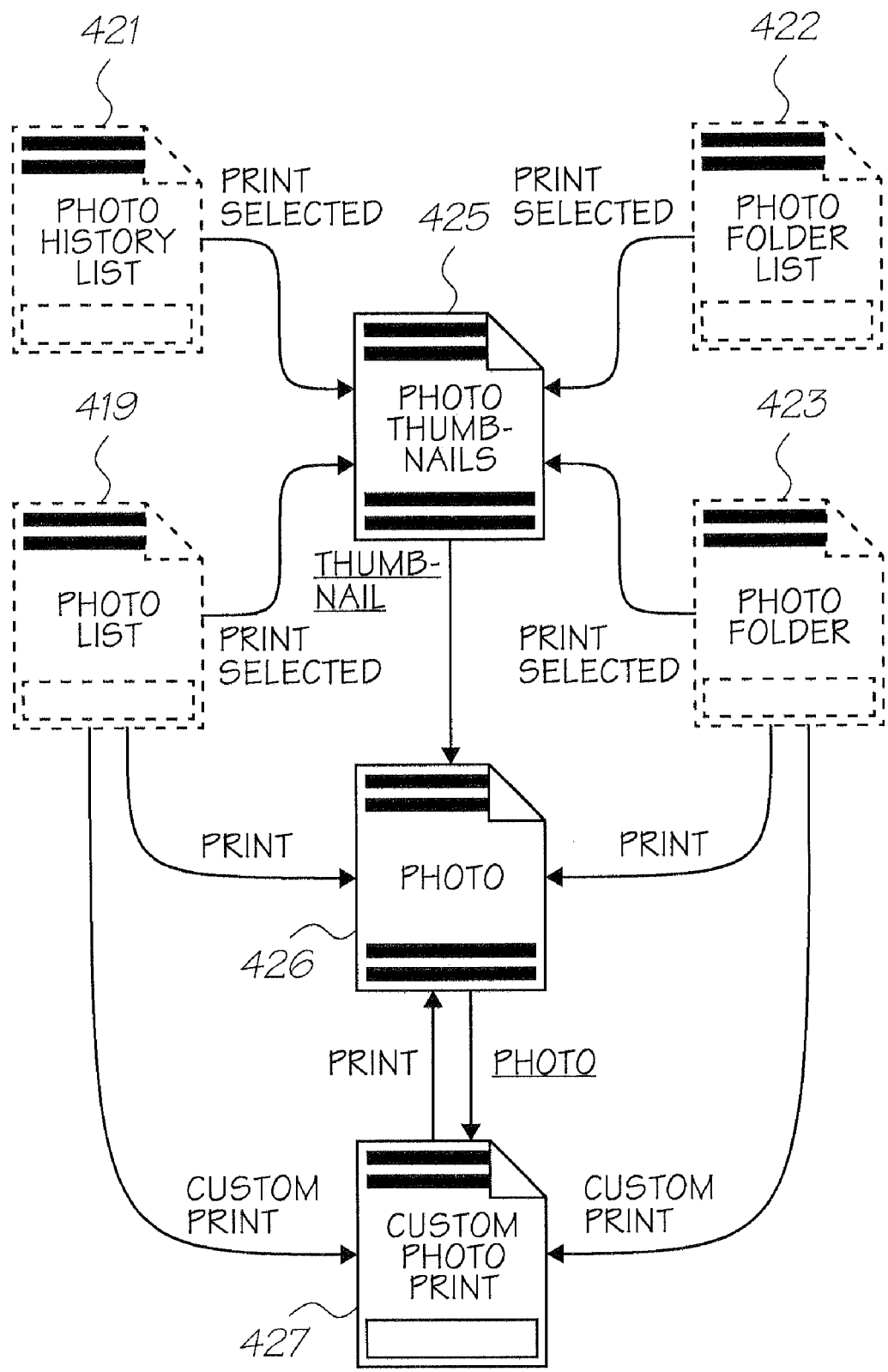
FIG. 50 is a schematic view of a photo printing user interface flow.

The photo printing user interface flow is illustrated in FIG. 50.

9 The Netpage Camera

The netpage camera, generally designated by reference numeral 1200 in the drawings, is a digital camera containing a netpage printer and a netpage network interface. It prints photos "instantly" as 6×4" netpages as they are taken, and typically transmits the photos to the netpage network immediately via a long-range netpage network interface such as a mobile telephone/data interface. This makes the photos persistent and allows the printed netpage photos to become immediately interactive. As described in section 8.3.4 above, a netpage photo typically acts as a netpage hyperlink to obtaining another copy of itself. Since the copy is derived from the digital "negative" of the photo stored persistently on a page server on the netpage network, the copy is guaranteed to be pristine even if the original printed photo has become degraded.

The netpage camera can also defer transmission until its local storage fills up, or until the user explicitly requests transmission. The camera's netpage network interface may be a short-range infrared (e.g. IrDA) or radio frequency (e.g. Bluetooth) interface, only suitable for transmitting photos to another netpage device, such as a netpage printer, when within local range of the other device.

The netpage system can pre-allocate page IDs to a netpage camera on request, to allow the camera to print netpage photos while off-line. The consumable print cartridge 504 which supplies the camera with paper and ink, and which is described in detail in section 9.3 below, can contain a pre-allocated block of page IDs in its internal flash memory. Since the number of "pages" which can be produced from a single print cartridge has an upper limit, a block of page IDs can be efficiently pre-allocated, even if never fully used.

The netpage camera, in a preferred embodiment, also acts as a fully-fledged interactive netpage printer, thus incorporating a netpage pen interface. It mediates the usual interactions between a netpage pen and the netpage network, as described elsewhere in this specification, and prints netpages on demand in response to user pen actions. It typically prints page content designed for 12×8" pages on 6×4" pages, and this is acceptable in many cases because "photo" sized pages are viewed at a shorter distance than full-size pages. Pages can of course also be printed at their normal scale, with their content adapted to the smaller page size.

9.1 Netpage Camera Preferred Embodiment

Figure 62:
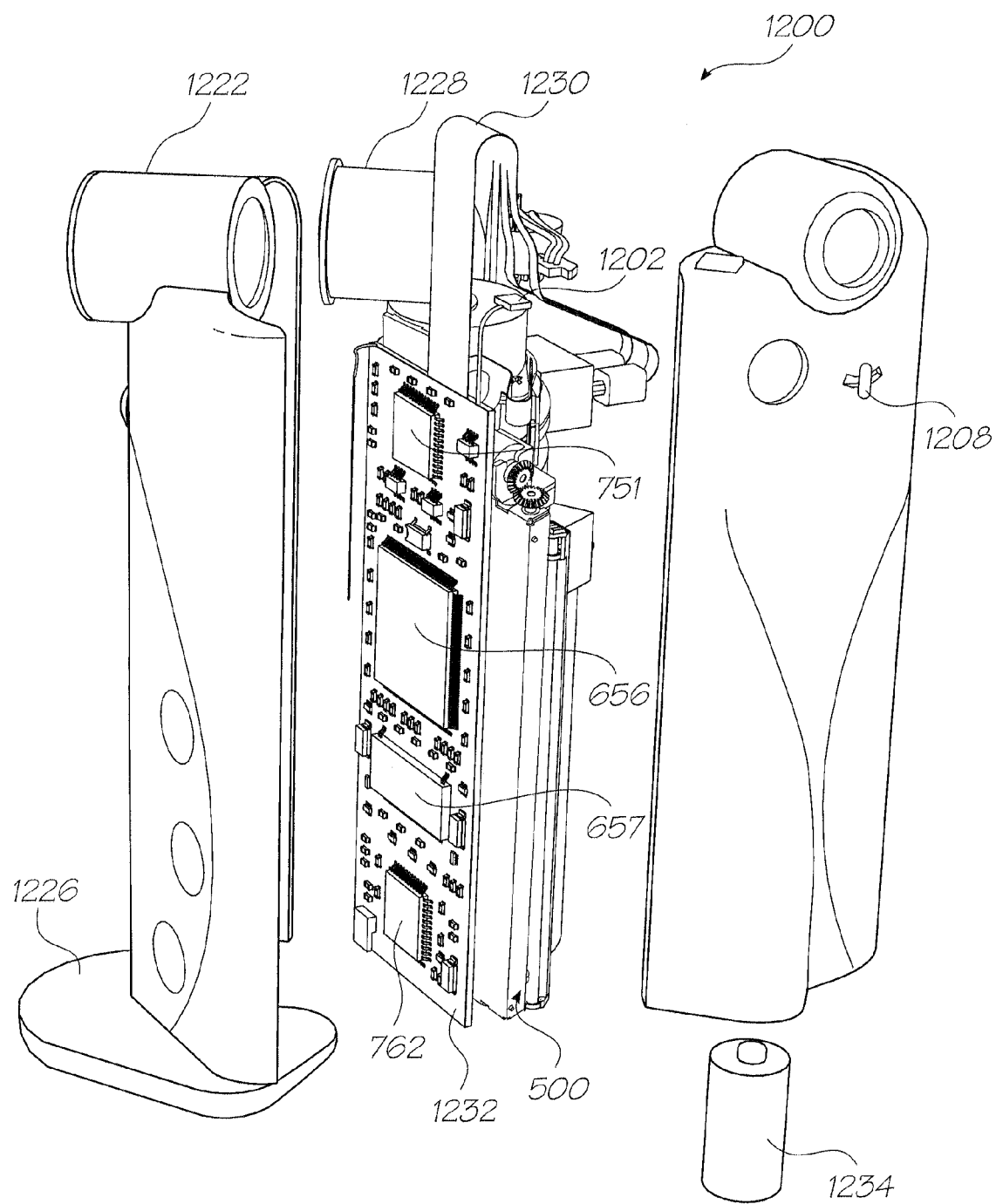
FIG. 62 is an exploded perspective view of the netpage camera.
Figure 63:
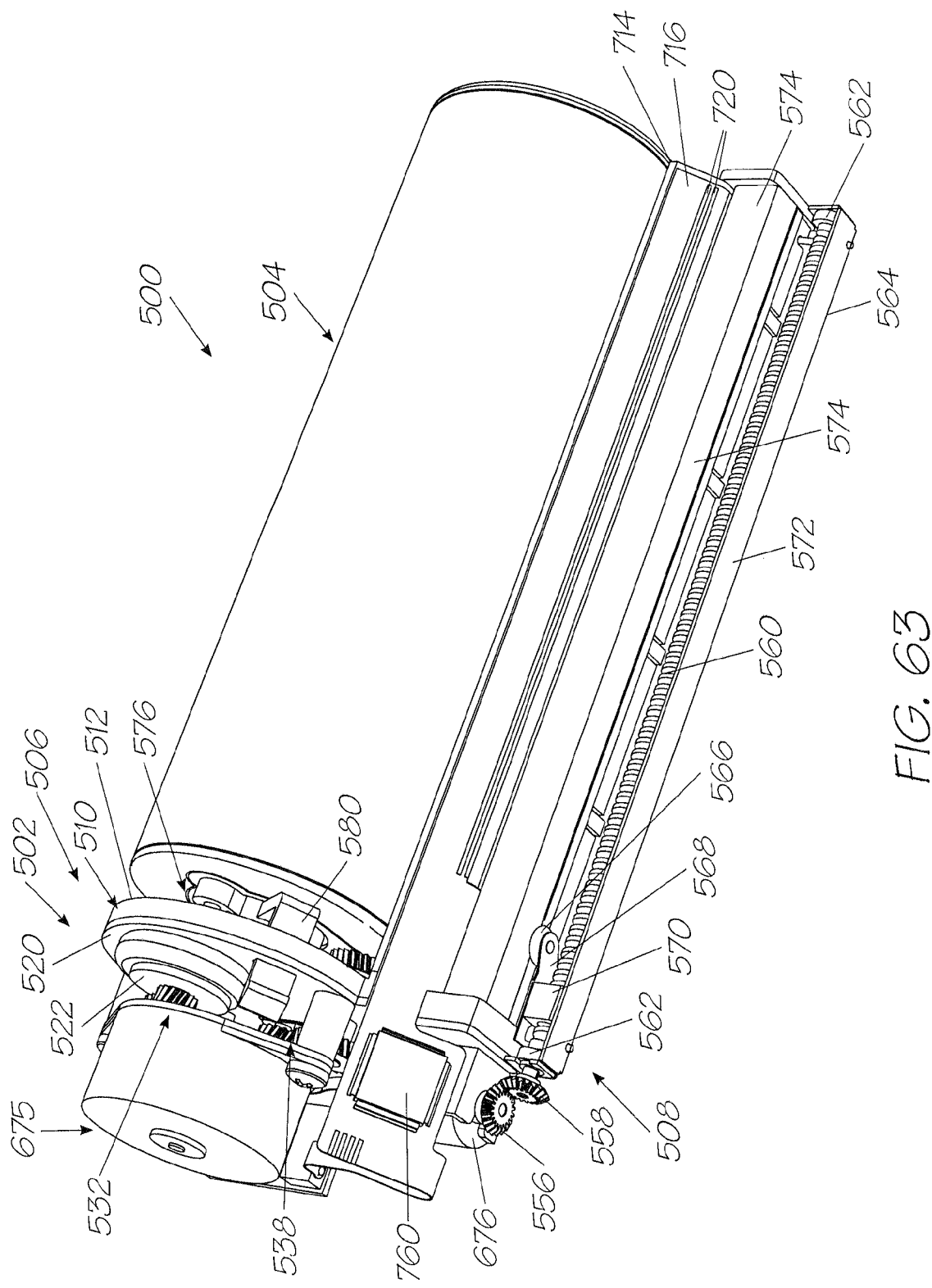
FIG. 63 is a perspective view of a print engine.
Figure 64:
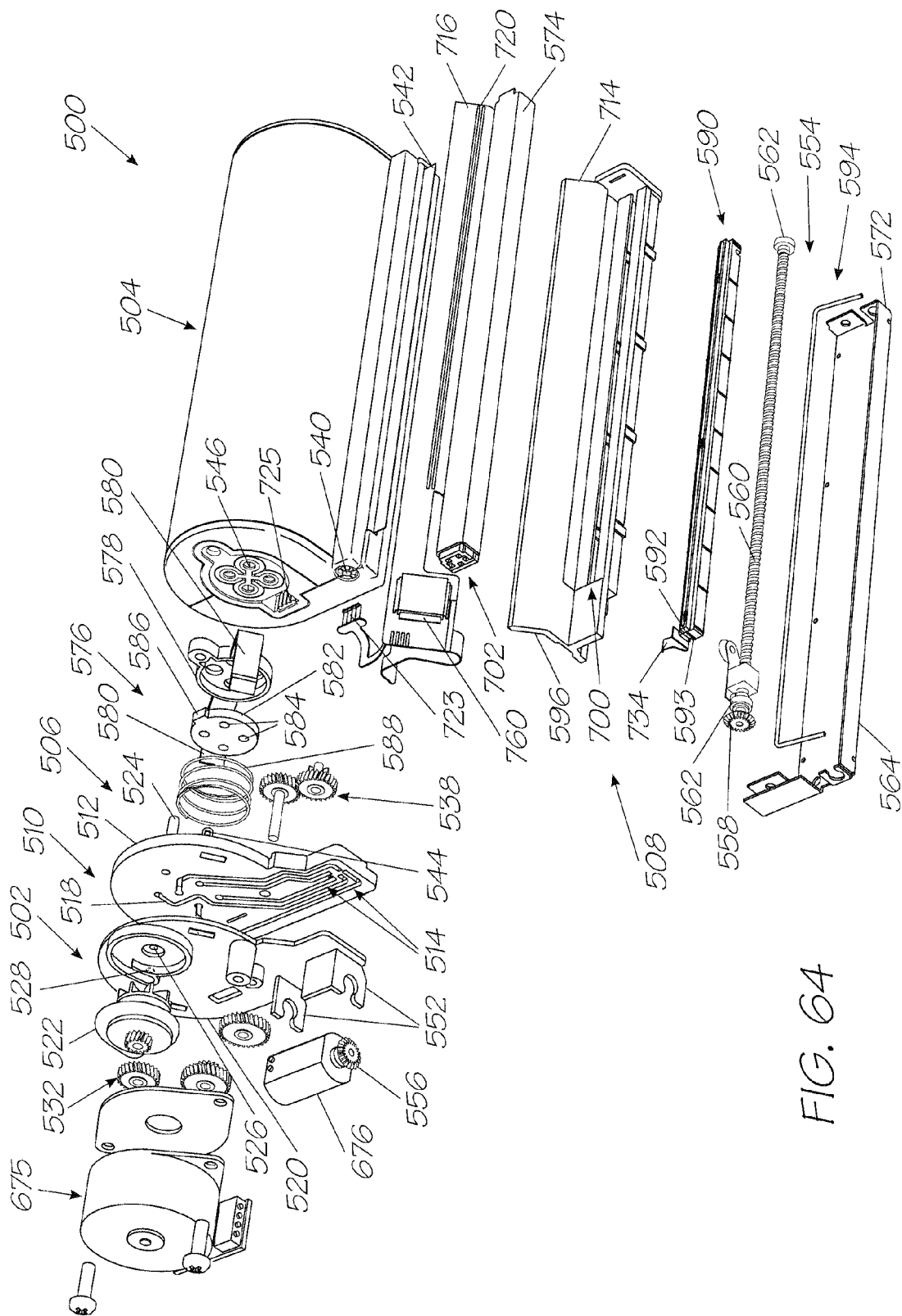
FIG. 64 is an exploded perspective view of the print engine.
Figure 65:
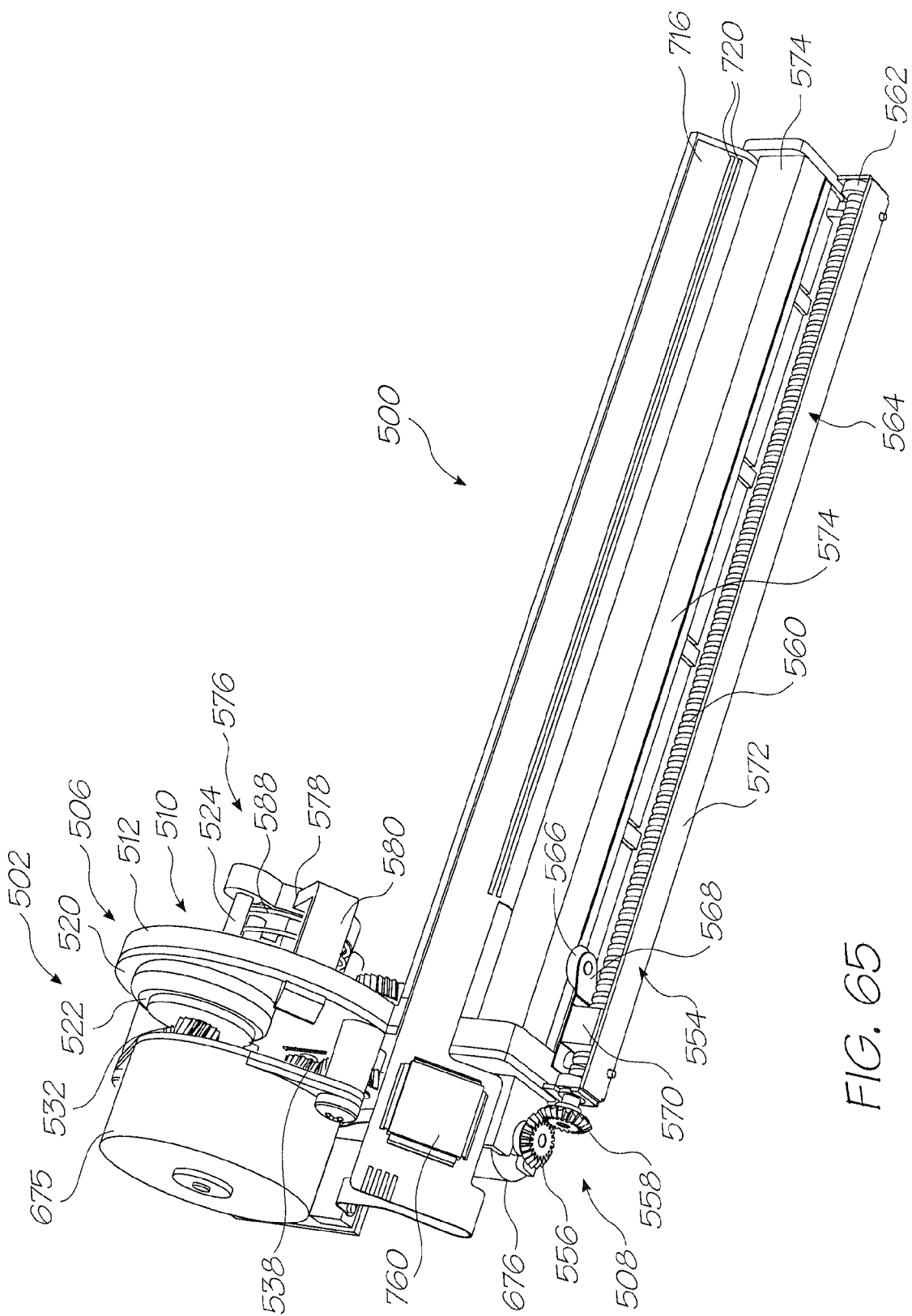
FIG. 65 is a perspective view of the print engine with a print cartridge used with the print engine removed.

A preferred embodiment of the netpage camera 1200, according to the present invention, is illustrated in FIGS. 60 to 62. The netpage camera 1200 is a pocket-sized camera incorporating fixed-focus optics 1228 and a compact print engine 500 (described in detail in section 9.2 below). The print engine includes a monolithic 4" (100 mm) page-width Memjet™ printhead 350 (FIG. 20), and accommodates a removable print cartridge 504 (shown fully in FIG. 72) which supplies the print engine with the print medium (i.e. paper or the like) in roll form, as well as colored inks. The print cartridge includes 18'×4" of print medium, i.e. enough for thirty-six 6×4" photo prints.

The camera body is formed from a rear molding 1210 and a front molding 1222. A rotating door 1226 in the base provides access to the print cartridge 504 and the CR2 battery 1212. The front molding includes a rubberized grip area 1224.

The rear molding 1210 (FIG. 60) accommodates an LCD indicator 1204, which provides an indication of shots/prints remaining and battery life remaining; a print button 1202 which allows the user to re-print the last photo taken; a viewfinder 1206; and a photo size slider 1208 which allows the user to select one of several pre-defined photo aspect ratios ranging from classic to panoramic. Since the print engine 500 incorporates a guillotine, a continuous range of aspect ratios are supported by the print engine, all printed 4" wide.

The front molding 1222 (FIG. 61) accommodates the lens 1218 and the take button 1220. The take button allows the user to capture a photo, and produces an immediate print of the photo.

In a preferred embodiment, the print cartridge 504 dictates whether a photo is printed as a normal photo or as an interactive netpage photo. In an alternative embodiment, the user specifies how a photo is printed. To support the printing of netpages, the print cartridge 504 includes a supply of infrared ink, as well as the usual cyan, magenta and yellow (CMY) colored inks. Because of the lower printing speed of the netpage camera, i.e. about 3"/s rather than about 12"/s for an A4/Letter netpage printer, the print cartridge does not include a supply of fixative.

The print cartridge also dictates whether the netpage camera operates as an interactive netpage printer. If a non-netpage print cartridge is inserted, then the camera is prevented from operating as an interactive netpage printer.

As illustrated in FIG. 62, the camera body houses fixed focus optics 1228; the main PCB 1232; and the print engine 500. These are interconnected via a flex PCB 1230. The flex PCB also connects the LCD indicator 1204, buttons 1202 and 1220, and the slider 1208 to the main PCB.

The main PCB 1232 holds the camera controller 656; a 32 MB DRAM 657; an RF chip 762 containing the analog components of the radio transceiver used for short-range communication with the netpage pen; and a cellular phone interface 751 for long-range communication with servers on the netpage network.

The optics 1228 are directly coupled with a CCD image sensor (776 in FIG. 74), which in turn interfaces with the camera controller 656 on the main PCB. In an alternative embodiment, a CMOS image sensor is utilized.

The print engine 500 includes a print engine controller 760 which communicates with the camera controller 656 on the main PCB. The print engine controller controls the Memjet™ printhead 350 and the stepper motors, as described in section 7.2.2.

Figure 75:
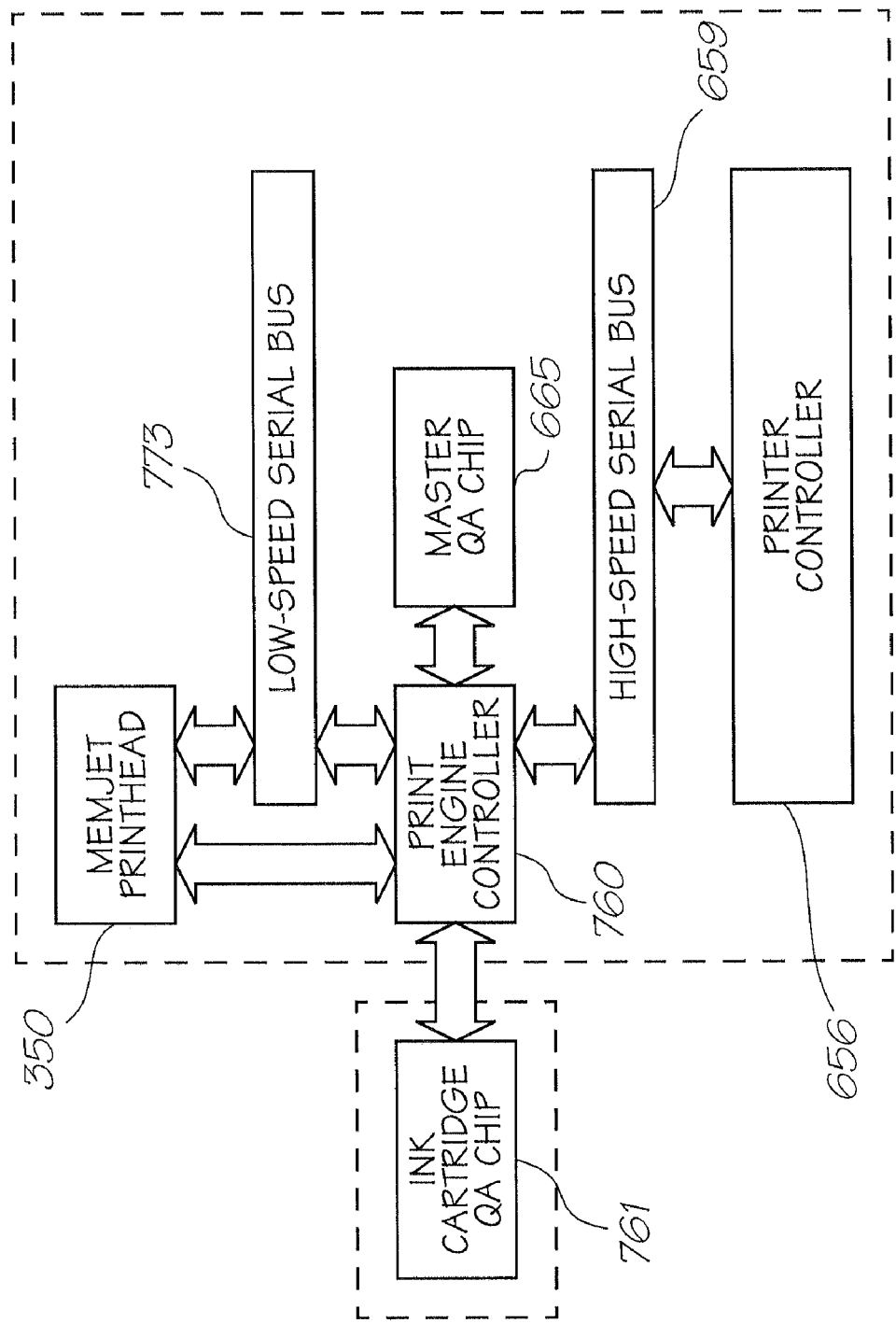
FIG. 75 is a schematic block diagram of a print engine controller and Memjet™ printhead associated with the camera controller shown in FIG. 74.

The preferred embodiment of the netpage camera prints single-sided. The interconnection of the camera controller 656, a single print engine controller 760 and a single printhead 350 is illustrated in FIG. 75.

Figure 74:
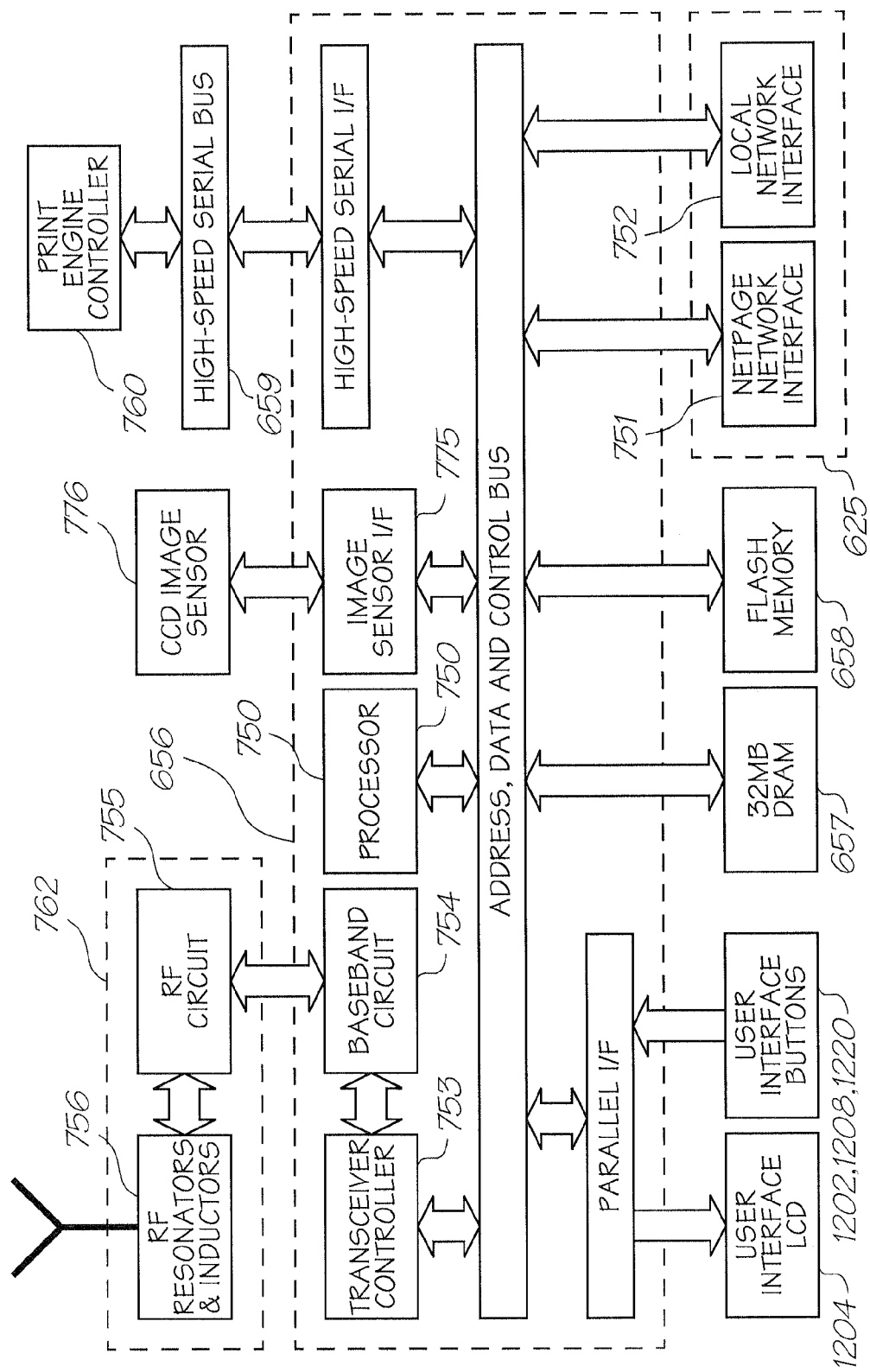
FIG. 74 is a schematic block diagram of a camera controller for the netpage camera shown in FIGS. 60 to 62.

The architecture of the camera controller is illustrated in FIG. 74. It shares its architecture with that of the printer controller (FIG. 14), but incorporates an image sensor interface 775 to allow the processor 750 to capture an image via the image sensor 776. The camera controller does not include the RIP DSPs 757 of the printer controller, instead relying on the processor 750 to rasterize netpage page descriptions and perform image processing on photos.

9.2 Netpage Camera Print Engine

A preferred embodiment of the netpage camera print engine, generally designated by reference numeral 500, is illustrated in FIGS. 63 to 71. The print engine 500 includes a print engine assembly 502 on which a print cartridge 504 is removably mountable.

The print cartridge 504 is a receptacle containing consumables such as a supply of print media and various types of ink.

The print engine assembly 502 comprises a first sub-assembly 506 and a second, printhead sub-assembly 508.

The sub-assembly 506 includes a chassis 510. The chassis 510 comprises a first molding 512 in which ink supply channels 514 are molded. The ink supply channels 514 supply inks from the print cartridge 504 to a printhead 350 (FIGS. 68 to 70) of the printhead sub-assembly 508. The printhead 350 prints in four colors or three colors plus ink which is visible in the infrared light spectrum only (hereinafter referred to as 'infrared ink'). Accordingly, four ink supply channels 514 are defined in the molding 512 together with an air supply channel 518. The air supply channel 518 supplies air to the printhead 350 to inhibit the build up of foreign particles on a nozzle guard of the printhead 350.

The chassis 510 further includes a cover molding 520. The cover molding 520 supports a pump 522 thereon. The pump 522 is a suction pump, which draws air through an air filter in the print cartridge 504 via an air inlet pin 524 and an air inlet opening 526. Air is expelled through an outlet opening 528 into the air supply channel 518 of the chassis 510.

The chassis 510 further supports a first drive motor in the form of a stepper motor 675. The stepper motor 675 drives the pump 522 via a first gear train 532. The stepper motor 675 is also connected to a drive roller 534 (FIG. 68) of a roller assembly 536 of the print cartridge 504 via a second gear train 538. The gear train 538 engages an engagable element 540 (FIG. 65) carried at an end of the drive roller 534. The stepper motor 675 thus controls the feed of print media 542 to the printhead 350 of the sub-assembly 508 to enable an image to be printed on the print media 542 as it passes beneath the printhead 350. It also to be noted that, as the stepper motor 675 is only operated to advance the print media 542, the pump 522 is only operational to blow air over the printhead 350 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 68) in the print cartridge 504 to be supplied to the printhead 350.

A second motor 676, which is a DC motor, is supported on the cover molding 520 of the chassis 510 via clips 552. The motor 676 is provided to drive a separating means in the form of a cutter arm assembly 554 to part a piece of the print media 542, after an image has been printed thereon, from a remainder of the print media. The motor 676 carries a beveled gear 556 on an output shaft thereof. The beveled gear 556 meshes with a beveled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 350. In addition, the insert 584 defines a land or platform 586 which closes off an inlet opening of the air inlet pin 524 for the same purposes.

Figure 66:
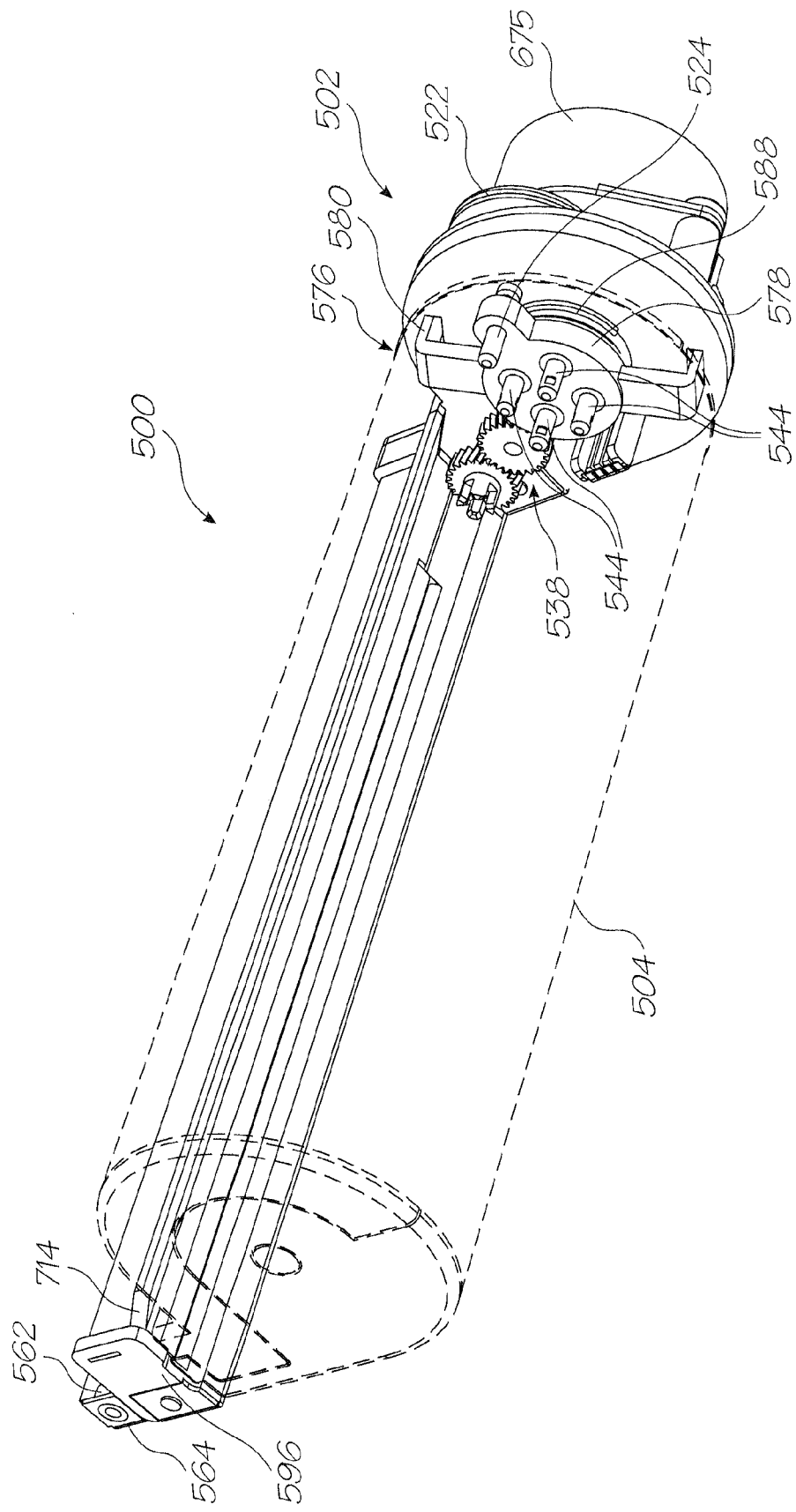
FIG. 66 is a perspective rear view of the print engine with the print cartridge shown in ghost outline.

A coil spring 588 is arranged between the chassis 510 and the collar 578 to urge the collar 578 to a spaced position relative to the chassis 510 when the cartridge 504 is removed from the print engine 500, as shown in greater detail in FIG. 66 of the drawings. The ejector mechanism 576 is shown in its retracted position in FIG. 67 of the drawings.

The printhead sub-assembly 508 includes, as described above, the base plate 564. A capping mechanism 590 is supported displaceably on the base plate 564 to be displaceable towards and away from the printhead 350. The capping mechanism 590 includes an elongate rib 592 arranged on a carrier 593. The carrier is supported by a displacement mechanism 594, which displaces the rib 592 into abutment with the printhead 350 when the printhead 350 is inoperative. Conversely, when the printhead 350 is operational, the displacement mechanism 594 is operable to retract the rib 592 out of abutment with the printhead 350.

The printhead sub-assembly 508 includes a printhead support molding 596 on which the printhead 350 is mounted. The molding 596, together with an insert 599 arranged in the molding 596, defines a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 70) to the printhead 350.

An air supply channel 711 (FIG. 71) is defined in the spine portion 704, alongside the printhead 350.

Electrical signals are provided to the printhead 350 via a TAB film 712 which is held captive between the insert 599 and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 350 and to the other powered components of the print engine 500. Further, a camera print engine control chip 760 is supported on the flex PCB 716 together with a QA chip (665 in FIG. 75) which authenticates that the cartridge 504 is compatible and compliant with the print engine 500. For this purpose, the PCB 716 includes contacts 723, which engage contacts 725 in the print cartridge 504.

Figure 70:
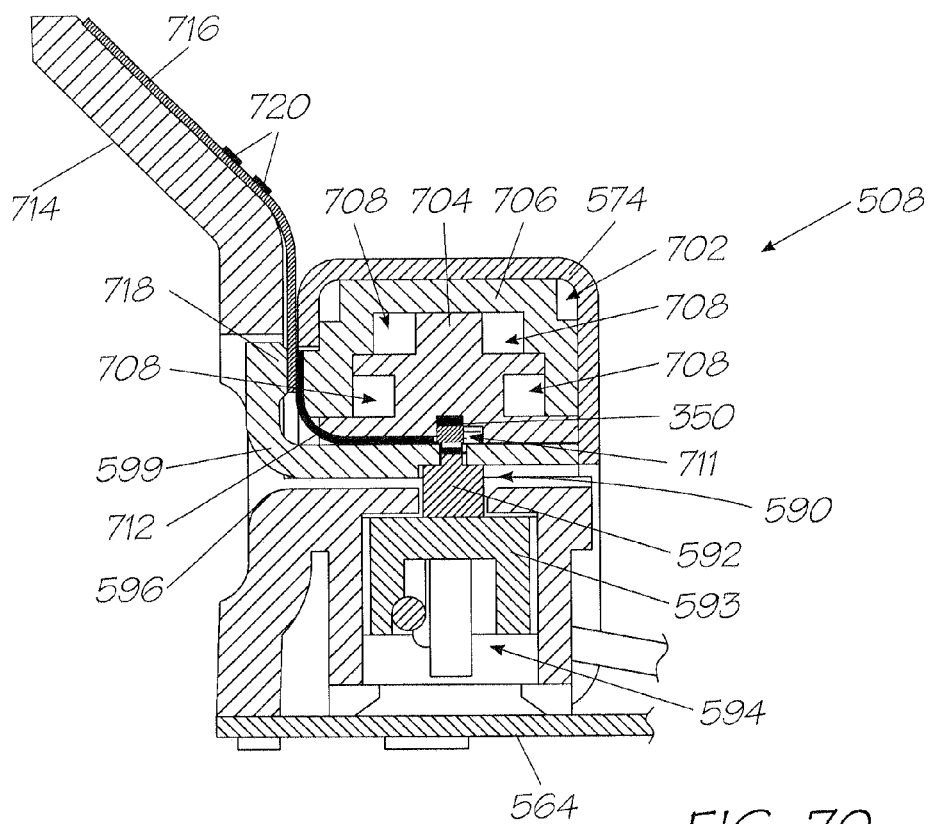
FIG. 70 is a sectional end view of the printhead sub-assembly with a capping mechanism in a capped position.
Figure 71:
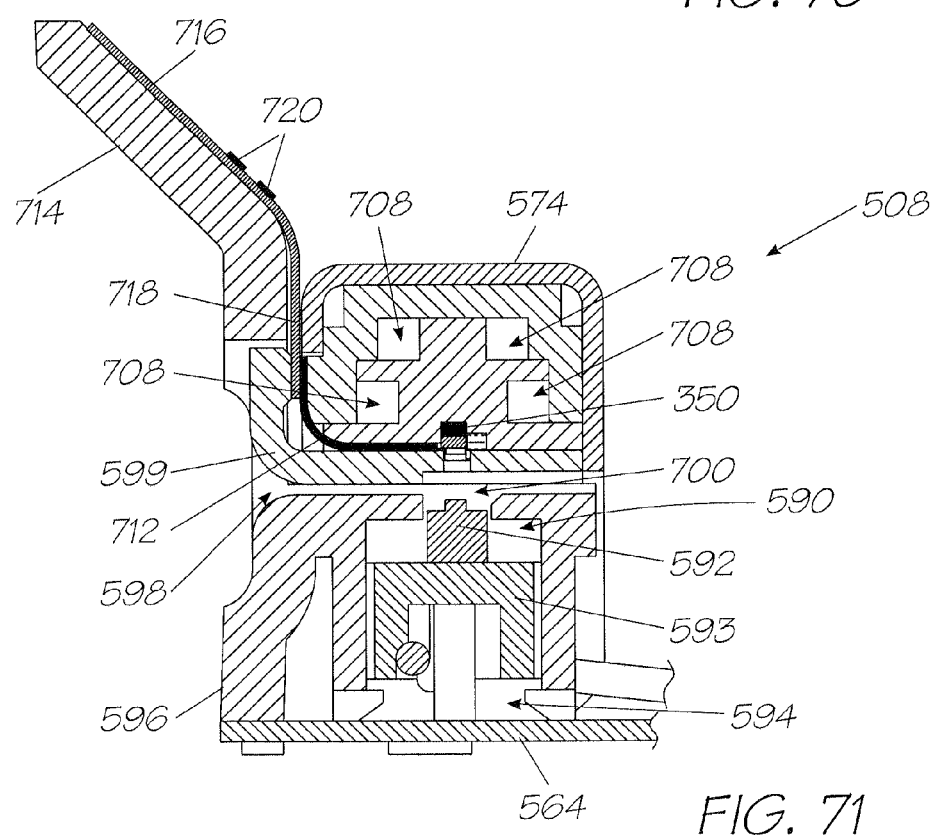
FIG. 71 is a sectional end view of the printhead sub-assembly with a capping mechanism in an uncapped position.

As illustrated more clearly in FIG. 70 of the drawings, the printhead itself includes a nozzle guard 722 arranged on a silicon wafer 724. The ink is supplied to a nozzle array (FIG. 18) of the printhead 350 via an ink supply member 726. The ink supply member 726 communicates with outlets of the passages 710 of the ink feed arrangement 702 for feeding ink to the array of nozzles of the printhead 350, on demand.

9.3 Netpage Camera Print Cartridge

Figure 72:
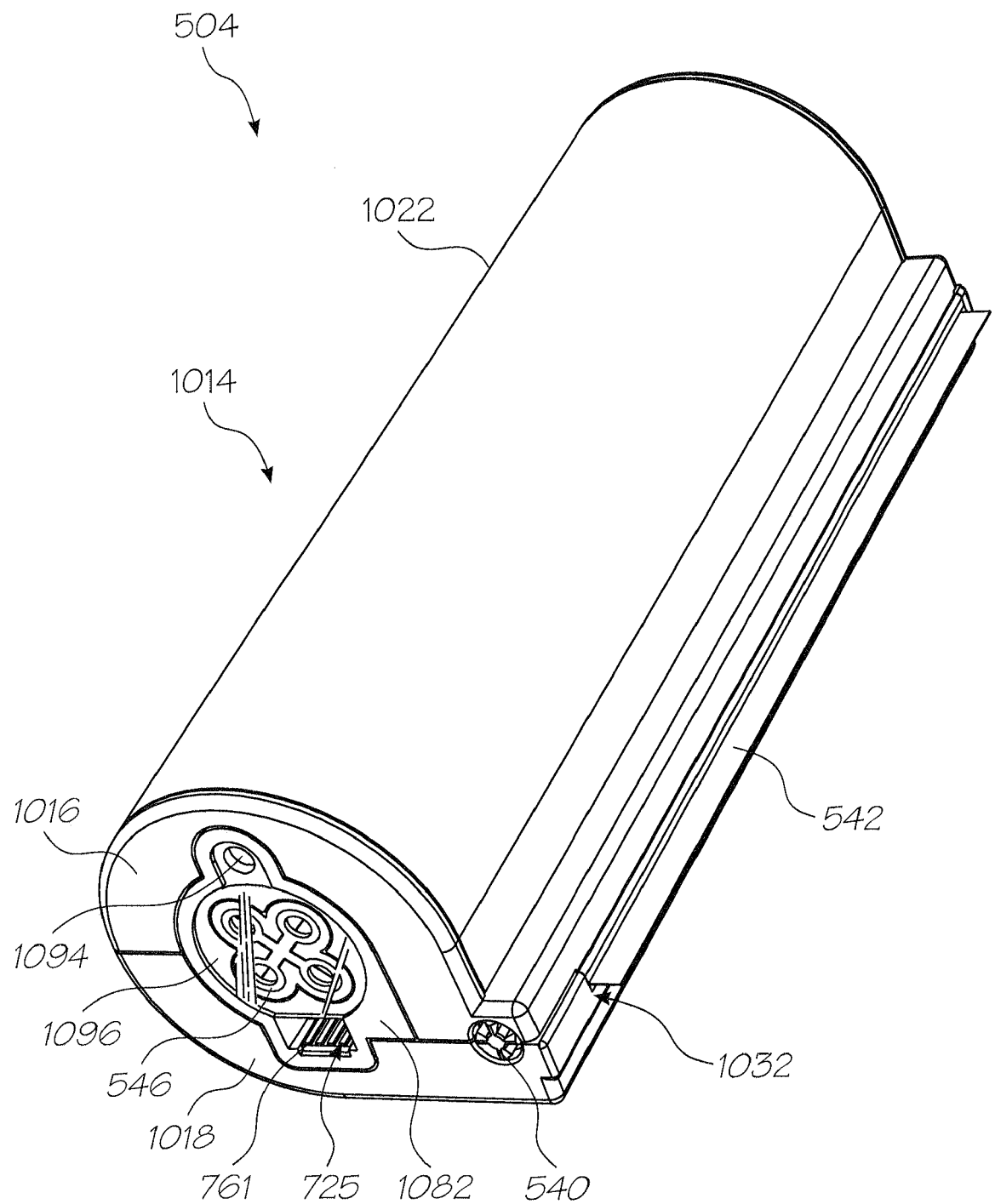
FIG. 72 is a perspective view of the print cartridge.
Figure 73:
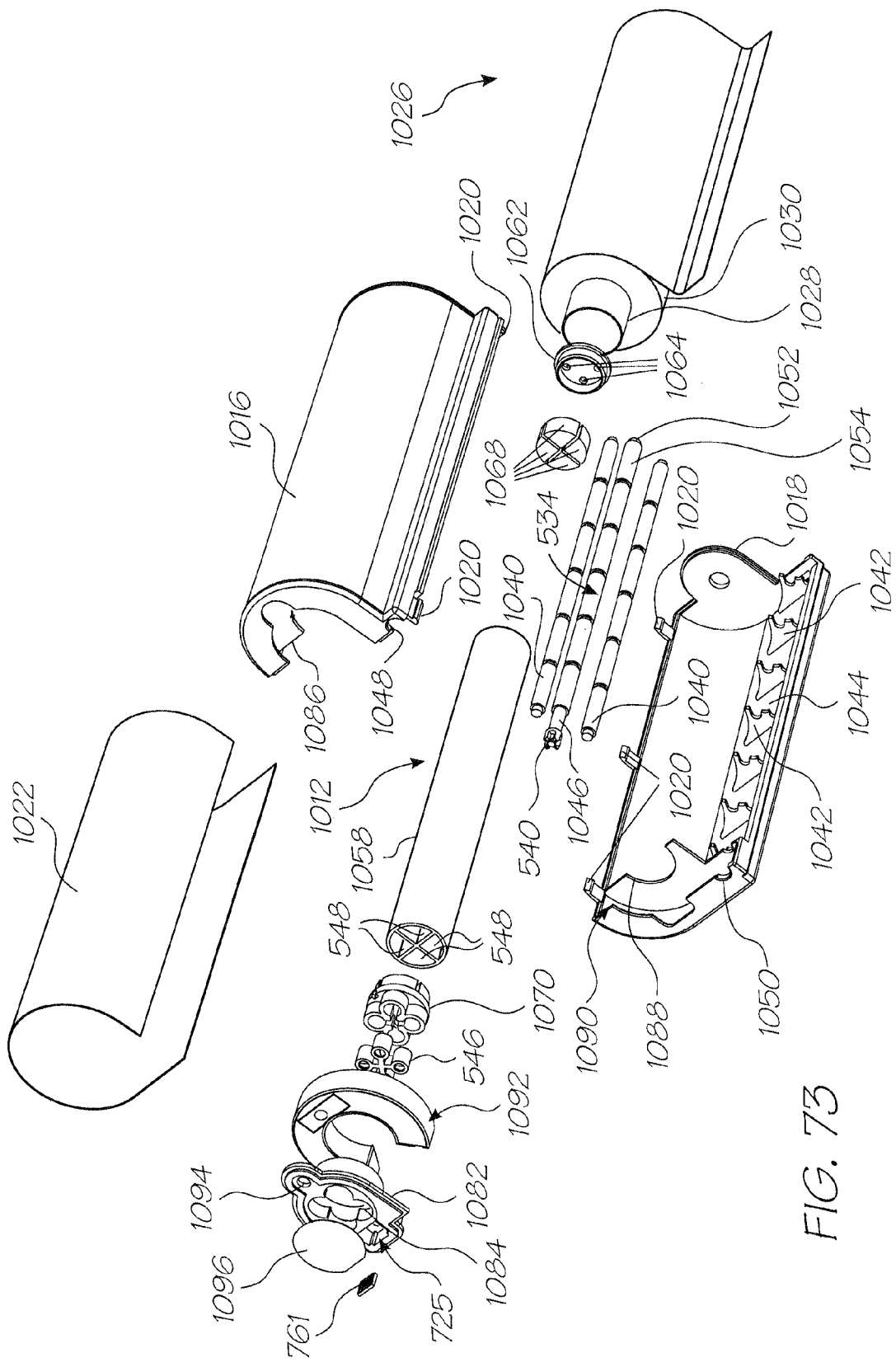
FIG. 73 is a perspective exploded view of the print cartridge.

A preferred embodiment of the netpage print cartridge, generally designated by reference numeral 504, is illustrated in FIGS. 72 and 73, and, in the context of the print engine 500, in FIGS. 63 to 67.

The print cartridge 504 includes an ink cartridge 1012 and a housing 1014. As illustrated more clearly in FIG. 73, the housing 1014 is defined by an upper molding 1016 and a lower molding 1018. The moldings 1016 and 1018 clip together by means of clips 1020. The housing 1014 is covered by a label 1022 which provides an attractive appearance to the cartridge 504. The label 1022 also carries information to enable a user to use the cartridge 504.

The housing 1014 defines a chamber in which the ink cartridge 1012 is received. The ink cartridge 1012 is fixedly supported in the chamber of the housing 1014.

A supply of print media 1026 comprising a roll 1030 of paper 542 wound about a former 1028 is received in the chamber of the housing 1014. The former 1028 is slidably received over the ink cartridge 1012 and is rotatable relative thereto.

As illustrated in FIG. 72, when the upper molding 1016 and lower molding 1018 are clipped together, an exit slot 1032 is defined through which a tongue of the paper 542 is ejected.

Figure 67:
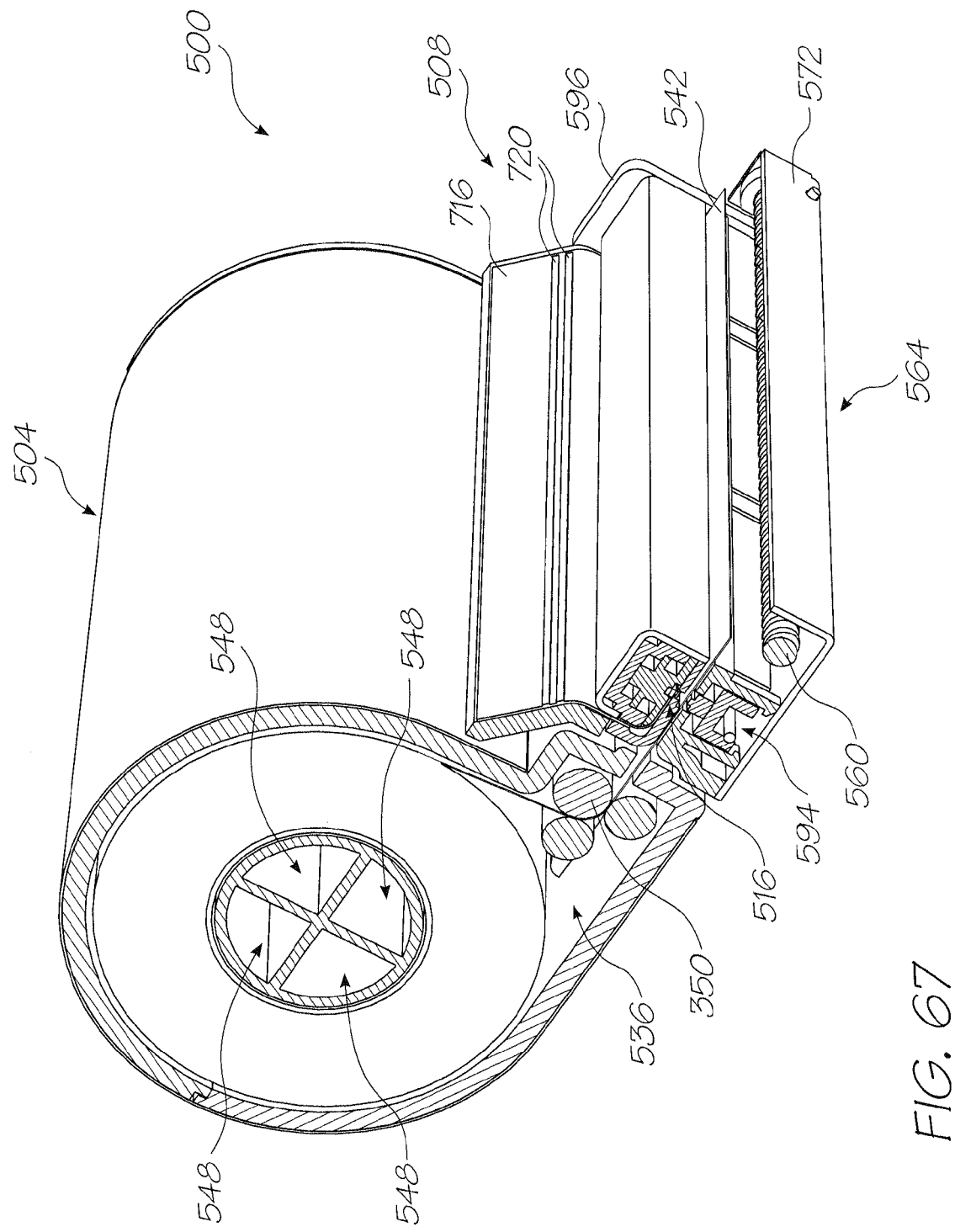
FIG. 67 is a perspective sectional view of the print engine.
Figure 68:
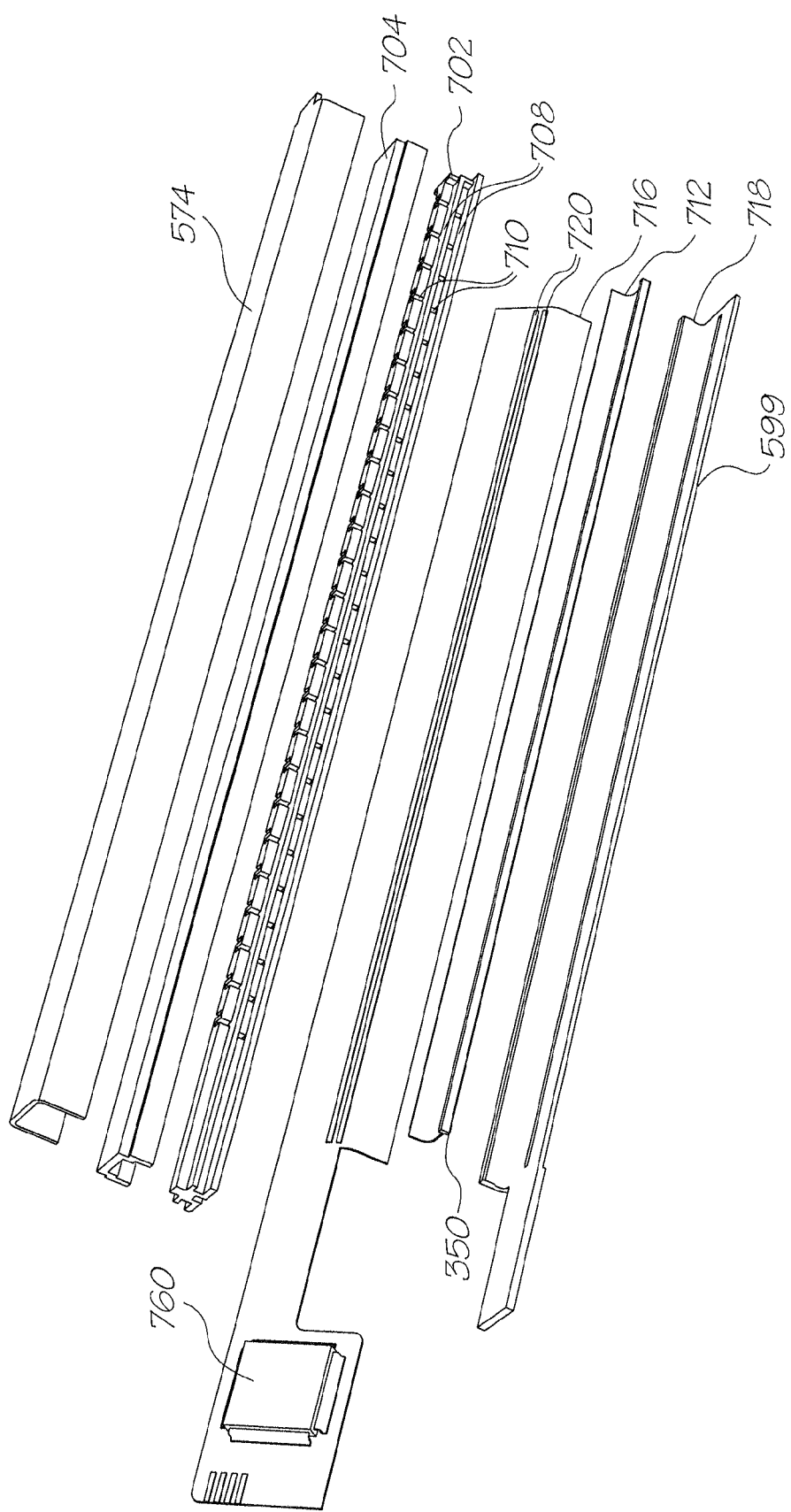
FIG. 68 is a perspective exploded view of a printhead sub-assembly of the print engine.
Figure 69:
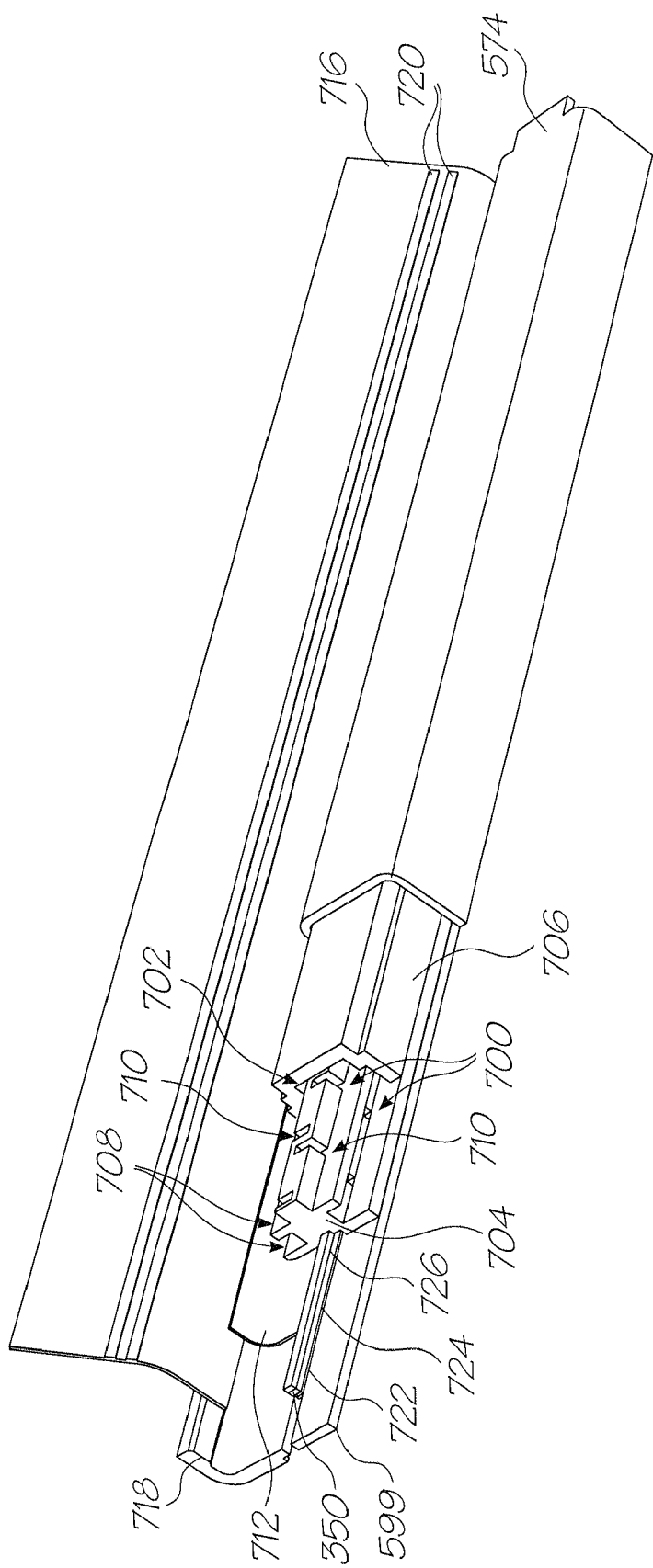
FIG. 69 is a perspective cut-away view of the printhead sub-assembly.

As illustrated in FIG. 67, the cartridge 504 includes a roller assembly 536 which serves to de-curl the paper 542 as it is fed from the roll and also to drive the paper 542 through the exit slot. The roller assembly 536 includes a drive roller 534 and two driven rollers 1040, which together provide positive traction to the paper 542 to control its speed and position as it is ejected from the housing.

The drive roller 534 includes a drive shaft 1046 which is held rotatably captive between mating recesses and defined in a side wall of each of the upper molding 1016 and the lower molding 1018, respectively, of the housing 1014. An opposed end 1052 of the drive roller 534 is held rotatably in suitable formations (not shown) in the upper molding 1016 and the lower molding 1018 of the housing 1014.

The drive roller 534 is a two shot injection molding comprising the shaft 1046 which is of a high impact polystyrene and on which are molded a bearing means in the form of elastomeric or rubber roller portions 1054. These portions 1054 positively engage the paper 542 and inhibit slippage of the paper 542 as the paper 542 is fed from the cartridge 504.

The end of the roller 534 projecting from the housing 1014 has an engaging formation in the form of a cruciform arrangement 540 (FIG. 72) which mates with a geared drive interface (not shown) of a printhead assembly of a device, such as a camera, in which the print cartridge 504 is installed. This arrangement ensures that the speed at which the paper is fed to the printhead is synchronised with printing by the printhead to ensure accurate registration of ink on the paper 542.

The ink cartridge 1012 includes a container 1058 which is in the form of a right circular cylindrical extrusion. The container 1058 is extruded from a suitable synthetic plastics material such as polystyrene.

In a preferred embodiment of the invention, the printhead with which the print cartridge 504 is used, is a multi-colored printhead. Accordingly, the container 1058 is divided into a plurality of, more particularly, four compartments or reservoirs 548. Each reservoir 548 houses a different color or type of ink. In one embodiment, the inks contained in the reservoirs 548 are cyan, magenta, yellow and black inks. In another embodiment of the invention, three different colored inks, being cyan, magenta and yellow inks, are accommodated in three of the reservoirs 548 while a fourth reservoir 548 houses an ink which is visible in the infrared light spectrum only.

One end of the container 1058 is closed off by an end cap 1062. The end cap 1062 has a plurality of openings 1064 defined in it. An opening 1064 is associated with each reservoir 548 so that atmospheric pressure is maintained in the reservoir 548 at that end of the container 1058 having the end cap 1062.

A seal arrangement is received in the container 1058 at the end having the end cap 1062. The seal arrangement comprises a quadrant shaped pellet 1068 of gelatinous material slidably received in each reservoir 548. The gelatinous material of the pellet 1068 is a compound made of a thermoplastic rubber and a hydrocarbon. The hydrocarbon is a white mineral oil. The thermoplastic rubber is a copolymer which imparts sufficient rigidity to the mineral oil so that the pellet 1068 retains its form at normal operating temperatures while permitting sliding of the pellet 1068 within its associated reservoir 548. A suitable thermoplastic rubber is that sold under the registered trademark of "Kraton" by the Shell Chemical Company. The copolymer is present in the compound in an amount sufficient to impart a gel-like consistency to each pellet 1068. Typically, the copolymer, depending on the type used, would be present in an amount of approximately three percent to twenty percent by mass.

In use, the compound is heated so that it becomes fluid. Once each reservoir 548 has been charged with its particular type of ink, the compound, in a molten state, is poured into each reservoir 548 where the compound is allowed to set to form the pellet 1068. Atmospheric pressure behind the pellets 1068, that is, at that end of the pellet 1068 facing the end cap 1062 ensures that, as ink is withdrawn from the reservoir 548, the pellets 1068, which are self-lubricating, slide towards an opposed end of the container 1058. The pellets 1068 thus inhibit contamination of the ink in the reservoir 548 and also inhibit drying out of the ink in the reservoir 548. The pellets 1068 are hydrophobic further to inhibit leakage of ink from the reservoirs 548.

The opposed end of the container 1058 is closed off by an ink collar molding 1070. Baffles carried on the molding 1070 receive an elastomeric seal molding 546. The elastomeric seal molding 546, which is hydrophobic, has sealing curtains defined therein. Each sealing curtain has a slit so that a mating pin from the printhead assembly is insertable through the slits into fluid communication with the reservoirs 548 of the container 1058. Hollow bosses project from an opposed side of the ink collar molding 1070. Each boss is shaped to fit snugly in its associated reservoir 548 for locating the ink collar molding on the end of the container 1058.

The ink collar molding 1070 is retained in place by means of a carrier or fascia molding 1082. The fascia molding 1082 has a four leaf clover shaped window 1084 defined therein through which the elastomeric seal molding 546 is accessible. The fascia molding 1084 is held captive between the upper molding 1016 and the lower molding 1018 of the housing 1014. The fascia molding 1084 and webs 1086 and 1088 extending from an interior surface of the upper molding 1016 and the lower molding 1018 respectively, of the housing 1014 define a compartment 1090. An air filter 1092 is received in the compartment 1090 and is retained in place by the fascia molding 1084. The air filter 1092 cooperates with the printhead assembly. Air is blown across a nozzle guard of a printhead assembly to effect cleaning of the nozzle guard. This air is filtered by being drawn through the air filter 1092 by means of a pin which is received in an inlet opening 1094 in the fascia molding 1082.

When the print cartridge 504 has been assembled, a membrane or film 1096 is applied to the outer end of the fascia molding 1082 to effectively seal the unit 1084. This membrane or film 1096 is pierced or ruptured by the pins, for use. The film 1096 inhibits the ingress of detritus into the ink reservoirs 548.

An authentication means in the form of an authentication chip 761 is received in an opening 725 in the fascia molding 1082. The authentication chip 761 is interrogated by the print engine controller 760 to ensure that the print cartridge 504 is compatible and compliant with the device.

Embodiments of the authentication or QA chip 761 are described in the present applicant or assignee's co-pending application Ser. No. 09/113,223 entitled "A System for Authenticating Physical Objects", the contents of which are herein incorporated by cross-reference.

9.4 Page ID Management

Netpages are identified by a page ID 50 (FIG. 25) of up to 100 bits in length. To pre-allocate a block of page IDs for a print cartridge 504, a 100-bit starting page ID is stored in the authentication chip 761 in the print cartridge. In one embodiment, the starting page ID is stored in flash memory in the authentication chip, and is incremented every time a page is printed. It therefore always represents the next available page ID. In another embodiment, the starting page ID is stored in a ROM of the authentication chip, and a separate page count is maintained in the flash memory of the authentication chip. The page count is incremented every time a page is printed. The next available page ID is then represented by the sum of the starting page ID and the page count. The page count register can be quite short, since the number of pages which can be produced from a single print cartridge is bounded. For example, in the preferred embodiment the print cartridge can produce thirty-six 6×4" pages, requiring a page count register 6 bits wide. In practice, since the print engine 500, by incorporating a guillotine, can produce arbitrarily short pages, a wider page count register is warranted. A 10-bit register, for example, supports 1024 5.4 mm pages.

9.5 Photo Capture Data Flow

Figure 76:
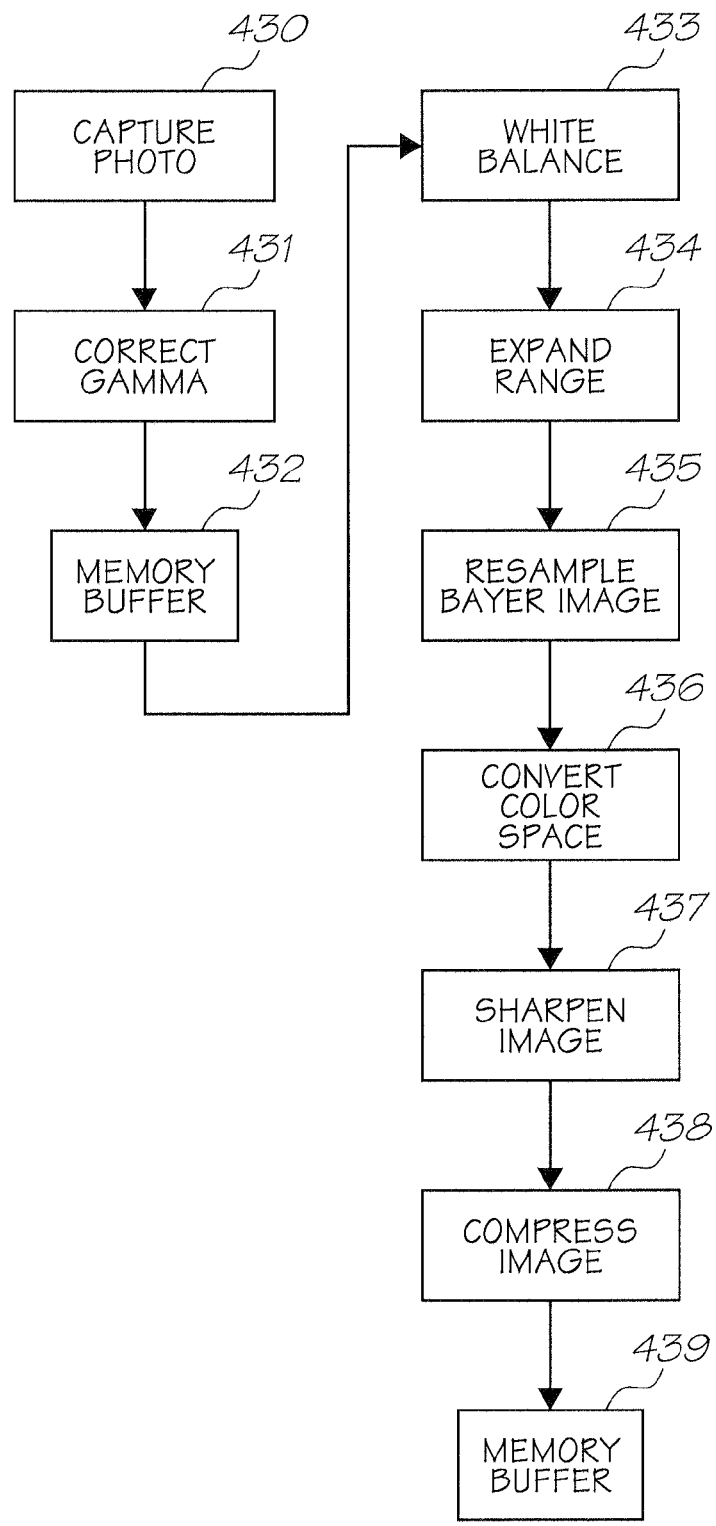
FIG. 76 is a flowchart of photo capture processing in the netpage camera.

Photo capture commences when the user presses the take button 1220. As illustrated in FIG. 76, the processor 750 captures (at 430) an image via the CCD image sensor 776. In the process of transferring the image to memory (at 432), the processor linearizes (at 432) the intensity response of the image via a lookup table pre-computed based on the known gamma of the image sensor 776. At the same time the processor accumulates histograms for each color channel. The image captured from the image sensor typically uses a device-specific red, green and blue (RGB) color space.

The black and white points of each channel are determined from its respective histogram, and the dynamic range of each channel is expanded (at 434) to fill the full dynamic range. As a side-effect, the image is white balanced (shown at 433, but actually implicit in 434), since the individual white points become aligned.

Most color image sensors contain a set of identical sensing elements which have a good spectral response throughout the visible spectrum. An image sensor is typically overlaid with a color filter consisting of an RGB mosaic, thus limiting a given sensing element's spectral response to the color of the red, green or blue filter tile above it. The mosaic is usually arranged as a checkerboard of green tiles interspersed with alternating lines of red and blue, known as the Bayer color filter array, thus yielding twice as many green sensing elements as red or blue ones. This is consistent with the human visual system's greater sensitivity to frequencies in the green part of the spectrum. Image processing must therefore take place after image capture to fully populate each mutually sparse plane of the captured RGB image.

After range expansion, therefore, the sparse Bayer image is resampled (at 435) using appropriate filter kernels.

The RGB image is then converted (at 436) into a device-independent color space (such as sRGB, L*a*b*, etc.), sharpened (at 437), and finally compressed (at 438) before being stored in memory (at 439). Compression may utilize JPEG, or other suitable contone image compression scheme.

The stapes of range expansion through compression are executed as a pipeline, without intermediate storage of an entire image. Storage of the entire image is only required after initial capture because histograms are being accumulated.

Once stored in memory, in compressed form and in a device-independent color space, the image is ready to wrapped in a netpage document and fed to the netpage document rasterizer (at 442 in FIG. 77) as a starting point to being printed.

The various image processing steps described above are well known and understood by those skilled in the art.

If the photo is being printed as a netpage, then the photo is also queued for transmission to a photo manager on the netpage network, as described in section 8. As described earlier, the photo may be transmitted immediately, or transmission may be deferred.

9.6 Netpage Document Data Flow

The flow of a netpage document, from receipt from the netpage network to printing as a netpage, is described in section 7.2.1 above.

That description applies equally to the netpage camera, although rasterization is carried out by the processor 750 rather than the RIP DSPs 757, which are absent from the camera controller 656.

In the case of a photo, the camera creates a page description which reflects the user's photo size setting (selected via the photo size slider 1208). The page description dictates the size and aspect ratio of the photo (e.g. classic versus panoramic), and has the capability of representing n-up arrangements (e.g. passport photos) as well as multi-page tilings.

Figure 78:
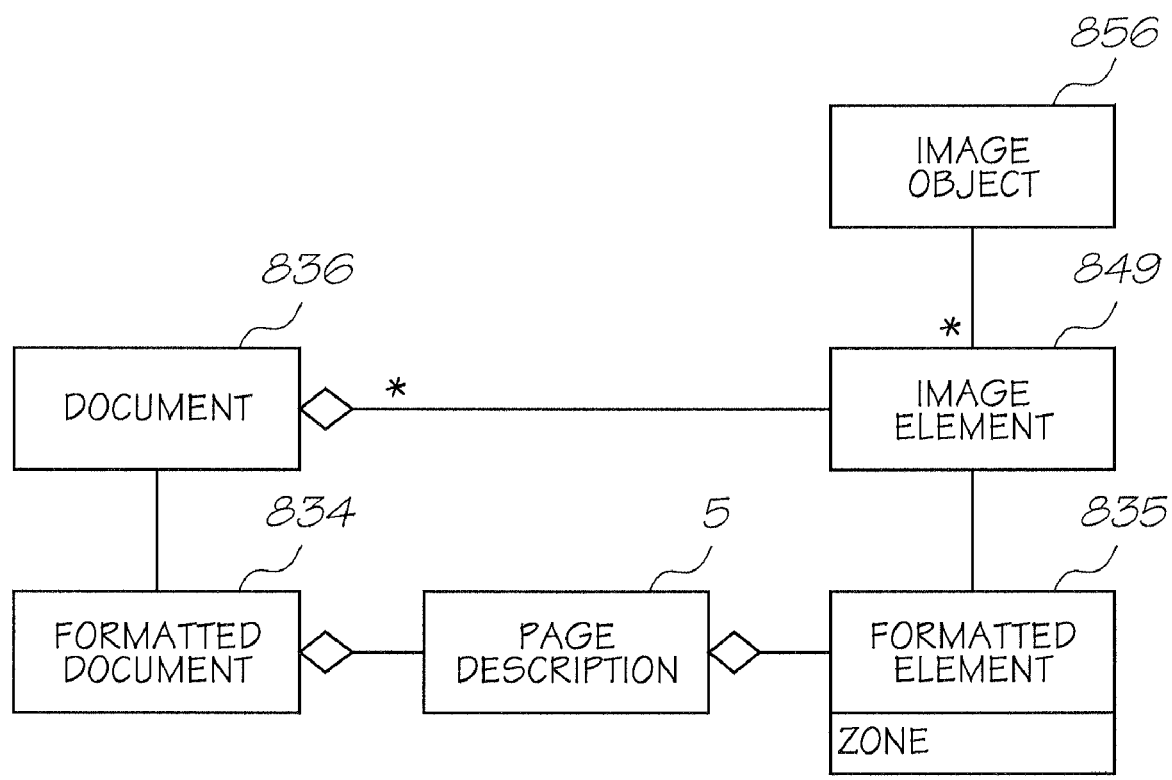
FIG. 78 is a schematic view of a photo document class diagram.

FIG. 78 shows a netpage document and its page descriptions containing one or more formatted image elements representing the captured photo.

Figure 79:
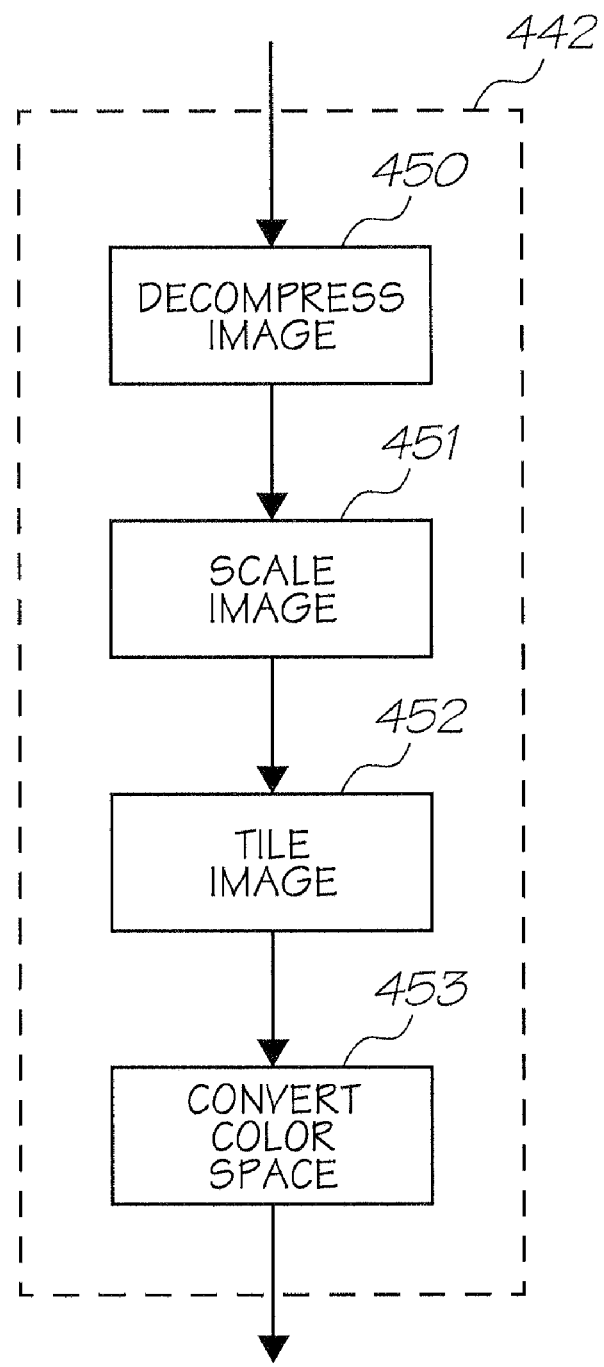
FIG. 79 is a flowchart of photo document rasterization in the netpage camera.

Once the photo document is passed to the rasterizer (at 442 in FIG. 77), a number of transformations typically take place. As shown in FIG. 79, the image is first decompressed (at 450); then scaled (at 451) to the contone resolution of the camera's printer, as well as possibly cropped, depending on the user's selected aspect ratio; then possibly tiled (at 452); and finally converted to the printre's device-specific CMY color space (at 453). It then proceeds through the normal netpage printing pipeline.

In the preferred embodiment, the image sensor has a spatial resolution of 1500×1000 pixels, and images are printed at a contone resolution of 267 pixels per inch.

When a photo is printed without being printed as a netpage, it passes through the same printing stages, with the exception that netpage tag rendering (at 448 in FIG. 77) is disabled.

9.7 Dedicated Photo Data Flow

Figure 80:
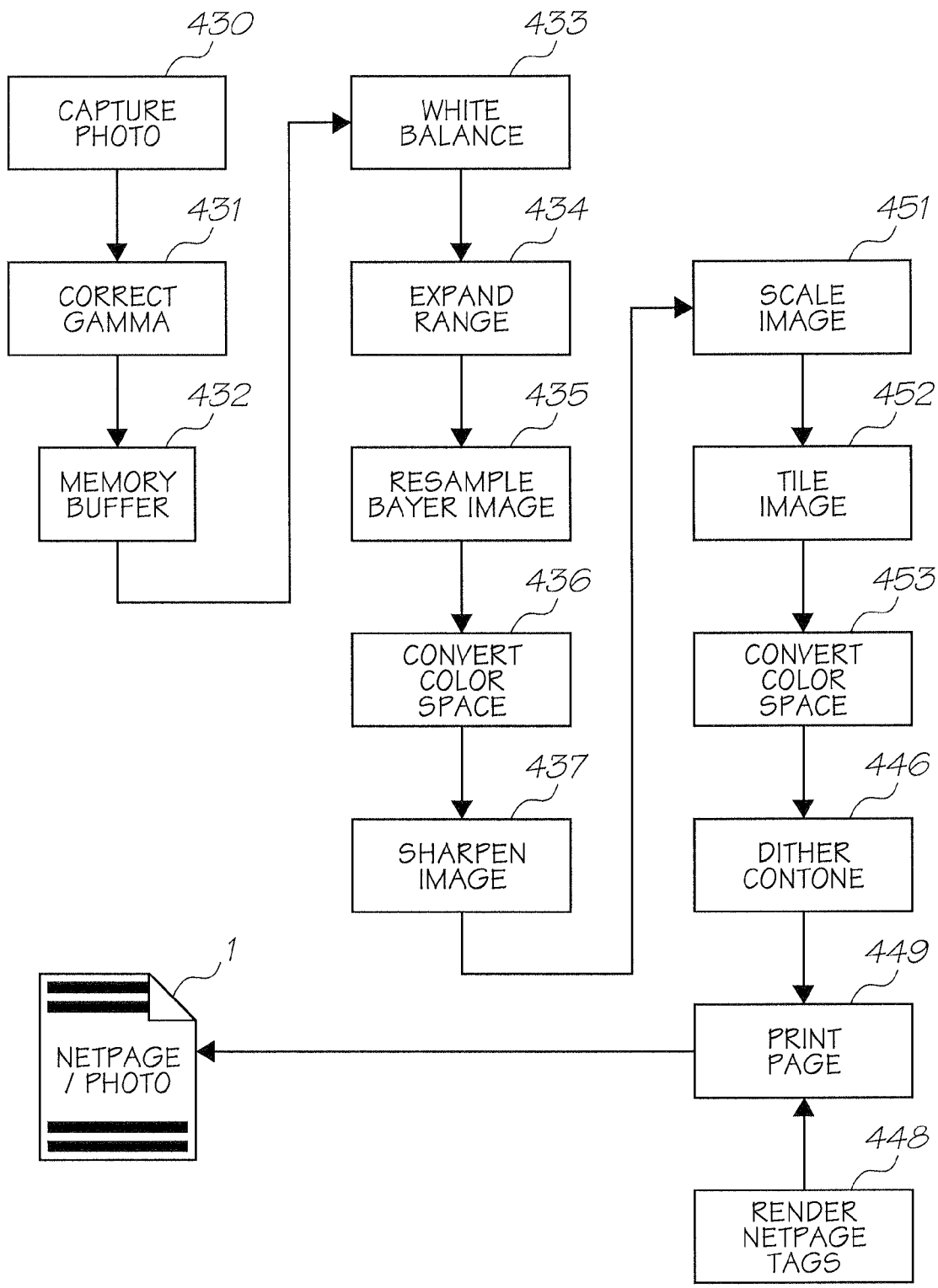
FIG. 80 is a flowchart of dedicated photo capture and printing in the netpage camera.

In an alternative embodiment, illustrated in FIG. 80, the netpage camera contains a dedicated pipeline for capturing, processing, rendering and printing a photo. The pipeline may be embodied in software or hardware. It contains most of the same steps as the photo capture and general netpage printing processes, although it dispenses with a general-purpose netpage document rasterizer in favour of photo-specific processing, removes the conversion of the photo image to an intermediate device-independent color space, and removes the intermediate compression of both the photo image and the page image. It thus provides a significantly more efficient photo capture and rendering pipeline, with particular applicability to the capture and printing of non-netpage photo images.

In the preferred embodiment, however, intermediate compression of the photo image is considered advantageous, since the image must be transmitted to a server.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A camera for capturing and printing an image, the camera comprising:
    (a) a camera module, including an image sensor, configured to:
        (i) receive a user input; and
        (ii) capture, via the image sensor and in response to the user input, the image;
    (b) a network interface module configured to:
        (i) receive, from the camera module, the image; and
        (ii) transfer the image to a computer system; and
    (c) a printing module, including a printing mechanism and a supply of pages for the printing mechanism, configured to:
        (i) receive, from the camera module, the image; and
        (ii) print an interface onto a surface of a page of the page supply, each page having an identity assigned by the computer system, the interface including the image and coded data at least partially indicative of the identity of the page and an identity of the image associated with the identity of the page, thereby allowing the identities of the page and image to be obtained from the interface, wherein the network interface module is further configured to receive another image from the computer system, and the printing module is configured to receive, from the network interface module, the another image, and print the another image on a second surface of the page.

2. A camera according to claim 1, wherein the printing module includes a coded data generator configured to generate at least one of the coded data and second coded data.

3. A camera according to claim 2, wherein coded data includes a plurality of tags, the coded data generator being configured to ascertain a position of each tag prior to printing the interface, the respective positions being determined on the basis of a coded data layout.

4. A camera according to claim 3, wherein the printing module is configured to receive the coded data layout from the computer system.

5. A camera according to claim 1, wherein coded data includes a plurality of tags, each tag being indicative of an identity.

6. A camera according to claim 1, wherein the coded data is not substantially visible to an average unaided human eye under daylight or ambient lighting conditions.

7. A camera according to claim 1, wherein the printing module includes an ink printing mechanism, and is configured to print the coded data and additional information substantially simultaneously onto the surface.

* * * * *